United States Patent
Stubbert

(10) Patent No.: US 11,708,429 B2
(45) Date of Patent: Jul. 25, 2023

(54) BIDENTATE AZOLYLAMIDO METAL-LIGAND COMPLEXES AND OLEFIN POLYMERIZATION CATALYSTS

(71) Applicant: Dow Global Technologies LLC, Midland, MI (US)

(72) Inventor: Bryan D. Stubbert, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 360 days.

(21) Appl. No.: 17/260,171

(22) PCT Filed: Jul. 29, 2019

(86) PCT No.: PCT/US2019/043896
§ 371 (c)(1),
(2) Date: Jan. 13, 2021

(87) PCT Pub. No.: WO2020/028240
PCT Pub. Date: Feb. 6, 2020

(65) Prior Publication Data
US 2021/0332165 A1    Oct. 28, 2021

Related U.S. Application Data

(60) Provisional application No. 62/712,579, filed on Jul. 31, 2018.

(51) Int. Cl.
| | | |
|---|---|---|
| C07F 7/00 | (2006.01) | |
| C08F 4/76 | (2006.01) | |
| C08F 4/64 | (2006.01) | |
| C08F 10/02 | (2006.01) | |

(52) U.S. Cl.
CPC .............. C08F 4/76 (2013.01); C07F 7/003 (2013.01); C08F 4/64044 (2013.01); C08F 10/02 (2013.01); C07F 7/00 (2013.01)

(58) Field of Classification Search
CPC ..... C08F 4/64044; C07F 17/00; C07F 17/003
See application file for complete search history.

(56) References Cited

U.S. PATENT DOCUMENTS

| | | |
|---|---|---|
| 6,096,676 A | 8/2000 | Murray |
| 6,320,005 B1 | 11/2001 | Murray |
| 6,864,205 B2 | 3/2005 | Murray |
| 6,919,413 B2 | 7/2005 | Murray |
| 7,387,980 B2 * | 6/2008 | Diamond ............... C07F 7/28 502/103 |
| 8,362,265 B2 | 1/2013 | Vosejpka et al. |
| 8,372,927 B2 | 2/2013 | Figueroa et al. |
| 2012/0271018 A1 | 10/2012 | Murray et al. |

FOREIGN PATENT DOCUMENTS

| | | |
|---|---|---|
| CN | 104114584 A | 10/2014 |
| EP | 993464 A1 | 4/2000 |
| WO | 2006036748 A2 | 4/2006 |
| WO | 2007130306 A2 | 11/2007 |
| WO | 2013040262 A1 | 3/2013 |
| WO | 2018022249 A1 | 2/2018 |

OTHER PUBLICATIONS

Schuitema, A. M.; Stassen, A.F.; Driessen, W.L.; Reedik, J. Inorg. Chim. Acta 2002, 337, 48-52. (Year: 2002).*
International Search Report and Written Opinion pertaining to PCT/US2019/043896, dated Oct. 21, 2019.
Chinese Search Report, dated Nov. 3, 2022, pertaining to Chinese Patent Application No. 201980049104.2, 2 pages.
Chinese Office Action, dated Nov. 3, 2022, pertaining to Chinese Patent Application No. 201980049104.2, 4 pages.

* cited by examiner

Primary Examiner — Rip A Lee
(74) Attorney, Agent, or Firm — Dinsmore & Shohl LLP

(57) ABSTRACT

Embodiments are directed to catalyst systems comprising at least one metal ligand complex and to processes for polyolefin polymerization incorporating the catalyst systems. The metal ligand complexes have the following structures:
(I)

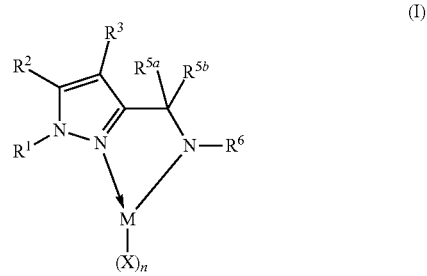

13 Claims, No Drawings

BIDENTATE AZOLYLAMIDO METAL-LIGAND COMPLEXES AND OLEFIN POLYMERIZATION CATALYSTS

CROSS-REFERENCE TO RELATED APPLICATIONS

This application is a National Stage Entry under 35 U.S.C. § 371 of International Patent Application No. PCT/US2019/043896, filed Jul. 29, 2019, which claims priority to U.S. Provisional Patent Application No. 62/712,579, filed on Jul. 31, 2018, the entire disclosures of which are hereby incorporated by reference.

TECHNICAL FIELD

Embodiments of the present disclosure generally relate to olefin polymerization catalyst systems and processes and, more specifically, to bidentate azolylamido polyolefin procatalyst.

BACKGROUND

Olefin-based polymers, such as ethylene-based polymers and/or propylene-based polymers, are produced via various catalyst systems. Selection of such catalyst systems used in the polymerization process of the olefin based polymers is an important factor contributing to the characteristics and properties of such olefin based polymers.

Ethylene-based polymers and propylene-based polymers are manufactured for a wide variety of articles. The ethylene-based polymers polymerization process can be varied in a number of respects to produce a wide variety of resultant polyethylene resins having different physical properties that render the various resins suitable for use in different applications.

The chemical industry strives to develop catalyst systems that include metal-ligand complexes with improved selectivity between comonomer and ethylene under olefin polymerization reaction conditions (e.g., temperature). The catalyst systems would be capable of polymerization reactions that provide new compositions of matter (e.g., new polyolefin compositions), improving reaction yields, providing alternative substrate selectivities (e.g., providing a new relative selectivity for a monomer and co-monomer in making a polyolefin copolymer), improving process safety, or a combinations thereof.

SUMMARY

Despite the research efforts in developing catalyst systems suitable for olefin polymerization, such as polyethylene or polypropylene polymerization, ongoing needs exist to increase the efficiencies of catalyst systems that are capable of producing polymer with high molecular weights, capable of reacting at high temperatures (i.e. temperature of 120° C. or greater), and capable of increasing the selectivity for the comonomer.

According to some embodiments, a catalyst system comprising a metal-ligand complex according to formula (I):

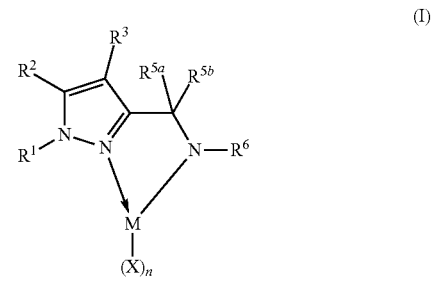

(I)

In formula (I), M is a metal chosen from titanium, zirconium, or hafnium, the metal having a formal oxidation state of +2, +3, or +4; Each X is a monodentate ligand, bidentate ligand, or tridentate ligand chosen from $(C_1-C_{40})$ hydrocarbyl, $(C_1-C_{40})$heterohydrocarbyl, $(C_6-C_{20})$aryl, $(C_6-C_{20})$heteroaryl, $—N(R^N)_2$, $—OR^C$, $—SR^C$, $—NO_2$, $—CN$, $—CF_3$, $R^CS(O)—$, $R^CS(O)_2—$, $(R^C)_2C=N—$, $R^CC(O)O—$, or $R^COC(O)—$, Each $R^C$, $R^N$, and $R^P$ in formula (I) is independently a $(C_1-C_{30})$hydrocarbyl. The subscript n of $(X)_n$ is 1, 2, or 3. When X is a tridentate ligand, n is 1. When X is a monodentate or bidentate ligand, n is 2 or 3.

In formula (I), each $R^1$, $R^{5a}$, $R^{5b}$, and $R^6$ is independently chosen from $(C_1-C_{40})$hydrocarbyl, $(C_1-C_{40})$heterohydrocarbyl, $—Si(R^C)_3$, $—Ge(R^C)_3$, $—P(R^P)_2$, $—N(R^N)_2$, $—OR^C$, $—SR^C$, $—NO_2$, $—CN$, $—CF_3$, $R^CS(O)—$, $R^CS(O)_2—$, $(R^C)_2C=N—$, $R^CC(O)O—$, $R^COC(O)—$, $R^CC(O)N(R)—$, $(R^C)_2NC(O)—$, halogen, or hydrogen. $R^2$ is chosen from $(C_1-C_{40})$hydrocarbyl, $(C_1-C_{40})$heterohydrocarbyl, $—Si(R^C)_3$, $—Ge(R^C)_3$, $—P(R^P)_2$, $—N(R^N)_2$, $—OR^C$, $—SR^C$, $—NO_2$, $—CN$, $—CF_3$, $R^CS(O)—$, $R^CS(O)_2—$, $(R^C)_2C=N—$, $R^CC(O)O—$, $R^COC(O)—$, $R^CC(O)N(R)—$, $(R^C)_2NC(O)—$, halogen, or hydrogen. $R^3$ is chosen from $(C_1-C_{40})$hydrocarbyl, $(C_1-C_{40})$heterohydrocarbyl, $—Si(R^C)_3$, $—Ge(R^C)_3$, $—P(R^P)_2$, $—N(R^N)_2$, $—OR^C$, $—SR^C$, $—NO_2$, $—CN$, $—CF_3$, $R^CS(O)—$, $R^CS(O)_2—$, $(R^C)_2C=N—$, $R^CC(O)O—$, $R^COC(O)—$, $R^CC(O)N(R)—$, $(R^C)_2NC(O)—$, halogen, or hydrogen. Each $R^C$, $R^N$, and $R^P$ in formula (I) is independently a $(C_1-C_{30})$hydrocarbyl. Moreover, $R^2$ and $R^3$ may be optionally covalently linked to form an aromatic ring.

DETAILED DESCRIPTION

Specific embodiments of catalyst systems will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Common abbreviations are listed below:

IR, Z, M, X and n: as defined above; Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf: trifluoromethane sulfonate; THF: tetrahydrofuran; $Et_2O$: diethyl ether; $CH_2Cl_2$: dichloromethane; $C_6D_6$: deuterated benzene or benzene-d6: $CDCl_3$: deuterated chloroform; BHT: butylated hydroxytoluene; TCB: 1,2,4-trichlorobenzene; $MgSO_4$: magnesium sulfate; n-BuLi: butyllithium; $HfCl_4$: hafnium(IV) chloride; $HfBn_4$: hafnium(IV) tetrabenzyl; $ZrCl_4$: zirconium(IV) chloride; $ZrBn_4$: zirconium(IV) tetrabenzyl; $ZrBn_2Cl_2(OEt_2)$: zirconium (IV) dibenzyl dichloride mono-diethyletherate; $HfBn_2Cl_2(OEt_2)$: hafnium (IV) dibenzyl dichloride mono-diethyletherate; $N_2$: nitrogen gas; PhMe: toluene; PPR: parallel pressure reactor; MAO: methylaluminoxane; MMAO: modified methylaluminoxane; TEA: Triethylamine; GC: gas chromatography; LC: liquid chromatography; NMR: nuclear magnetic resonance; MS: mass spectrometry; mmol: millimoles; M: molar solution; mM: millimolar solution; mL milliliters; min or mins: minutes; h or hrs: hours; d: days; RT: room temperature.

The term "independently selected" is used herein to indicate that the R groups, such as, $R^1$, $R^2$, $R^3$, and $R^5$, can be identical or different (such that $R^1$, $R^2$, $R^3$, and $R^5$ may all be substituted alkyls or $R^1$ and $R^2$ may be a substituted alkyl and $R^3$ may be an aryl, etc.). A chemical name associated with an R group is intended to convey the chemical structure that is recognized in the art as corresponding to that of the chemical name. Thus, chemical names are intended to supplement and illustrate, not preclude, the structural definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{50})$alkyl is an alkyl group having from 1 to 50 carbon atoms in its unsubstituted form. In some embodiments and general structures, certain chemical groups may be substituted by one or more substituents such as $R^S$. An $R^S$ substituted chemical group defined using the "$(C_x-C_y)$" parenthetical may contain more than y carbon atoms depending on the identity of any groups $R^S$. For example, a "$(C_1-C_{50})$alkyl substituted with exactly one group $R^S$, where $R^S$ is phenyl ($—C_6H_5$)" may contain from 7 to 56 carbon atoms. Thus, in general when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (for example, $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified have identical meanings.

The term "$(C_1-C_{50})$hydrocarbyl" means a hydrocarbon radical of from 1 to 50 carbon atoms and the term "$(C_1-C_{50})$hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a $(C_1-C_{50})$hydrocarbyl may be an unsubstituted or substituted $(C_1-C_{50})$alkyl, $(C_3-C_{50})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene (such as benzyl (—CH$_2$—C$_6$H$_5$)).

The terms "$(C_1-C_{50})$alkyl" and "$(C_1-C_{18})$alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted $(C_1-C_{50})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and [$C_{45}$]alkyl. The term "[$C_{45}$]alkyl" means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

The term "$(C_6-C_{50})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms ae aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted $(C_6-C_{50})$aryl include: unsubstituted $(C_6-C_{20})$aryl, unsubstituted $(C_6-C_{18})$aryl; 2-$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl include: substituted $(C_1-C_{20})$aryl; substituted $(C_6-C_{18})$aryl; 2,4-bis([$C_{20}$]alkyl)-phenyl; polyfluorophenyl; pentafluorophenyl; and fluoren-9-one-1-yl.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{50})$hydrocarbylene include unsubstituted or substituted $(C_6-C_{50})$arylene. $(C_3-C_{50})$cycloalkylene, and $(C_1-C_{50})$alkylene (e.g., $(C_1-C_{20})$alkylene). The diradicals may be on the same carbon atom (e.g., —CH$_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or an α,ω-diradical, and others a 1,2-diradical. The α,ω-diradical is a diradical that has maximum carbon backbone spacing between the radical carbons. Some examples of $(C_2-C_{20})$alkylene α,ω-diradicals include ethan-1,2-diyl (such as —$CH_2CH_2$—), propan-1,3-diyl (such as —$CH_2CH_2CH_2$—), 2-methylpropan-1,3-diyl (i.e. —$CH_2CH(CH_3)CH_2$—). Some examples of $(C_6-C_{50})$ arylene α,ω-diradicals include phenyl-1,4-diyl, napthalen-2,6-diyl, or napthalen-3,7-diyl.

The term "$(C_1-C_{50})$alkylene" means a saturated straight chain or branched chain diradical (that is the radicals are not on ring atoms) of from 1 to 50 carbon atoms that is unsubstituted or substituted by one or more $R^S$. Examples of unsubstituted $(C_1-C_{50})$alkylene are unsubstituted $(C_1-C_{20})$ alkylene, including unsubstituted —$CH_2CH_2$—, —$(CH_2)_3$—, —$(CH_2)_4$—, —$(CH_2)_5$—, —$(CH_2)_6$—, —$(CH_2)_7$—, —$(CH_2)_8$—, —$CH_2C*HCH_3$, and —$(CH_2)_4C*(H)(CH_3)$—, in which "C*" denotes a carbon atom from which a hydrogen atom is removed to form a secondary or tertiary alkyl radical. Examples of substituted $(C_1-C_{50})$alkylene are substituted $(C_1-C_{20})$alkylene. —$CF_2$—, —$C(O)$—, and —$(CH_2)_{14}C(CH_3)_2(CH_2)_5$— (i.e., a 6,6-dimethyl substituted normal-1,20-eicosylene). Since as mentioned previously two $R^S$ may be taken together to form a $(C_1-C_{18})$ alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo [2.2.1]heptane, and 2,3-bis(methylene)bicyclo [2.2.2] octane.

The term "$(C_3-C_{50})$cycloalkylene" means a cyclic diradical (that is the radicals are on ring atoms) of from 3 to 50 carbon atoms that is unsubstituted or substituted by one or more $R^S$.

The term "heteroatom," refers to an atom other than hydrogen or carbon. Examples of groups containing one or more than one heteroatom include O, S, S(O), S(O)$_2$, Si($R^C$)$_2$, P($R^P$), N($R^N$), —N=C($R^C$)$_2$, —Ge($R^C$)$_2$—, or —Si($R^C$)—, where each $R^C$ and each $R^P$ is unsubstituted $(C_1-C_{18})$hydrocarbyl or —H. and where each $R^N$ is unsubstituted $(C_1-C_{18})$hydrocarbyl. The term "heterohydrocarbon" refers to a molecule or molecular framework in which one or more carbon atoms of a hydrocarbon are replaced with a heteroatom.

The term "$(C_1-C_{50})$heterohydrocarbyl" means a heterohydrocarbon radical of from 1 to 50 carbon atoms, and the term "$(C_1-C_{50})$heterohydrocarbylene" means a heterohydrocarbon diradical of from 1 to 50 carbon atoms. The heterohydrocarbon of the $(C_1-C_{50})$heterohydrocarbyl or the $(C_1-C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The $(C_1-C_{50})$heterohydrocarbyl may be unsubstituted or substituted. Non-limiting examples of the $(C_1-C_{50})$heterohydrocarbyl include $(C_1-C_{50})$heteroalkyl, $(C_1-C_{50})$hydrocarbyl-O—, $(C_1-C_{50})$hydrocarbyl-S—, $(C_1-C_{50})$hydrocarbyl-S(O)—, $(C_1-C_{50})$hydrocarbyl-S(O)$_2$—, $(C_1-C_{50})$hydrocarbyl-Si($R^C$)$_2$—, $(C_1-C_{50})$hydrocarbyl-N($R^N$)—, $(C_1-C_{50})$hydrocarbyl-P($R^P$)—, $(C_2-C_{50})$heterocycloalkyl. $(C_2-C_{19})$ heterocycloalkyl-$(C_1-C_{20})$alkylene. $(C_3-C_{20})$cycloalkyl-$(C_1-C_{19})$heteroalkylene. $(C_2-C_{19})$heterocycloalkyl-$(C_1-C_{20})$ heteroalkylene, $(C_1-C_{50})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_4-C_{50})$heteroaryl" means an unsubstituted or substituted (by one or more $R^S$) mono-, bi-, or tricyclic heteroaromatic hydrocarbon radical of from 4 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclyc heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring.

The 5-membered ring monocyclic heteroaromatic hydrocarbon radical has 5 minus h carbon atoms, where h is the number of heteroatoms and may be 1, 2, or 3; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl.

The 6-membered ring monocyclic heteroaromatic hydrocarbon radical has 6 minus h carbon atoms, where h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl.

The bicyclic heteroaromatic hydrocarbon radical can be a fused 5.6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5.6.5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f] indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The term "$(C_1-C_{50})$heteroalkyl" means a saturated straight or branched chain radical containing one to fifty carbon atoms, and one or more heteroatom. The term "$(C_1-C_{50})$heteroalkylene" means a saturated straight or branched chain diradical containing from 1 to 50 carbon atoms and one or more than one heteroatoms. The heteroatoms of the heteroalkyls or the heteroalkylenes may include Si($R^C$)$_3$, Ge($R^C$)$_3$, Si($R^C$)$_2$, Ge($R^C$)$_2$, P($R^P$)$_2$, P($R^P$), N($R^N$)$_2$, N($R^N$), N, O, O$R^C$, S, S$R^C$, S(O), and S(O)$_2$, wherein each of the heteroalkyl and heteroalkylene groups are unsubstituted or are substituted by one or more $R^S$.

Examples of unsubstituted $(C_2-C_{40})$heterocycloalkyl include unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride (F⁻), chloride (Cl⁻), bromide (Br⁻), or iodide (I⁻).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may be present in substituents $R^S$. The term "unsaturated" means containing one or more carbon-carbon double bonds or carbon-carbon triple bonds, or (in heteroatom-containing groups) one or more carbon-nitrogen double bonds, carbon-phosphorous double bonds, or carbon-silicon double bonds, not including double bonds that may be present in substituents $R^S$, if any, or in aromatic rings or heteroaromatic rings, if any.

Embodiments of this disclosure include catalyst systems that include a metal-ligand complex according to formula (I):

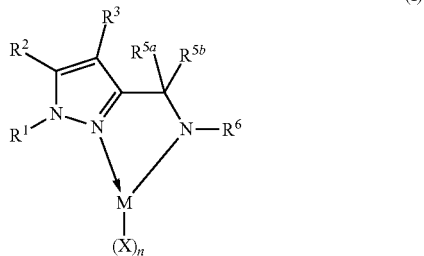

In formula (I), M is a metal chosen from titanium, zirconium, or hafnium, the metal having a formal oxidation state of +2, +3, or +4. $R^1$ is chosen from $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —OR$^C$, —SR$^C$, —NO$_2$, —CN, —CF$_3$, R$^C$S(O)—, R$^C$S(O)$_2$—, $(R^C)_2$C=N—, R$^C$C(O)O—, R$^C$OC(O)—, R$^C$C(O)N(R)—, $(R^C)_2$NC(O)—, halogen, hydrogen, $(C_5-C_{40})$arylene covalently connected to M, or $(C_4-C_{40})$heteroarylene covalently connected to M.

In embodiments, the catalyst system may include a metal-ligand complex according to formula (I), in which $R^2$ and $R^3$ are independently chosen from $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —OR$^C$, —SR$^C$, —NO$_2$, —CN, —CF$_3$, R$^C$S(O)—, R$^C$S(O)$_2$—, $(R^C)_2$C=N—, R$^C$C(O)O—, R$^C$OC(O)—, R$^C$C(O)N(R)—, $(R^C)_2$NC(O)—, halogen, or hydrogen. In one or more embodiments, $R^2$ and $R^3$ are optionally covalently linked to form an aromatic ring.

In embodiments, the catalyst system may include a metal-ligand complex according to formula (I), in which $R^{5a}$, $R^{5b}$, and $R^6$ are independently chosen from $(C_1-C_{40})$hydrocarbyl, $(C_1-C_{40})$heterohydrocarbyl, —Si$(R^C)_3$, —CH$_2$Si$(R^C)$—Ge$(R^C)_3$, —P$(R^P)_2$, —N$(R^N)_2$, —R$^C$—SR$^C$, —NO$_2$, —CN, —CF$_3$, R$^C$S(O)—, R$^C$S(O)$_2$—, $(R^C)_2$C=N—, R$^C$C(O)O—, R$^C$OC(O)—, R$^C$C(O)N(R)—, $(R^C)_2$NC(O)—, halogen, or hydrogen. Each $R^C$, $R^N$, and $R^P$ in formula (I) is independently a $(C_1-C_{30})$hydrocarbyl.

In embodiments, the catalyst system may include a metal-ligand complex according to formula (I), in which each X is independently a monodentate ligand, bidentate ligand, or tridentate ligand chosen from $(C_1-C_{40})$hydrocarbyl, $(C_6-C_{20})$aryl, or $(C_6-C_{20})$heteroaryl. The subscript n of $(X)_n$ is 1, 2, or 3. When X is a tridentate ligand, n is 1. When X is a monodentate or bidentate ligand, n is 2 or 3. In some embodiments when $R^1$ is $(C_5-C_{40})$arylene or $(C_4-C_{40})$heteroarylene, n is 1 or 2. The metal-ligand complex has five or fewer metal-ligand bonds and may be overall charge-neutral.

In some embodiments, $R^2$ is methyl or phenyl and $R^3$ is —H.

In some embodiments of the metal-ligand complex according to formula (I), $R^2$ and $R^3$ are covalently linked to form an aromatic ring; $R^6$ is substituted phenyl or unsubstituted phenyl; and the metal-ligand complex has a structure according to formula (II):

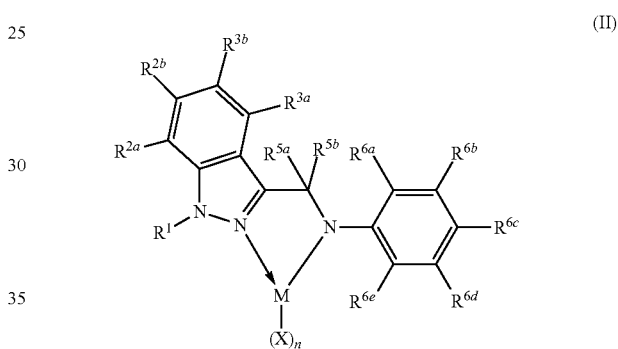

In formula (II) $R^1$, $R^{5a}$, $R^{5b}$, X, and n are as defined in formula (I), and each $R^{2a}$, $R^{2b}$, $R^{3a}$, $R^{3b}$, $R^{6a}$, $R^{6b}$, $R^{6c}$, $R^{6d}$, and $R^{6e}$ are independently chosen from $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —OR$^C$, —SR$^C$, —NO$_2$, —CN, —CF$_3$, R$^C$S(O)—, R$^C$S(O)$_2$—, $(R^C)_2$C=N—, R$^C$C(O)O—, R$^C$OC(O)—, R$^C$C(O)N(R)—, $(R^C)_2$NC(O)—, halogen, or hydrogen.

In one or more embodiments, $R^{5a}$ and $R^{5b}$ of formula (I) and of formula (II) are independently chosen from —H, benzyl, substituted phenyl, unsubstituted phenyl, $(C_1-C_{10})$alkyl, $(C_1-C_5)$alkyl, or methyl. The substituted phenyl may be substituted with one or more groups $R^S$ and may include persubstituted phenyl, disubstituted phenyl and trisubstituted phenyl. Each $R^S$ in such substituted phenyls may be chosen from $(C_1-C_{20})$alkyl, —Si$(R^C)_3$, —Ge$(R^C)_3$, —P$(R^P)_2$, —N$(R^N)_2$, —OR$^C$, —SR$^C$, —NO$_2$, —CN, —CF$_3$, R$^C$S(O)—, R$^C$S(O)$_2$—, $(R^C)_2$C=N—, R$^C$C(O)O—, R$^C$OC(O)—, R$^C$C(O)N(R)—, $(R^C)_2$NC(O)—, or halogen.

In embodiments, $R^1$ of formula (I) or formula (II) is a $(C_1-C_8)$alkyl. $R^1$ may be a methyl, ethyl, 1-propyl, 2-propyl, 1-butyl, 2-butyl, 1,1-dimethylethyl (also called tert-butyl), 1-pentyl, 2-pentyl, 3-pentyl, 1,2-dimethylpropyl, 2,2-dimethylpropyl, hexyl, heptyl, n-octyl, and 1,1,3,3-tetramethylbutyl (also called tert-octyl).

In one or more embodiments, $R^{6a}$, $R^{6c}$, and $R^{6e}$ of formula (II) are $(C_1-C_{30})$alkyl. In some embodiments, $R^{6a}$, $R^{6c}$, and $R^{6e}$ of formula (II) may be a methyl, ethyl, 1-propyl, 2-propyl, 1-butyl, 2-butyl, 1,1-dimethylethyl (also called tert-butyl), 1-pentyl, 2-pentyl, 3-pentyl, 1,2-dimethylpropyl, 2,2-dimethylpropyl, hexyl, heptyl, n-octyl, and 1,1,3,3-tetramethylbutyl (also called tert-octyl).

The metal M in the metal-ligand complex of formulas (I) and (II) may be derived from a metal precursor that is subsequently subjected to a single-step or multi-step synthesis to prepare the metal-ligand complex. Suitable metal precursors may be monomeric (one metal center), dimeric (two metal centers), or may have a plurality of metal centers greater than two, such as 3, 4, 5, or more than 5 metal centers. Specific examples of suitable hafnium and zirconium precursors, for example, include, but are not limited to $HfCl_4$, $HfMe_4$, $Hf(CH_2Ph)_4$, $Hf(CH_2CMe_3)_4$, $Hf(CH_2SiMe_3)_4$, $Hf(CH_2Ph)_3Cl$, $Hf(CH_2CMe_3)_3Cl$, $Hf(CH_2SiMe_3)_3Cl$, $Hf(CH_2Ph)_2Cl_2$, $Hf(CH_2CMe_3)_2Cl_2$, $Hf(CH_2SiMe_3)_2Cl_2$, $Hf(NMe_2)_4$, $Hf(NEt_2)_4$, and $Hf(N(SiMe_3)_2)_2Cl_2$; $ZrCl_4$, $ZrMe_4$, $Zr(CH_2Ph)_4$, $Zr(CH_2CMe_3)_4$, $Zr(CH_2SiMe_3)_4$, $Zr(CH_2Ph)_3Cl$, $Zr(CH_2CMe_3)_3Cl$, $Zr(CH_2SiMe_3)_3Cl$, $Zr(CH_2Ph)_2Cl_2$, $Zr(CH_2CMe_3)_2Cl_2$, $Zr(CH_2SiMe_3)_2Cl_2$, $Zr(NMe_2)_4$, $Zr(NEt_2)_4$, $Zr(NMe_2)_2Cl_2$, $Zr(NEt_2)_2Cl_2$, $Zr(N(SiMe_3)_2)_2Cl_2$, $TiBn_4$, $TiCl_4$ and $Ti(CH_2Ph)_4$. Lewis base adducts of these examples are also suitable as metal precursors, for example, ethers, amines, thioethers, and phosphines are suitable as Lewis bases. Specific examples include $HfCl_4(THF)_2$, $HfCl_4(SMe_2)_2$ and $Hf(CH_2Ph)_2Cl_2(OEt_2)$. Activated metal precursors may be ionic or zwitterionic compounds, such as $(M(CH_2Ph)_3^+)(B(C_6F_5)_4^-)$ or $(M(CH_2Ph)_3^+)(PhCH_2B(C_6F_5)_3^-)$ where M is defined above as being Hf or Zr.

In the metal-ligand complex according to formula (I), each X bonds with M through at least one covalent bond, dative bond, or ionic bond. When n is 1, X may be a monodentate ligand, a bidentate ligand, or a tridentate ligand, provided that when X is a tridentate ligand, one of the metal-ligand bonds may be broken upon activation; when n is 2, each X is an independently chosen monodentate ligand and may be the same as or different from other groups X. In general, the metal-ligand complex according to formula (I) is overall charge-neutral. In some embodiments, the monodentate ligand may be a monoanionic ligand. Monoanionic ligands have a net formal oxidation state of −1. Each monoanionic ligand may independently be hydride, $(C_1-C_{40})$hydrocarbyl carbanion (such as $(C_6-C_{40})$aryl carbanion), $(C_1-C_{40})$heterohydrocarbyl carbanion (such as $(C_4-C_{40})$heteroaryl carbonion), or halide.

In one or more embodiments of the metal-ligand of formula (I), $R^1$ is $(C_5-C_{40})$arylene covalently connected to M, the metal-ligand complex having a structure according to formula (III):

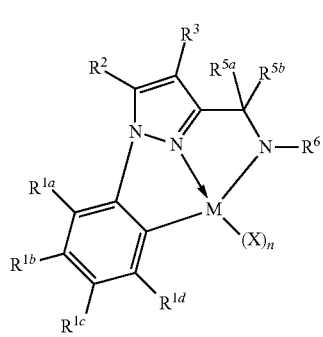

(III)

In embodiments of the metal-ligand structure of formula (III), in which $R^2$, $R^3$, $R^{5a}$, $R^{5b}$, $R^6$, M, X, and n are as defined in formula (I); and $R^{1a}$, $R^{1b}$, $R^{1c}$, and $R^{1d}$ are independently chosen from $(C_1-C_{40})$hydrocarbyl, $(C_1-C_{40})$heterohydrocarbyl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $R^CS(O)_2-$, $(R^C)_2C=N-$, $R^CC(O)O-$, $R^COC(O)-$, $R^CC(O)N(R)-$, $(R^C)_2NC(O)-$, halogen, or hydrogen. In some embodiments, any of $R^{1a}$ and $R^{1b}$, or $R^{1b}$ and $R^{1c}$, or $R^{1c}$ and $R^{1d}$ are covalently linked to form an aromatic ring or a non-aromatic ring.

In one or more embodiments of the metal-ligand of formula (III), $R^2$ and $R^3$ are covalently linked to form an aromatic ring, the metal-ligand complex having a structure according to formula (IV):

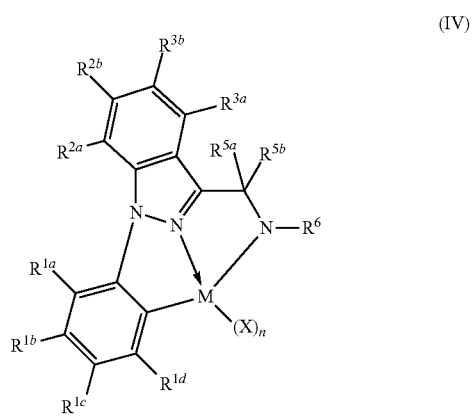

(IV)

In embodiments of the metal-ligand structure of formula (IV), $R^{1a}$, $R^{1b}$, $R^{1c}$, $R^{1d}$, $R^2$, $R^3$, $R^{5a}$, $R^{5b}$, $R^6$, M, X, and n are as defined in formula (III); and $R^{2a}$, $R^{2b}$, $R^{3a}$, and $R^{3b}$ a independently chosen from $(C_1-C_{40})$hydrocarbyl, $(C_1-C_{40})$heterohydrocarbyl, $-Si(R^C)_3$, $-Ge(R^C)$, $-P(R^P)_2$, $-N(R^N)_2$, $-OR^C$, $-SR^C$, $-NO_2$, $-CN$, $-CF_3$, $R^CS(O)-$, $R^CS(O)_2-$, $(R^C)_2C=N-$, $R^CC(O)O-$, $R^COC(O)-$, $R^CC(O)N(R)-$, $(R^C)_2NC(O)-$, halogen, or hydrogen.

Additionally, each X can be a monodentate ligand that, independently from any other ligands X, is a halogen, unsubstituted $(C_1-C_{20})$hydrocarbyl, unsubstituted $(C_1-C_{20})$heterohydrocarbyl. In some embodiments, each monodentate ligand X is a chlorine atom, $(C_1-C_{10})$hydrocarbyl (e.g., $(C_1-C_6)$alkyl or benzyl), or $(C_4-C_{12})$heteroaryl.

In further embodiments in which n is 2 or greater than 2, such that the metal-ligand complex according to formula (I) includes at least two groups X, any two groups X may be joined to form a bidentate ligand. In illustrative embodiments including a bidentate ligand, the bidentate ligand may be a neutral bidentate ligand. In one embodiment, the neutral bidentate ligand is a diene of formula $(R^D)_2C=C(R^D)-C(R^D)=C(R^D)_2$, wherein each $R^D$ independently is H, unsubstituted $(C_1-C_6)$alkyl, phenyl, or naphthyl. In some embodiments, the bidentate ligand is a monoanionic-mono(Lewis base) ligand. In some embodiments, the bidentate ligand is a dianionic ligand. The dianionic ligand has a net formal oxidation state of −2. In one embodiment, each dianionic ligand independently is $(C_2-C_{40})$hydrocarbylene dicarbanion, $(C_1-C_4)$heterohydrocarbylene dicarbanion, phosphate, or sulfate.

In further embodiments, X of formula (I) is monoanionic and selected from methyl; ethyl; 1-propyl; 2-propyl; 1-butyl;

2,2-dimethylpropyl; trimethylsilylmethyl; phenyl; benzyl; or chloro. In some embodiments n is 2 and each X is the same. In some instances, at least two X are different from each other. In other embodiments n is 2 and each X is a different one of methyl; ethyl; 1-propyl; 2-propyl; 1-butyl; 2,2-dimethylpropyl; trimethylsilylmethyl; phenyl; benzyl; and chloro. In one embodiment, n is 2 and at least two X independently are monoanionic monodentate ligands. In a specific embodiment, n is 2 and the two X groups join to form a bidentate ligand. In further embodiments, the bidentate ligand is 2,2-dimethyl-2-silapropane-1,3-diyl or 1,3-butadiene.

In specific embodiments of catalyst systems, the metal-ligand complex according to formula (I) may include, without limitation, a metal-ligand complex having the structure of any of Procatalysts 1-19:

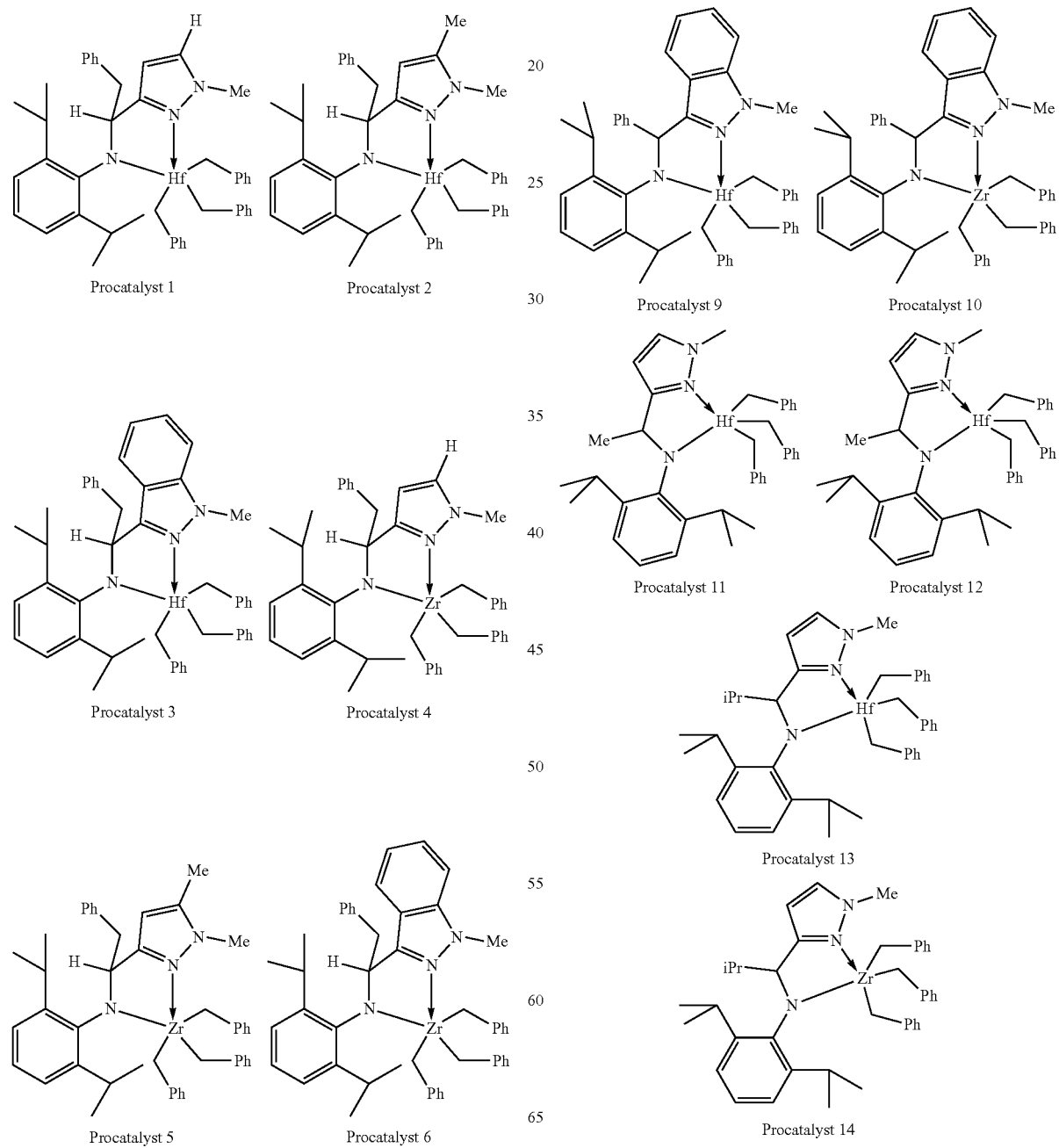

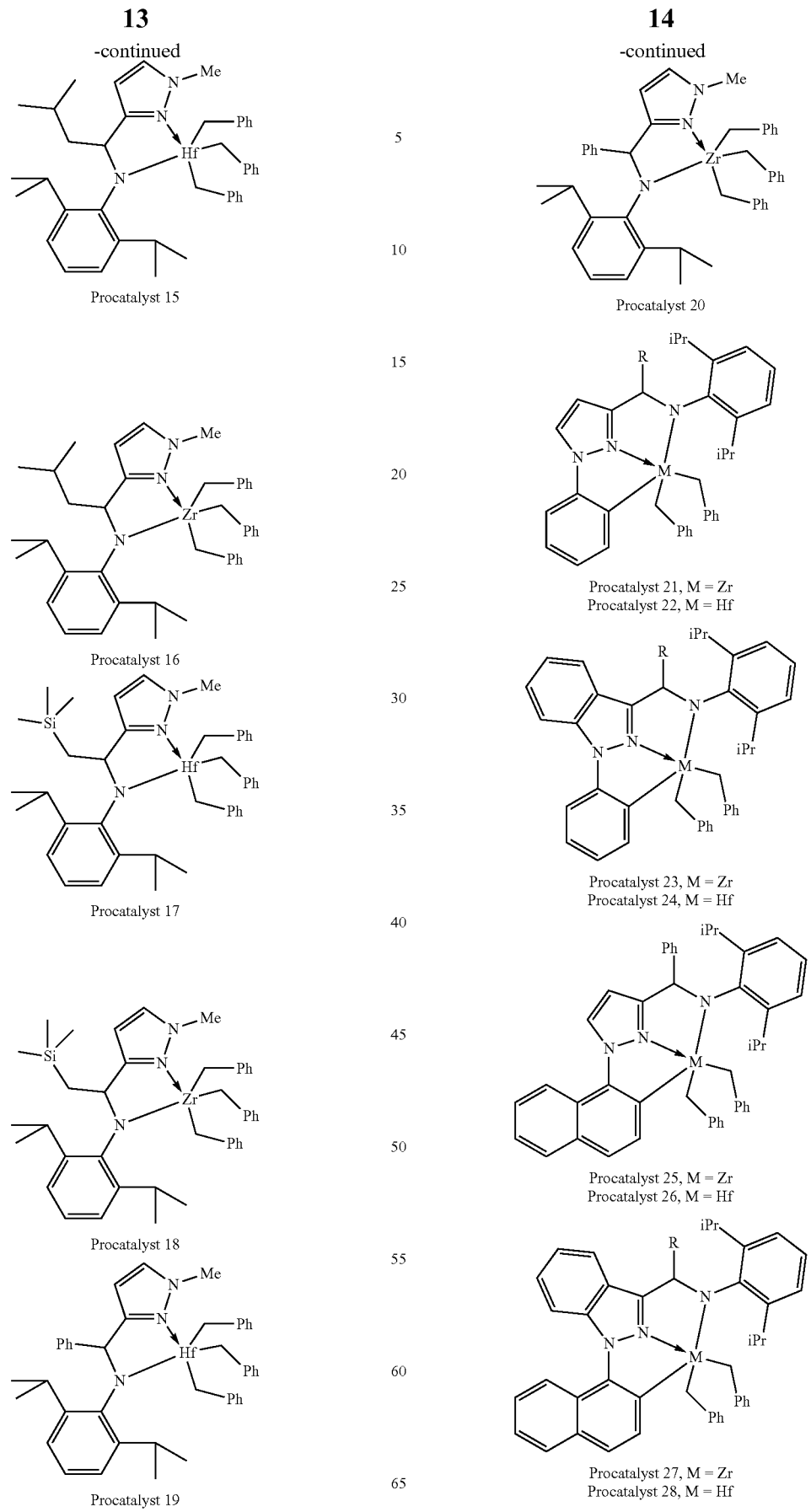

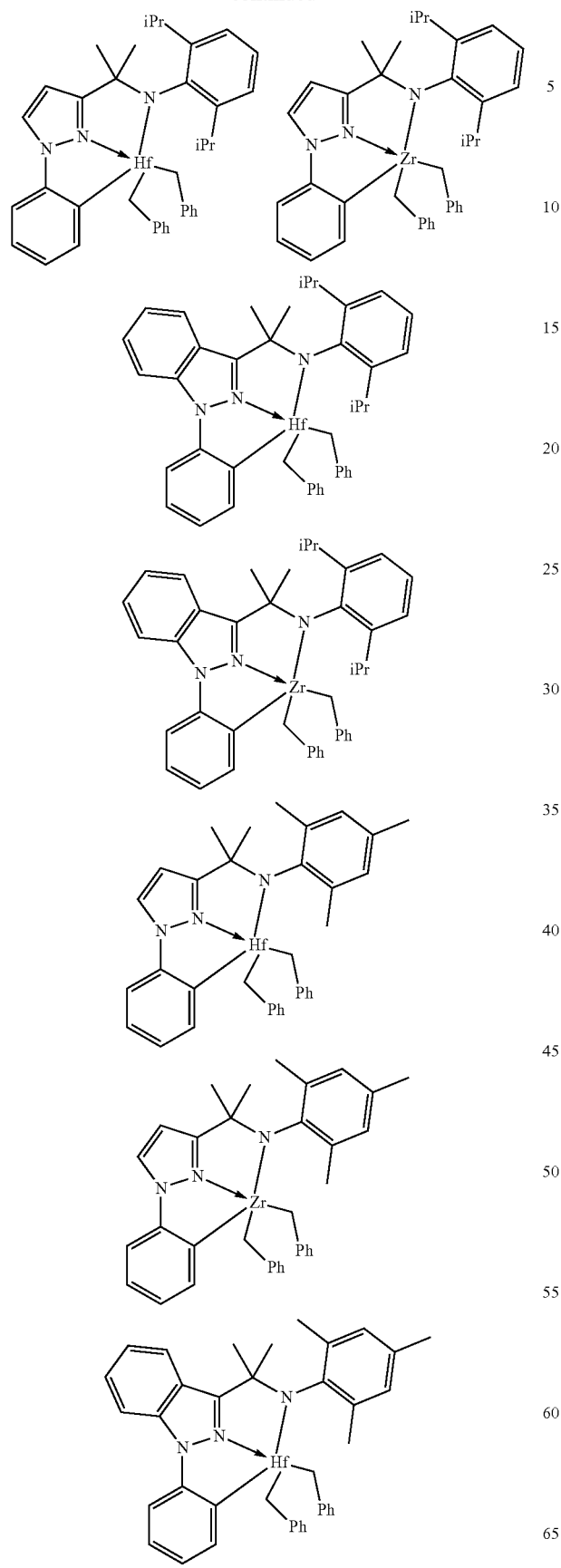
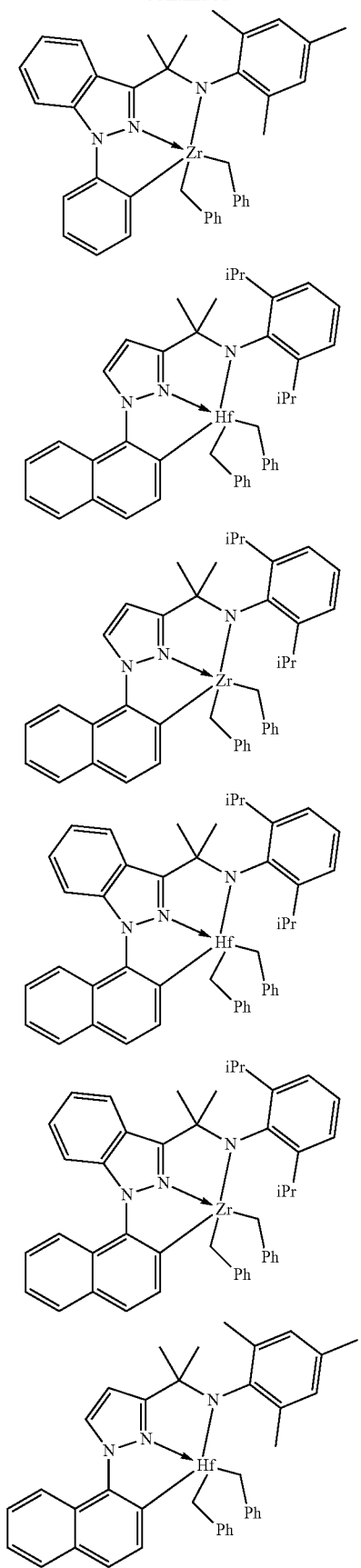

-continued
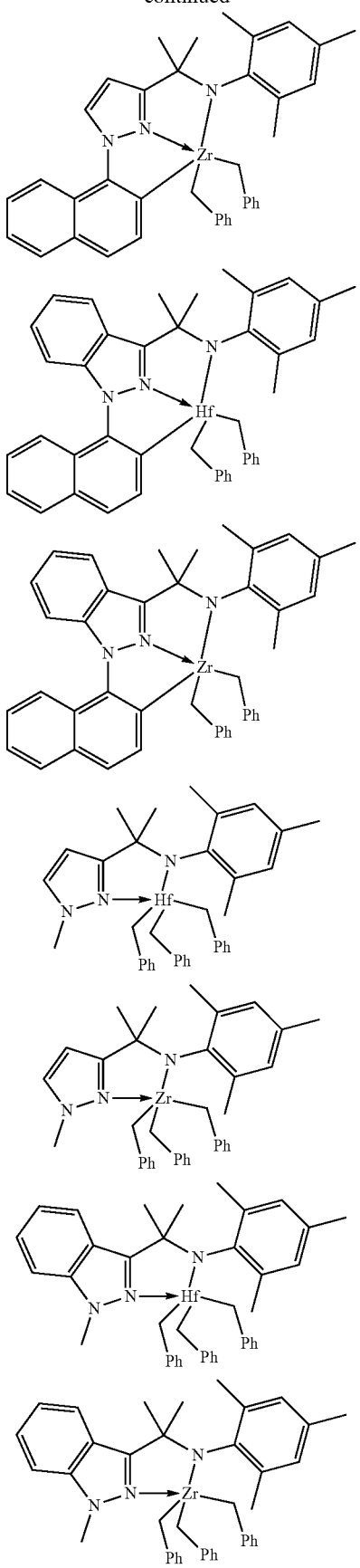
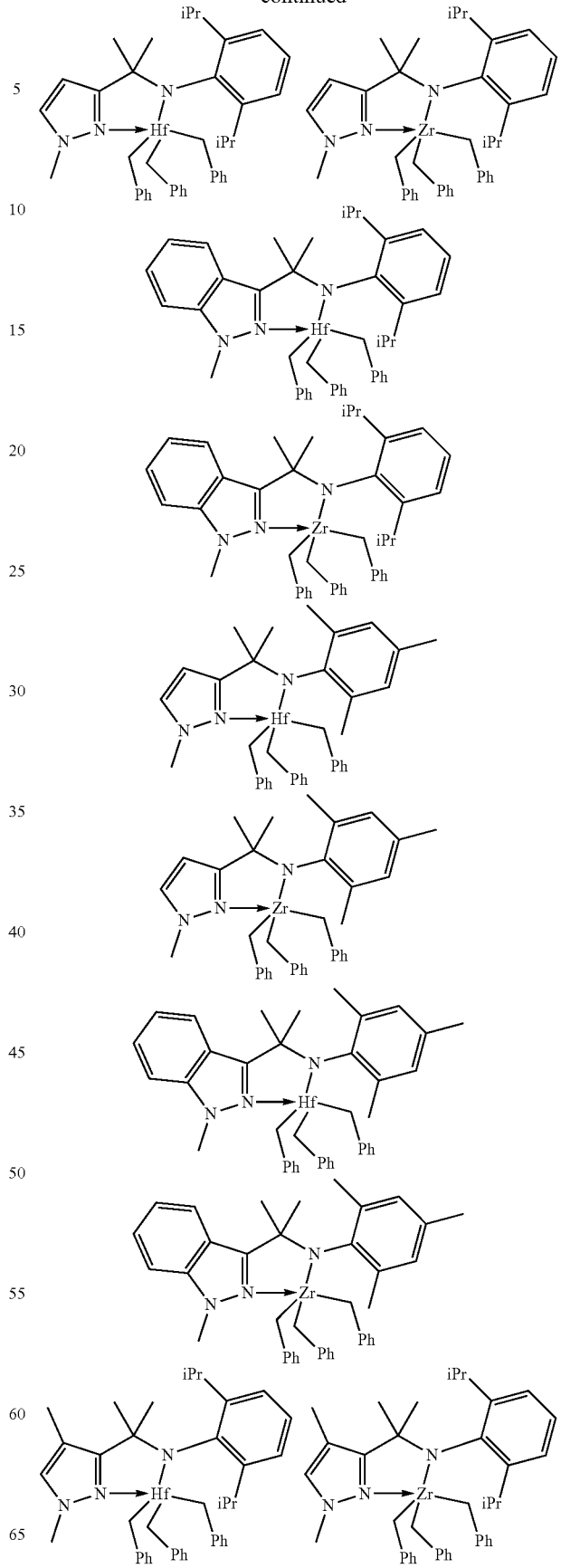

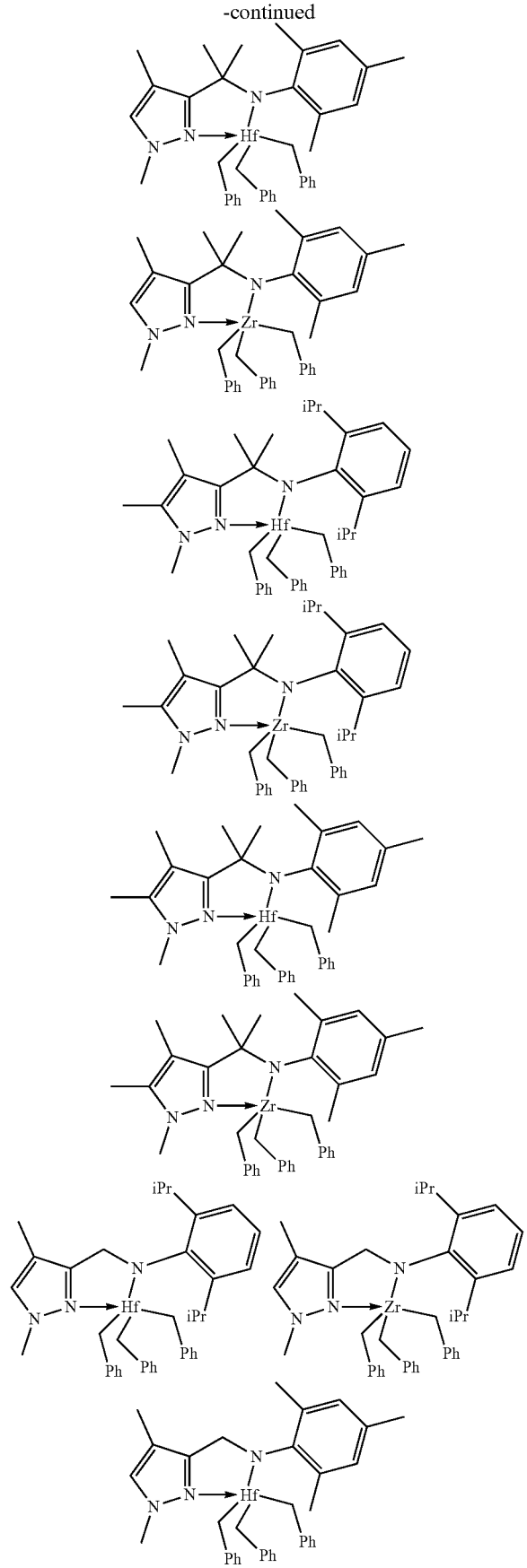
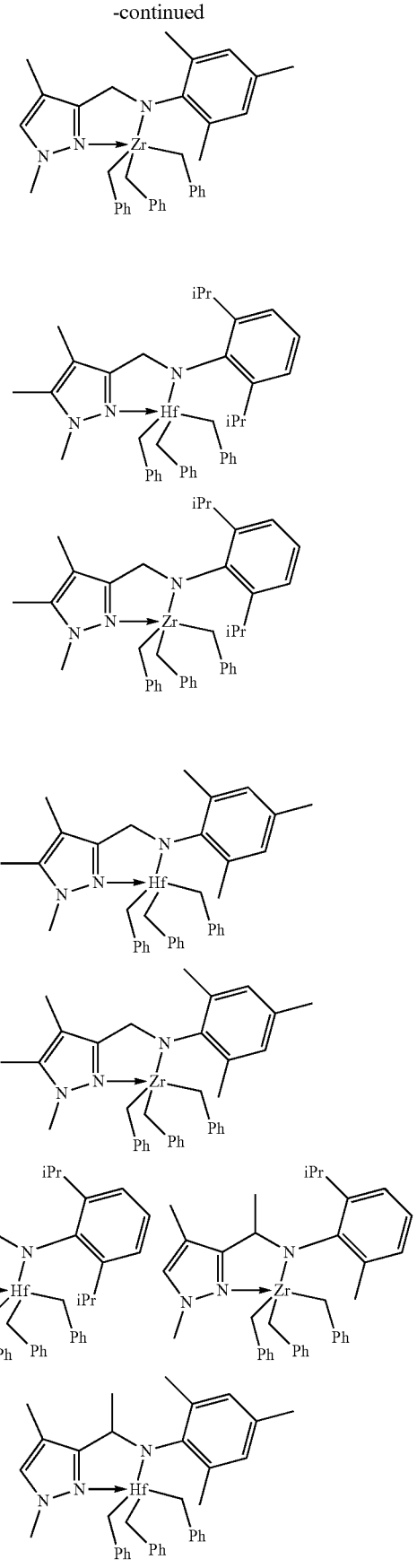

-continued

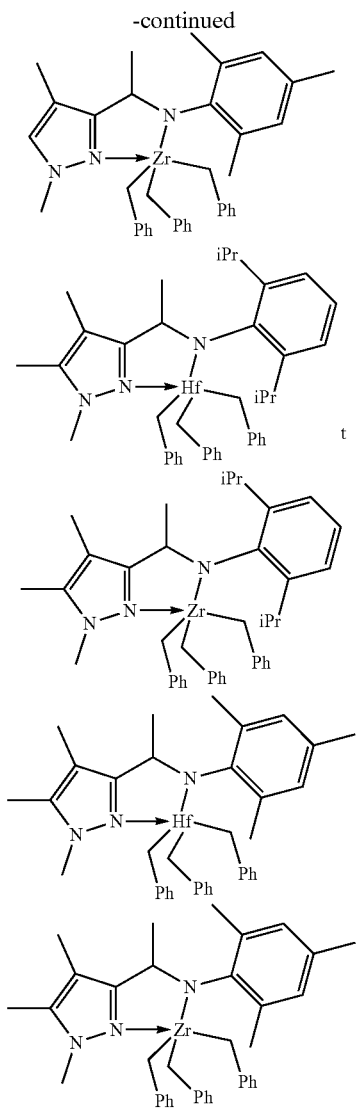

Cocatalyst Component

The catalyst system comprising a metal-ligand complex of formula (I) may be rendered catalytically active by any technique known in the art for activating metal-based catalysts of olefin polymerization reactions. For example, the procatalyst according to a metal-ligand complex of formula (I) may be rendered catalytically active by contacting the complex to, or combining the complex with, an activating co-catalyst. Additionally, the metal-ligand complex according for formula (I) includes both a procatalyst form, which is neutral, and a catalytic form, which may be positively charged due to the loss of a monoanionic ligand, such a benzyl or phenyl. Suitable activating co-catalysts for use herein include alkyl aluminums; polymeric or oligomeric alumoxanes (also known as aluminoxanes); neutral Lewis acids, and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activating co-catalysts include Group 13 metal compounds containing ($C_1$-$C_{20}$)hydrocarbyl substituents as described herein. In some embodiments. Group 13 metal compounds are tri(($C_1$-$C_{20}$)hydrocarbyl)-substituted-aluminum or tri(($C_1$-$C_{20}$)hydrocarbyl)-boron compounds. In other embodiments. Group 13 metal compounds are tri(hydrocarbyl)-substituted-aluminum, tri($C_1$-$C_{20}$)hydrocarbyl)-boron compounds, tri(($C_1$-$C_{10}$)alkyl)aluminum, tri(($C_6$-$C_{18}$)aryl) boron compounds, and halogenated (including perhalogenated) derivatives thereof. In further embodiments. Group 13 metal compounds are tris(fluoro-substituted phenyl)boranes, tris(pentafluorophenyl)borane. In some embodiments, the activating co-catalyst is a tris(($C_1$-$C_{20}$)hydrocarbyl borate (e.g. trityl tetrafluoroborate) or a tri(($C_1$-$C_{20}$)hydrocarbyl)ammonium tetra(($C_1$-$C_{20}$)hydrocarbyl)borane (e.g. bis(octadecyl)methylammonium tetrakis(pentafluorophenyl)borane). As used herein, the term "ammonium" means a nitrogen cation that is a (($C_1$-$C_{20}$)hydrocarbyl)$_4$N$^+$ a (($C_1$-$C_{20}$)hydrocarbyl)$_3$N(H)$^+$, a (($C_1$-$C_{20}$)hydrocarbyl)$_2$N(H)$_2$$^+$, ($C_1$-$C_{20}$)hydrocarbylN(H)$_3$$^+$, or N(H)$_4$$^+$, wherein each ($C_1$-$C_{20}$)hydrocarbyl, when two or more are present, may be the same or different.

Combinations of neutral Lewis acid activating co-catalysts include mixtures comprising a combination of a tri (($C_1$-$C_4$)alkyl)aluminum and a halogenated tri(($C_6$-$C_{18}$)aryl) boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane): (alumoxane) [e.g., (Group 4 metal-ligand complex):(tris (pentafluoro-phenylborane):(alumoxane)] are from 1:1:1 to 1:10:30, in other embodiments, from 1:1:1.5 to 1:5:10.

The catalyst system that includes the metal-ligand complex of formula (I) may be activated to form an active catalyst composition by combination with one or more cocatalysts, for example, a cation forming cocatalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to modified methyl aluminoxane (MMAO), bis(hydrogenated tallow alkyl)methyl, tetrakis(pentafluorophenyl)borate(1-) amine, and combinations thereof.

In some embodiments, more than one of the foregoing activating co-catalysts may be used in combination with each other. A specific example of a co-catalyst combination is a mixture of a tri(($C_1$-$C_4$)hydrocarbyl)aluminum, tri(($C_1$-$C_4$)hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl) borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

In some embodiments of the catalyst system of this disclosure, when more than one of the foregoing co-catalysts is used in combination, one of the co-catalysts may function as a scavenger. The purpose of the scavenger is to react with any water or other impurities present in the system that would otherwise react with the catalyst leading to reduced efficiency.

Polyolefins

Some embodiments of this disclosure include a polymerization process that includes contacting ethylene or propylene and optionally one or more olefins in the presence of the catalytic systems described in the preceding paragraphs. In some embodiments of the polymerization process, a single olefin or α-olefin is reacted in the presence of the catalyst system, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or in the alternative, from the group consisting of 1-hexene and 1-octene.

The ethylene-based polymers produced from the polymerization process, for example homopolymers and/or interpolymers (including copolymers) of ethylene and optionally one or more co-monomers such as α-olefins, may comprise from at least 50 mole percent (mol %) monomer units derived from ethylene. All individual values and subranges encompassed by "from at least 50 mol %" are disclosed herein as separate embodiments; for example, the ethylene-based polymers, homopolymers and/or interpolymers (including copolymers) of ethylene and optionally one or more co-monomers such as α-olefins may comprise at least 60 mol % monomer units derived from ethylene; at least 70 mol % monomer units derived from ethylene; at least 80 weight percent monomer units derived from ethylene; or from 50 to 100 mol % monomer units derived from ethylene; or from 80 to 100 mol % units derived from ethylene.

In some embodiments, the polymerization process produces ethylene-based polymers that comprise at least 90 mole percent units derived from ethylene. All individual values and subranges from at least 90 mole percent are included herein and disclosed herein as separate embodiments. For example, the ethylene-based polymers may comprise at least 93 mole percent units derived from ethylene; at least 96 mole percent units; at least 97 mole percent units derived from ethylene; or in the alternative, from 90 to 100 mole percent units derived from ethylene: from 90 to 99.5 mole percent units derived from ethylene; or from 97 to 99.5 mole percent units derived from ethylene.

In some embodiments of the ethylene-based polymer produced by the polymerization system of this disclosure, the amount of additional α-olefin is less than 50 mol %; other embodiments include at least 0.5 mol % to 25 mol %; and in further embodiments the amount of additional α-olefin includes at least 5 mol % to 10 mol %. In some embodiments, the additional α-olefin is 1-octene.

Any conventional polymerization processes may be employed to produce the ethylene based polymers. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene-based polymer may be produced via solution polymerization in a dual reactor system, for example a dual loop reactor system, wherein ethylene and optionally one or more α-olefins are polymerized in the presence of the catalyst system, as described herein, and optionally, one or more co-catalysts. In another embodiment, the ethylene-based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene-based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene-based polymer may be produced via solution polymerization in a single reactor system, for example a single loop reactor system, in which ethylene and optionally one or more α-olefins are polymerized in the presence of the catalyst system, as described within this disclosure, and optionally one or more cocatalysts, as described in the preceding paragraphs.

The ethylene-based polymers may further comprise one or more additives. Such additives include, but are not limited to, antistatic agents, color enhancers, dyes, lubricants, pigments, primary antioxidants, secondary antioxidants, processing aids. UV stabilizers, and combinations thereof. The ethylene-based polymers may contain any amounts of additives. The ethylene-based polymers may compromise from about 0 to about 10 percent by the combined weight of such additives, based on the weight of the ethylene-based polymers and the one or more additives. The ethylene-based polymers may further comprise fillers, which may include, but are not limited to, organic or inorganic fillers. The ethylene-based polymers may contain from about 0 to about 20 weight percent fillers such as, for example, calcium carbonate, talc, or $Mg(OH)_2$, based on the combined weight of the ethylene-based polymers and all additives or fillers. The ethylene-based polymers may further be blended with one or more polymers to form a blend.

In some embodiments, a polymerization process for producing an ethylene-based polymer may include polymerizing ethylene and at least one additional α-olefin in the presence of a catalyst system, wherein the catalyst system incorporates at least one metal-ligand complex of formula (I). The polymer resulting from such a catalyst system that incorporates the metal-ligand complex of formula (I) may have a density according to ASTM D792 (incorporated herein by reference in its entirety) from 0.850 g/cm³ to 0.950 g/cm³, from 0.880 g/cm³ to 0.920 g/cm³, from 0.880 g/cm³ to 0.910 g/cm³, or from 0.880 g/cm³ to 0.900 g/cm³, for example.

In another embodiment, the polymer resulting from the catalyst system that includes the metal-ligand complex of formula (I) has a melt flow ratio ($I_{10}/I_2$) from 5 to 15, in which melt index $I_2$ is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 10, and in others, the melt flow ratio is from 5 to 9.

In some embodiments, the polymer resulting from the catalyst system that includes the metal-ligand complex of formula (I) has a molecular-weight distribution (MWD) from 1.5 to 25, where MWD is defined as $M_w/M_n$ with $M_w$ being a weight-average molecular weight and $M_n$ being a number-average molecular weight. All individual values and subranges encompassed by "from 1.5 to 25" are disclosed herein as separate embodiments; for example, the polymers resulting from the catalyst system have a MWD from 1.5 to 6. Another embodiment includes a MWD from 1.5 to 3; and other embodiments include MWD from 2 to 2.5.

Embodiments of the catalyst systems described in this disclosure yield unique polymer properties as a result of the high molecular weights of the polymers formed and the amount of the co-monomers incorporated into the polymers.

EXAMPLES

Experimental Procedures

Commercially available aldehydes were used as received without further purification. Commercially available amines and anilines were pushed through a plug of alumina prior to use. Deuterated solvents for NMR spectroscopy were purchased from Cambridge Isotope Laboratories. Data for ambient temperature $^1H$ and $^{13}C$ NMR spectra were collected using a Varian 400-MR spectrometer. Manipulations were performed using an inert atmosphere glovebox or via standard Schlenk techniques unless otherwise noted. Gases, solvents (including benzene-$d_6$ and toluene-$d_8$), and monomers were passed through alumina under inert atmosphere to remove oxygen and water prior to storage over 3 A sieves.

Parallel Pressure Reactor

Polymerization runs were performed in a Symyx Parallel Pressure Reactor (PPR) under the conditions noted below. The resulting polymers were dried in a vacuum oven and analyzed by gel permeation chromatography (GPC) and FT-IR spectroscopy unless otherwise noted.

Semi-Batch Reactor

Batch reactor polymerizations were performed in two-liter or one-gallon Parri reactors heated by an electric heating mantle and cooled via internal water-cooled coil. The reactor system is controlled and monitored by a Camile™ TG process computer. The reactor is preloaded with hydrocarbon solvent before olefin monomer is loaded into the reactor under nitrogen pressure from a shot tank possibly containing additional hydrocarbon solvent. The reactor is then brought to the initial temperature set point before gaseous monomers are added according to the desired Camile™ program settings. Precatalyst and activator solutions are prepared separately according to the desired stoichiometry, concentration, and overall polymerization reaction conditions in an inert atmosphere glovebox and then mixed before transfer into the reactor. Ethylene is again added and monitored as controlled by a MicroMotion™ flow meter in conjunction with the defined Camile™ run program. Injection of the precatalyst/activator solution initiates the polymerization reaction run timer. Polymer samples and other reactor components are recovered in a stainless steel pot containing antioxidant and/or catalyst quench and vented with a nitrogen gas purge. Polymer is then dried more rigorously in a vacuum oven at 140° C.

Polymer Characterization

Polymer molecular weight distribution was measured using a Robotic-Assisted Dilution High Temperature Gel Permeation Chromatographer (SymRAD-GPC). Polymer samples were dissolved at a concentration of 1-10 mg/mL in 1,2,4-trichlorobenzene (stabilized with 300 ppm butylated hydroxytoluene) at 170° C. and passed through mixed-B columns (300 mm×10 mm) at 160° C. with a flow rate of 2.0 mL/min. Sample detection was performed using a PolyChar IR4 detector in concentration mode. A conventional calibration of narrow polystyrene (PS) standards was utilized, with apparent units adjusted to polyethylene (PE) using known coefficients for PS and PE in TCB at 160° C. Decane was used as a flow marker to ensure flow-rate integrity for both the calibration set and the experimental samples. Comonomer incorporation was measured by FT-IR spectroscopy of automated drop cast polymer films on silicon wafers using a Tecan MiniPrep 75 deposition station and analyzed using a *NEXUS* 670 E.S.P. FT-IR spectrometer. TCB is evaporated at 160° C. under nitrogen purge.

EXAMPLES

Examples 1 to 44 are synthetic procedures for intermediates of ligands, for ligands themselves, and for isolated procatalysts including the ligands. Examples 45 and 46 describe polymerization results obtained from metal-ligand complexes prepared according to Examples 1-4. It should be understood that Examples 1-44 are provided to illustrate embodiments described in this disclosure and are not intended to limit the scope of this disclosure or its appended claims.

Example 1—Synthesis of the Proligand 1

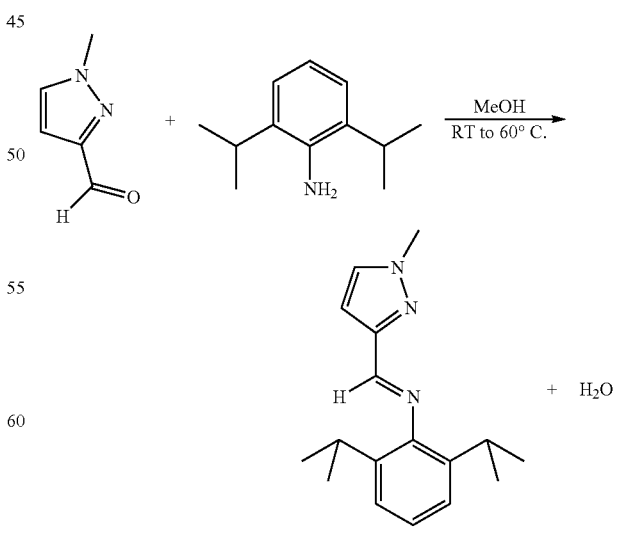

Proligand 1

A 60 mL glass jar with a magnetic stir bar was charged with 1-methyl-1H-pyrazole-3-carboxaldehyde (2.99 g, 27.15 mmol) and methanol (15 mL). Neat 2,6-diisopropylaniline (5.3 mL, 5.0 g, 28 mmol) was added by syringe to the stirred solution at ambient temperature. The mixture was blanketed with $N_2$ and allowed to stir. The sealed jar was warmed in a 60° C. heating block. After 24 hours, the jar was removed from the heating block, and the pale yellow solution was allowed to slowly cool to ambient temperature. A colorless crystalline solid formed upon cooling. The mother liquid was decanted through a PTFE frit. The colorless, crystalline solid was triturated with hexanes (3×10 mL) by shaking the suspension in the reaction vessel. The triturated colorless solid was transferred to a 20 mL glass scintillation vial and dried under vacuum to afford a colorless solid in 93% yield (6.82 g, 25.3 mmol). NMR data are consistent with the desired product. $^1$H NMR (400 MHz, benzene-$d_6$) δ 8.55 (d, J=0.7 Hz, 1H), 7.17 (d, J=3.1 Hz, 3H), 7.05 (d, J=2.3 Hz, 1H), 6.55 (dd, J=2.4, 0.8 Hz, 1H), 3.29 (hept, J=6.9 Hz, 2H), 3.10 (s, 3H), 1.19 (d, J=6.8 Hz, 11H). $^{13}$C NMR (101 MHz, benzene-$d_6$) δ 156.80, 151.34, 150.19, 137.88, 131.32, 128.06, 124.60, 123.48, 104.79, 38.43, 28.45, 23.71.

Example 2—Synthesis of Proligand 7

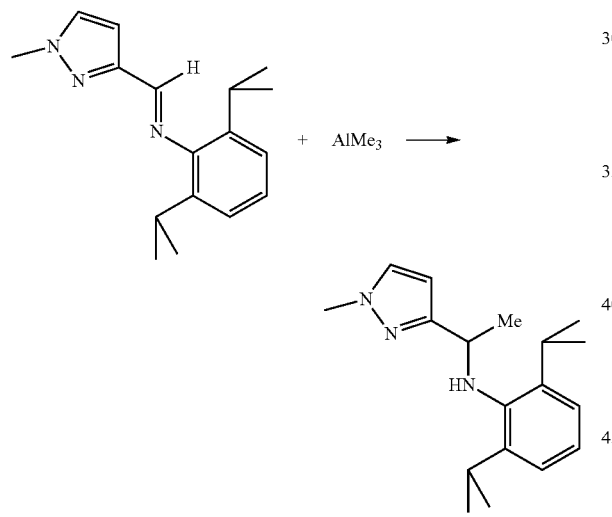

A 120 mL glass jar under inert atmosphere was charged with proligand 1 (0.813 g, 3.02 mmol), a magnetic stir bar, and toluene (30 mL), forming a colorless solution upon stirring. A 2 M solution of trimethylaluminum in hexanes (3.0 mL, 6.0 mmol) was added dropwise by syringe to the stirred aldimine solution at ambient temperature. The solution color changed to yellow during addition. The mixture was allowed to stir in the glovebox overnight at ambient temperature. The yellow solution was sequentially quenched via dropwise addition of anhydrous isopropanol (3.0 mL, 2.4 g, 40 mmol) over several minutes to control heat, effervescence, and methane releases. The colorless solution was allowed to cool to ambient temperature while stirring and then vented to the glovebox atmosphere. In the fume hood, the organic phase was shaken with brine (20 mL), followed by 0.5 M NaOH (20 mL), and separated. The basic aqueous phase was extracted with methylene chloride (3×20 mL), and the combined organic phases were dried over anhydrous magnesium sulfate, filtered, and evacuated to dryness on the rotavap. The crude colorless solid was suspended in methanol (3 mL) and filtered, leaving the insoluble aldimine starting material behind. The colorless methanol solution was concentrated to a pale yellow oil (rotavap), which was further dried under vacuum. The product was isolated in 61% yield (0.528 g, 1.85 mmol) as a pale yellow oil. $^1$H NMR (400 MHz, benzene-$d_6$) δ 7.11 (qd, J=5.3, 1.4 Hz, 1H), 6.58 (s, 0H), 5.97 (s, 0H), 4.49 (qd, J=6.8, 1.4 Hz, 0H), 3.73 (s, 0H), 3.51 (heptd, J=6.8, 1.4 Hz, 1H), 3.18 (s, 1H), 1.65 (dd, J=6.7, 1.4 Hz, 1H), 1.24 (dd, J=6.9, 1.4 Hz, 2H), 1.15 (dd, J=6.8, 1.4 Hz, 2H). $^{13}$C NMR (101 MHz, benzene-$d_6$) δ 156.08, 142.91, 142.36, 129.78, 123.96, 123.82, 103.53, 54.67, 38.15, 28.07, 24.43, 24.37, 23.71, 21.80.

Example 3—Synthesis of Proligand 8

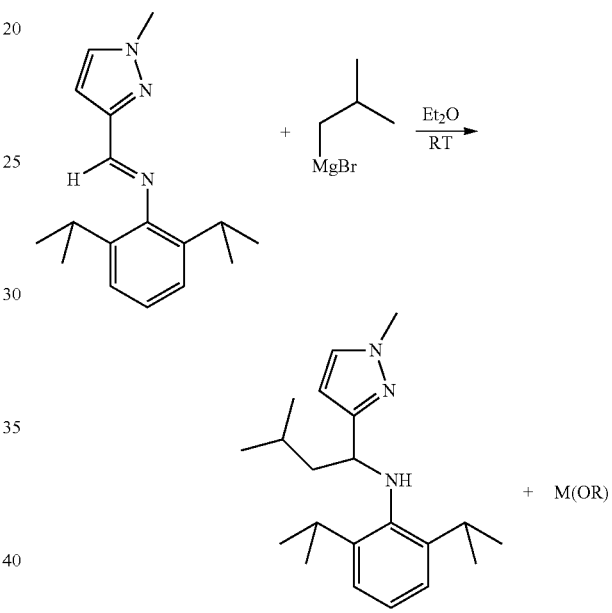

A 30 mL glass jar under inert atmosphere was charged with a magnetic stir bar, proligand 1 (0.6905 g, 2.563 mmol), and toluene (20 mL). A 2 M solution of isobutylmagnesium bromide in ether (3.0 mL, 6.0 mmol) was added by syringe to the stirred colorless solution at ambient temperature. The jar was capped, and the dark red mixture was allowed to stir overnight before quenching with anhydrous isopropanol. The crude colorless solid was isolated via aqueous workup before suspending in toluene (15 mL) and removing residual salts by filtration. The crude product mixture was dried and extracted with hexanes to remove unreacted aldimine starting material. The product was isolated as a colorless oil in 34% yield (0.289 g, 0.882 mmol). NMR data of the separated material are consistent with the desired product. $^1$H NMR (400 MHz, benzene-$d_6$) δ 7.13-7.03 (m, 3H), 6.51 (dd, J=2.2, 0.8 Hz, 1H), 5.80 (dd, J=2.2, 0.9 Hz, 1H), 4.40 (dd, J=10.0, 5.2 Hz, 1H), 3.69 (s, 1H), 3.54-3.47 (m, 2H), 3.15 (d, J=0.9 Hz, 3H), 2.23 (dddd, J=13.1, 9.9, 4.8, 0.9 Hz, 1H), 2.04 (dddd, J=13.0, 9.1, 5.2, 0.9 Hz, 1H), 1.88-1.74 (m, 1H), 1.28 (dd, J=6.9, 0.9 Hz, 6H), 1.16 (dd, J=6.8, 0.9 Hz, 6H), 0.96 (dd, J=9.5, 6.6, 0.9 Hz, 6H). $^{13}$C NMR (101 MHz, benzene-$d_6$) δ 154.81, 142.63, 142.41, 129.49, 128.06, 123.80, 123.69, 123.49, 104.33, 57.68, 46.05, 38.16, 28.03, 25.60, 24.57, 24.39, 23.88, 22.09.

Example 4—Synthesis of Proligand 9

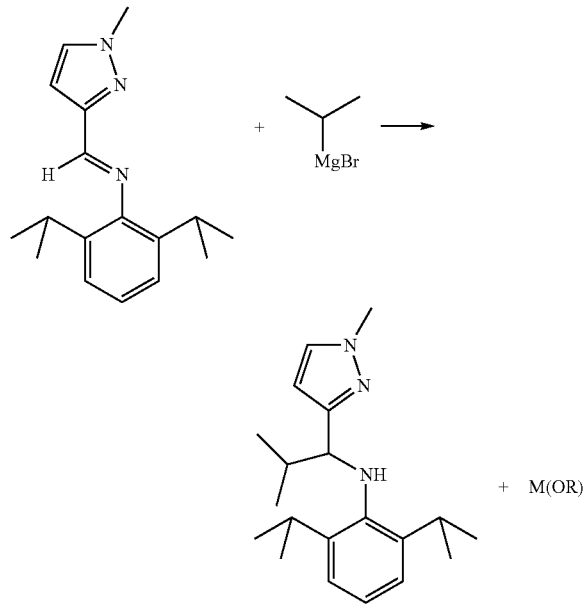

A 30 mL glass jar under inert atmosphere was charged with a magnetic stir bar, proligand 1 (0.6812 g, 2.539 mmol), and toluene (20 mL). A 1.3 M solution of isopropyl Turbo Grignard in tetrahydrofuran (4.6 mL, 6.0 mmol) was added by syringe to the stirred colorless solution at ambient temperature. The yellow-orange mixture was allowed to stir overnight before quenching with anhydrous isopropanol. The crude product was isolated via aqueous workup and then suspended in toluene (15 mL) and filtered by gravity to remove residual salts. The solution was evacuated to dryness overnight to afford a glassy colorless solid in 69% yield (0.550 g, 1.754 mmol). $^1$H NMR (400 MHz, benzene-$d_6$) δ 7.12-6.99 (m, 3H), 6.47 (d, J=2.1 Hz, 1H), 5.71 (dd, J=2.1, 0.5 Hz, 1H), 4.15 (dd, J=11.0, 6.9 Hz, 1H), 3.92 (d, J=10.8 Hz, 1H), 3.56 (hept, J=6.8 Hz, 3H), 3.13 (s, 3H), 2.46 (h, J=6.8 Hz, 1H), 1.33 (d, J=6.8 Hz, 3H), 1.27 (d, J=6.9 Hz, 6H), 1.16 (d, J=6.8 Hz, 6H), 1.12 (d, J=6.7 Hz, 3H). $^{13}$C NMR (101 MHz, benzene-$d_6$) δ 153.49, 141.83, 129.17, 128.06, 123.80, 123.31, 105.39, 65.12, 38.16, 33.88, 27.93, 24.50, 24.34, 20.72, 19.68.

Example 5—Synthesis of Proligand 10

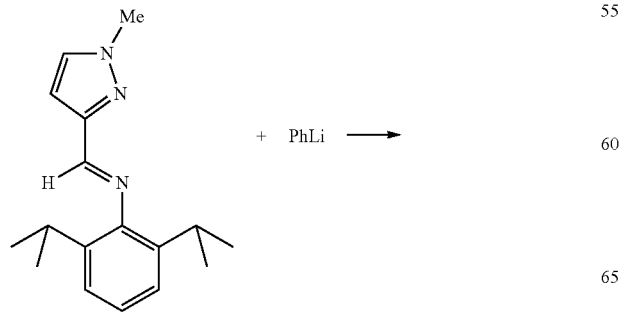

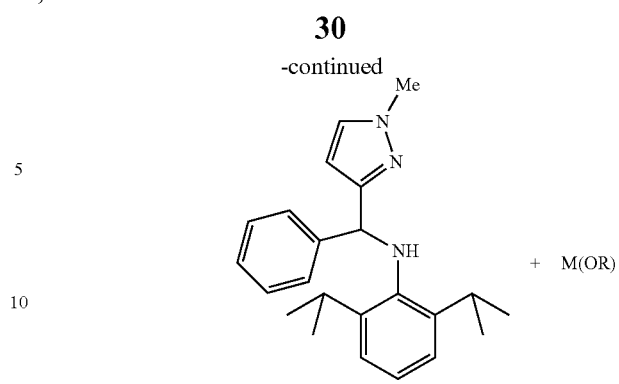

A 30 mL glass jar under inert atmosphere was charged with a 0.1 M solution of proligand 1 in toluene (6.0 mL, 0.60 mmol) at ambient temperature. The jar was cooled at −35° C. for 90 minutes before adding a cold, orange 1.8 M solution of phenyllithium in dibutyl ether (3.6 mL, 6.5 mmol) by syringe. The mixture was allowed to warm to ambient temperature overnight and then quenched with anhydrous isopropanol (3.0 mL). The mixture was concentrated to a viscous liquid under vacuum before extraction with methylene chloride (20 mL). After brine wash (2×30 mL), the organic layer was dried over anhydrous magnesium sulfate and filtered. The material was dried and isolated as a solid in 80% yield (0.166 g, 0.478 mmol). $^1$H NMR (400 MHz, benzene-$d_6$) δ 7.55-7.50 (m, 1H), 7.15-6.97 (m, 7H), 6.56 (dd, J=2.2, 0.8 Hz, 1H), 5.98 (dd, J=2.2, 0.9 Hz, 1H), 5.45 (s, 1H), 4.42 (s, 1H), 3.41 (pd, J=6.8, 0.8 Hz, 2H), 3.12 (d, J=0.9 Hz, 3H), 1.16 (dd, J=6.8, 0.9 Hz, 6H), 1.09 (dd, J=6.9, 0.9 Hz, 6H). $^{13}$C NMR (101 MHz, benzene-$d_6$) δ 154.90, 144.18, 143.10, 142.72, 130.07, 129.06, 128.43, 128.12, 128.06, 127.52, 127.47, 127.19, 124.22, 123.93, 104.34, 64.30, 38.19, 28.07, 24.53, 24.31.

Example 6—Synthesis of Proligand 11

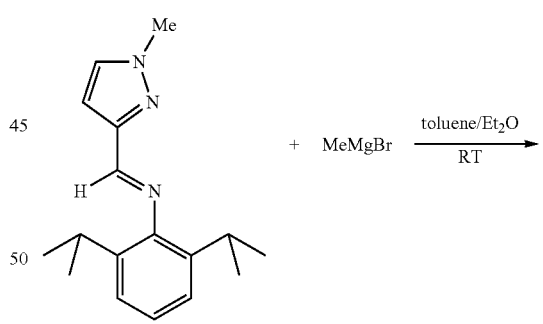

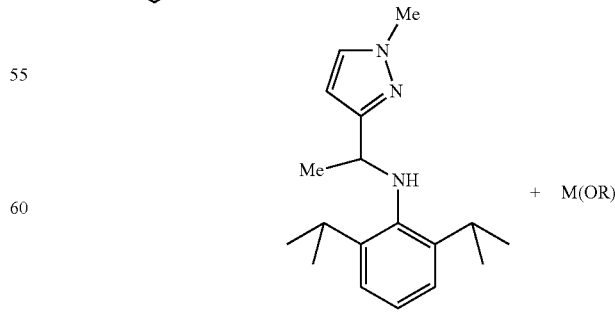

A 30 mL glass jar under inert atmosphere was charged with a magnetic stir bar, proligand 1 (0.6932 g, 2.573 mmol), and toluene (20 mL), to form a colorless solution. A 3 M ether solution of methylmagnesium bromide (2.0 mL, 6.0 mmol) was added by syringe to the stirred solution at ambient temperature. The solution color immediately change from pale yellow to red on addition, and a precipitate formed shortly thereafter. The mixture was allowed to stir overnight at ambient temperature before quenching with isopropanol. The product was isolated in the hood using an aqueous workup (methylene chloride) and drying over anhydrous magnesium sulfate. The crude material was taken into the glovebox, extracted with toluene, filtered, and dried to obtain the product as a colorless oil, isolated in 30% yield (0.217 g, 0.760 mmol). NMR data provided above.

Example 7—Synthesis of Proligand 9

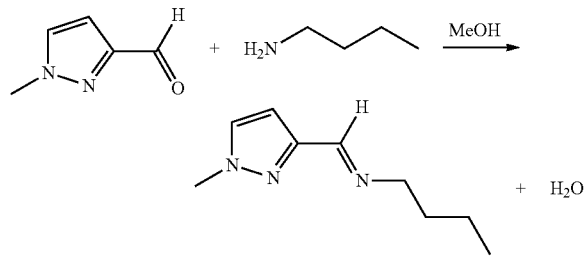

A 50 mL RB flask in the fume hood was charged with 1-methyl-1H-pyrazole-3-carboxaldehyde (0.503 g, 4.57 mmol) and methanol (10 mL). A stir bar was added and neat n-butylamine (1.6 mL, 1.2 g, 16 mmol) was added by syringe at ambient temperature. A catalytic amount of glacial acetic acid (3-4 drops, <80 mg) was added, and the pale yellow mixture was allowed to stir overnight. After 16 hours, GC-MS analysis confirmed the desired product as the major species. Volatiles were removed on the rotavap, leaving a colorless oil. The crude material was taken up in methylene chloride (20 mL) and washed with water (10 mL) in a separatory funnel. The organic phase was dried over anhydrous magnesium sulfate, filtered, and evacuated to dryness to afford a pale yellow oil in 72% yield (0.54 g, 3.3 mmol). $^1$H NMR (400 MHz, chloroform-d) δ 8.30-8.21 (m, 1H), 7.32 (t, J=1.9 Hz, 1H), 6.67 (t, J=2.0 Hz, 1H), 3.91 (d, J=1.6 Hz, 3H), 3.57 (tt, J=7.1, 1.5 Hz, 2H), 1.66 (pd, J=7.2, 1.5 Hz, 2H), 1.35 (hd, J=7.3, 1.6 Hz, 2H), 0.91 (td, J=7.3, 1.6 Hz, 3H). $^{13}$C NMR (101 MHz, chloroform-d) δ 154.83, 150.49, 131.44, 104.62, 77.16, 61.69, 39.23, 32.95, 20.49, 13.97.

Example 8—Synthesis of Proligand 11

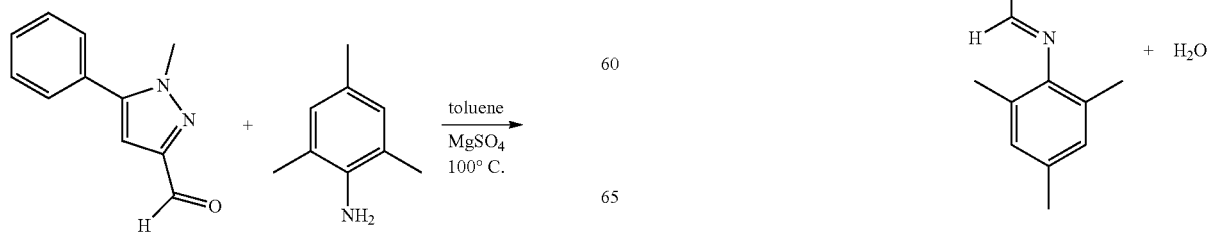

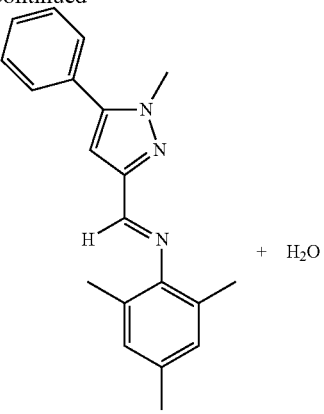

A 60 mL jar in the fume hood was charged with 1-methyl-5-phenyl-1H-pyrazole-3-carbaldehyde (1.0495 g, 5.636 mmol), toluene (20 mL), and p-toluene sulfonic acid monohydrate (50 mg), and a magnetic stir bar, forming a pale yellow solution upon stirring. Neat 2,4,6-trimethylaniline (0.90 mL, 0.87 g, 6.4 mmol) was added dropwise. The jar was capped and warmed in a 100° C. block, venting periodically to prevent overpressure. The orange mixture was allowed to stir overnight. After 36 hours at 100° C., volatiles were removed under vacuum. The red oil was taken up in methylene chloride and successively washed with water (30 mL) and brine (30 mL). The organic phase was dried over anhydrous magnesium sulfate, and volatiles were removed on the rotavap. The beige solid was suspended as a slurry in hexanes (5 mL), decanted, and dried overnight under vacuum. The product was recovered in 92% yield (1.581 g, 5.211 mmol). $^1$H NMR (400 MHz, chloroform-d) δ 8.24 (d, J=1.1 Hz, 1H), 7.53-7.39 (m, 6H), 7.00 (s, 1H), 6.89 (s, 2H), 3.96 (d, J=1.2 Hz, 3H), 2.28 (s, 3H), 2.15 (s, 6H). $^{13}$C NMR (101 MHz, chloroform-d) δ 186.65, 156.91, 145.53, 130.23, 129.40, 129.07, 129.03, 128.97, 128.93, 128.84, 127.28, 105.01, 77.16, 38.55, 38.12, 31.74, 22.80, 20.90, 18.38, 17.71, 14.27.

Example 9—Synthesis of Proligand 12

A 60 mL jar in the fume hood was charged with 1-methyl-1H-indazole-3-carbaldehyde (0.9936 g, 6.203 mmol), toluene (20 mL), p-toluene sulfonic acid monohydrate (50 mg), and a magnetic stir bar, forming a pale yellow solution upon stirring. Neat 2,4,6-trimethylaniline (1.0 mL, 0.96 g, 7.1 mmol) was added by syringe. The jar was capped and warmed in a 100° C. aluminum block, venting periodically to prevent overpressure. After 36 hours at 100° C., the red-orange solution was transferred to a round bottom flask, and volatiles were removed on the rotavap. The red oil was taken up in methylene chloride and washed with water (30 mL) and then brine (30 mL). The organic phase was dried over anhydrous magnesium sulfate, leaving a red oil after drying. The crude mixture was suspended in hexanes and cooled in −10° C. freezer to afford a fine orange powder (some orange crystals).

Example 10—Synthesis of Procatalyst 11

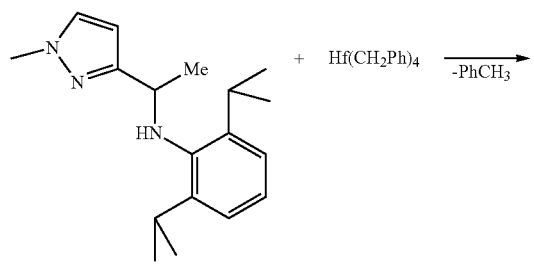

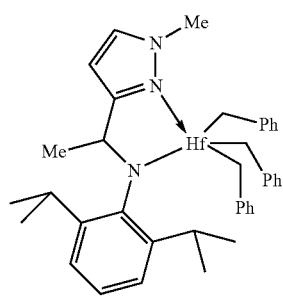

A glass vial in the glovebox was charged proligand 7 (see Example 2) (11.4 mg, 0.0399 mmol) and $C_6D_6$ (2.0 mL). This colorless 20 mM solution was combined with a yellow 20 mM solution of tetrabenzylhafnium $C_6D_6$ at ambient temperature and diluted with an equal part of fresh $C_6D_6$ for a final concentration ca. 7 mM for each reagent. The reaction was complete on standing in less than 2 h, as measured by NMR spectroscopy. $^1$H NMR (400 MHz, benzene-$d_6$) δ 7.23-7.11 (m, 3H), 6.16 (d, J=2.4 Hz, 1H), 5.51 (d, J=2.4 Hz, 1H), 4.65 (q, J=6.8 Hz, 1H), 3.92 (p, J=6.8 Hz, 1H), 2.95 (p, J=6.7 Hz, 1H), 2.54 (s, 3H), 1.42 (d, J=6.8 Hz, 3H), 1.26 (d, J=6.7 Hz, 3H), 1.18 (dd, J=6.8, 5.6 Hz, 6H), 0.94 (d, J=6.8 Hz, 3H).

Example 11—Synthesis of Procatalyst 7

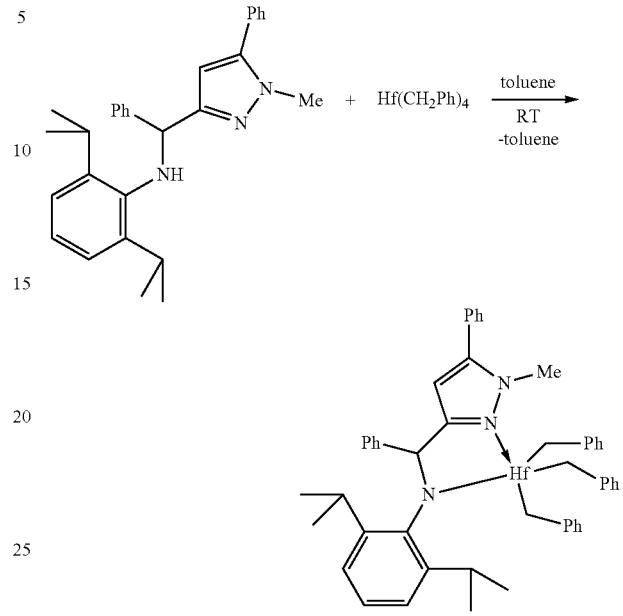

A 25 mL glass jar in the glovebox was charged with a stir bar, a 78 mM toluene solution of proligand 5 (2.7 mL, 0.21 mmol), and toluene (3 mL). While stirring at ambient temperature, a 50 mM toluene solution of tetrabenzyl hafnium (4.0 mL, 0.20 mmol) was added dropwise. The mixture was allowed to react in the glovebox at ambient temperature overnight. Volatiles were removed in vacuo and washed with hexanes. A cream-colored solid was recovered and stored at ambient temperature. $^1$H NMR (400 MHz, benzene-$d_6$) δ 7.23-7.18 (m, 2H), 7.15-7.10 (m, 11H), 7.06-6.92 (m, 7H), 6.83 (s, 10H), 6.78-6.74 (m, 2H), 5.75 (s, 1H), 5.54 (s, 1H), 3.54 (dhept, J=26.9, 6.7 Hz, 2H), 2.80 (s, 3H), 1.51 (d, J=6.8 Hz, 3H), 1.45 (d, J=6.8 Hz, 3H), 1.33 (d, J=6.7 Hz, 3H), 0.17 (d, J=6.6 Hz, 3H). $^{13}$C NMR (101 MHz, benzene-$d_6$) δ 160.06, 148.77, 147.63, 146.17, 144.13, 143.60, 137.90, 129.82, 129.50, 129.34, 128.97, 128.84, 128.82, 128.59, 128.57, 128.06, 127.25, 126.67, 125.70, 125.18, 124.94, 121.85, 104.35, 71.53, 37.31, 31.98, 29.45, 28.65, 28.26, 27.02, 26.28, 25.77, 24.84, 23.07, 21.45, 14.37, 11.68.

Example 12—Synthesis of Procatalyst 10

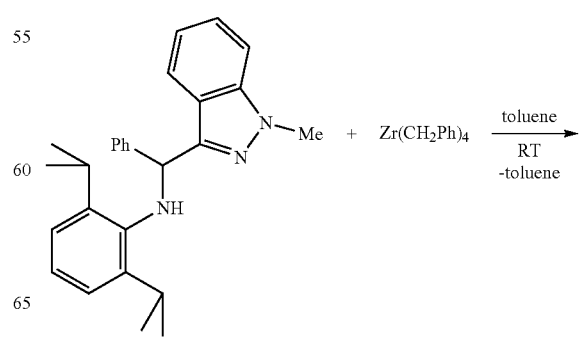

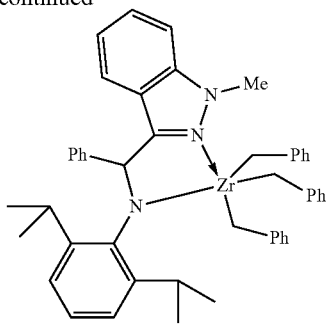

A 25 mL glass jar in the glovebox was charged with a stir bar, a 48 mM toluene solution of proligand 6 (2.4 mL, 0.12 mmol), and toluene (3 mL). While stirring at ambient temperature, a 50 mM toluene solution of tetrabenzyl zirconium (2.4 mL, 0.12 mmol) was added dropwise. The mixture was allowed to react at ambient temperature overnight. Volatiles were removed in vacuo leaving a brown solid in 87% yield (0.079 g, 0.104 mmol). $^1$H NMR (400 MHz, benzene-$d_6$) δ 7.58 (dd, J=7.2, 1.1 Hz, 2H), 7.39 (dd, J=8.1, 1.0 Hz, 1H), 7.13-7.00 (m, 15H), 6.04 (s, 1H), 5.89 (d, J=9.6 Hz, 1H), 4.64 (d, J=9.6 Hz, 1H), 3.41 (d, J=0.7 Hz, 3H), 3.36 (p, J=6.8 Hz, 4H), 2.91 (s, 2H), 1.46 (d, J=6.8 Hz, 2H), 1.36 (d, J=6.7 Hz, 2H), 1.24 (d, J=6.7 Hz, 2H), 1.06 (ddd, J=6.8, 4.3, 0.7 Hz, 12H). $^{13}$C NMR (101 MHz, benzene-$d_6$) δ 143.30, 129.34, 128.58, 128.56, 128.06, 127.43, 126.78, 126.15, 125.70, 124.45, 123.98, 120.76, 120.40, 109.14, 63.34, 34.90, 28.11, 24.45, 24.29, 21.45.

Example 13—Synthesis of Procatalyst 9

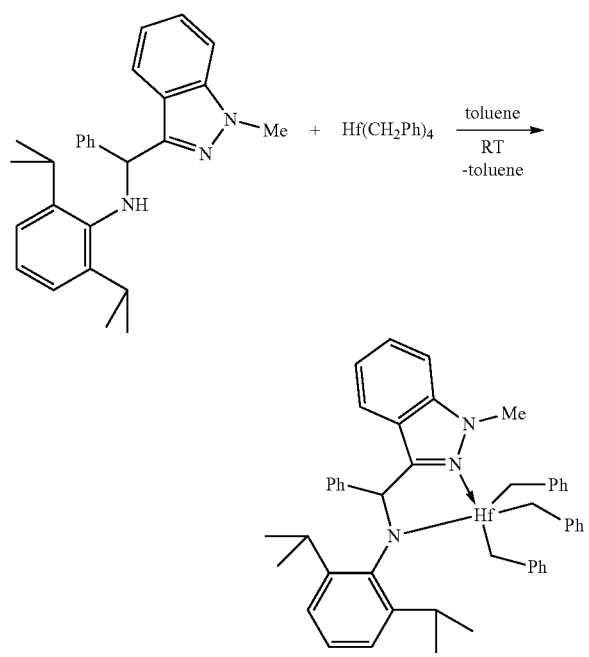

A 25 mL glass jar in the glovebox was charged with a stir bar, a 48 mM toluene solution of proligand 6 (2.4 mL, 0.12 mmol), and toluene (3 mL). While stirring at ambient temperature, a 50 mM toluene solution of tetrabenzyl hafnium (2.4 mL, 0.12 mmol) was added dropwise. The mixture was allowed to react at ambient temperature overnight. Volatiles were removed in vacuo leaving a beige solid in 86% yield (0.087 g, 0.103 mmol). $^1$H NMR (400 MHz, benzene-$d_6$) δ 7.58 (dd, J=7.2, 1.7 Hz, 2H), 7.44-7.34 (m, 1H), 7.14-6.99 (m, 18H), 6.84-6.79 (m, 2H), 6.54-6.50 (m, 1H), 6.05 (s, 1H), 5.89 (d, J=9.6 Hz, 1H), 4.64 (d, J=9.6 Hz, 1H), 3.41 (d, J=0.6 Hz, 2H), 3.35 (q, J=6.8 Hz, 1H), 2.92 (s, 2H), 1.46 (d, J=6.8 Hz, 2H), 1.40 (d, J=6.8 Hz, 2H), 1.27 (d, J=6.7 Hz, 2H), 1.06 (dd, J=6.8, 4.3 Hz, 12H). $^{13}$C NMR (101 MHz, benzene-$d_6$) δ 143.30, 129.34, 128.61, 128.57, 128.06, 127.43, 126.15, 125.70, 124.45, 123.98, 120.76, 120.40, 109.15, 63.34, 34.90, 28.11, 24.45, 24.29, 21.45.

Example 14—Synthesis of Procatalyst 8

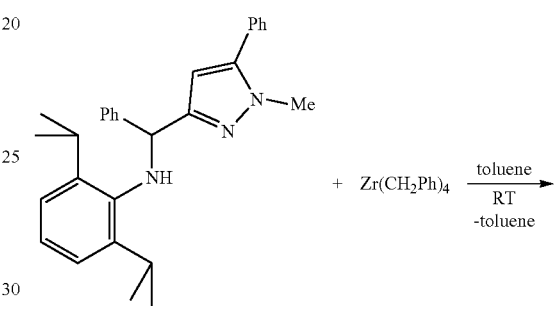

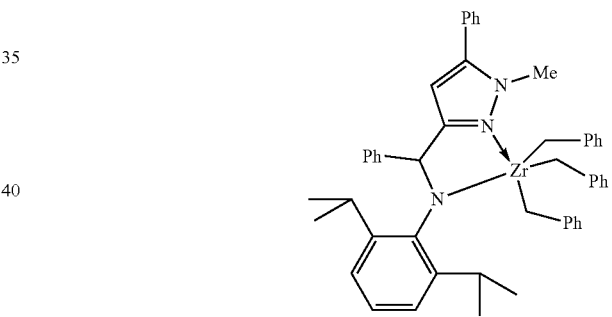

A 25 mL glass jar in the glovebox was charged with a stir bar, a 78 mM toluene solution of proligand 5 (2.7 mL, 0.21 mmol), and toluene (3 mL). While stirring at ambient temperature, a 50 mM toluene solution of tetrabenzyl zirconium (4.0 mL, 0.20 mmol) was added dropwise. The mixture was allowed to react in the glovebox at ambient temperature overnight. Volatiles were removed in vacuo and washed with hexanes. A brown solid was recovered and stored at ambient temperature. $^1$H NMR (400 MHz, benzene-$d_6$) δ 7.12 (t, J=7.8 Hz, 9H), 7.07-6.92 (m, 14H), 6.86 (t, J=7.3 Hz, 5H), 6.81-6.77 (m, 2H), 5.73 (s, 1H), 5.59 (s, 1H), 3.52 (dhept, J=33.6, 6.6 Hz, 2H), 2.78 (d, J=0.8 Hz, 3H), 2.74 (s, 0H), 1.50 (d, J=6.7 Hz, 3H), 1.42 (d, J=6.8 Hz, 3H), 1.37 (s, 1H), 1.29 (d, J=6.7 Hz, 3H), 0.19 (d, J=6.6 Hz, 3H). $^{13}$C NMR (101 MHz, benzene-$d_6$) δ 160.1, 148.04, 147.70, 146.30, 144.80, 143.33, 138.39, 129.73, 129.43, 128.99, 128.99, 128.84, 128.18, 128.15, 128.06, 127.94, 127.91, 126.88, 126.81, 125.37, 124.91, 121.74, 121.15, 104.40, 71.61, 37.39, 29.19, 28.70, 28.29, 26.38, 25.82, 24.97, 24.86, 24.58.

Example 15 Synthesis of Proligand 2

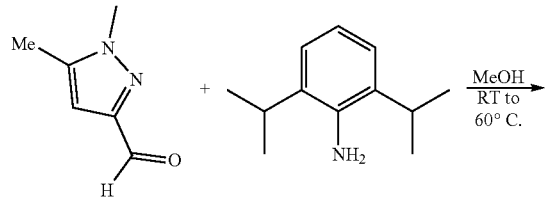

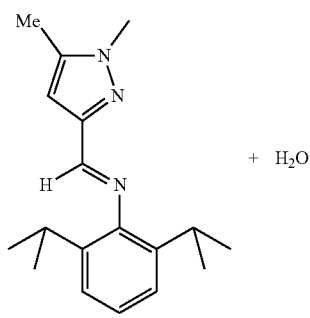

A 50 mL RB flask with a magnetic stir bar was charged with 1,5-dimethyl-1H-pyrazole-3-carboxaldehyde (1.107 g, 8.917 mmol) and methanol (15 mL). Neat 2,6-diisopropylaniline (1.92 g, 10.8 mmol) was added dropwise by pipette to the stirred solution at ambient temperature. The homogeneous mixture was allowed to stir overnight at 40° C. After 24 hours, GC-MS analysis confirmed the desired product as the major species. The methanol solution was cooled at −10° C. to afford a crystalline solid recovered in 41% yield (1.035 g, 3.652 mmol) after filtration and drying under vacuum. $^1$H NMR (400 MHz, benzene-$d_6$) δ 8.53 (d, J=0.5 Hz, 1H), 6.82 (t, J=0.7 Hz, 1H), 3.33 (hept, J=7.0 Hz, 2H), 3.05 (s, 3H), 1.55 (d, J=0.8 Hz, 3H), 1.21 (d, J=6.9 Hz, 12H). $^{13}$C NMR (101 MHz, benzene-$d_6$) δ 157.06, 149.94, 139.69, 137.88, 124.49, 123.48, 104.24, 35.81, 28.50, 23.69, 10.56.

Example 16—Synthesis of Procatalyst 2

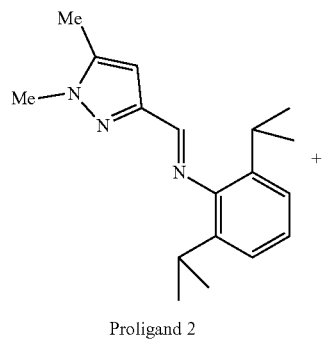

Proligand 2

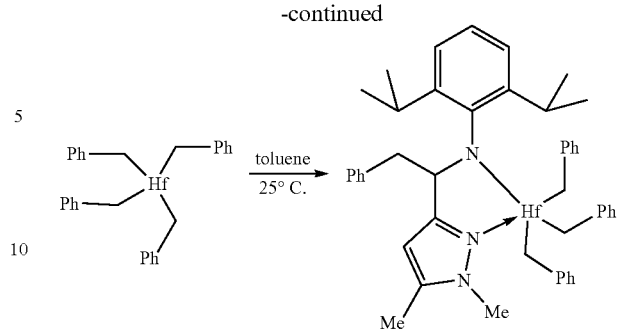

Toluene solutions were prepared in the glovebox containing tetrabenzyl hafnium (41 mM) and proligand 2 (43 mM). The two solutions were mixed (10.0 mL each) in a 50 mL glass jar in the glovebox at ambient temperature, resulting in a cranberry solution. After one day at ambient temperature, the mixture was filtered and evacuated to dryness. The waxy residue was broken apart and suspended in hexanes (3 mL), decanted, and dried in vacuo to afford procatalyst 2 as a beige powder in 99% yield (0.340 g, 0.411 mmol). $^1$H NMR (400 MHz, benzene-$d_6$) δ 7.24 (s, 2H), 7.15-7.07 (m, 11H), 7.04-7.00 (m, 2H), 6.89 (dt, J=5.1, 1.8 Hz, 2H), 6.84-6.77 (m, 9H), 4.90 (dd, J=11.4, 4.0 Hz, 1H), 4.78 (s, 1H), 4.14-3.98 (m, 1H), 3.44-3.30 (m, 1H), 3.20 (dd, J=12.8, 4.0 Hz, 1H), 2.37 (d, J=1.1 Hz, 3H), 1.54 (dd, J=6.7, 1.1 Hz, 3H), 1.41 (dd, J=6.8, 1.1 Hz, 3H), 1.30 (dd, J=6.7, 1.1 Hz, 2H), 1.28 (dd, J=6.7, 1.1 Hz, 3H), 1.11 (s, 2H). $^{13}$C NMR (101 MHz, benzene-$d_6$) δ 158.28, 147.52, 146.59, 144.56, 143.15, 139.39, 129.97, 128.53, 128.06, 126.70, 126.56, 125.67, 124.98, 103.82, 68.15, 43.49, 35.60, 28.42, 28.09, 26.87, 26.42, 25.59, 25.55, 10.49.

Example 17—Synthesis of Procatalyst 5

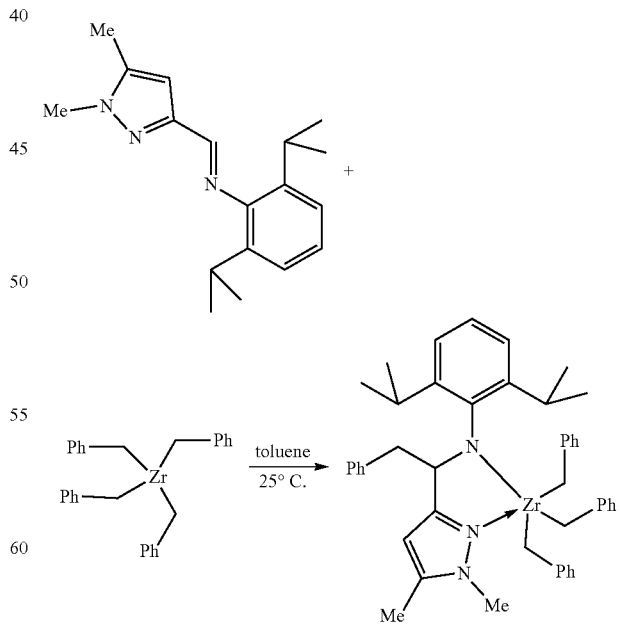

Toluene solutions were prepared in the glovebox containing tetrabenzyl zirconium (41 mM) and proligand 2 (43 mM). The two solutions were mixed (10.0 mL each) in a 50 mL glass jar in the glovebox at ambient temperature, resulting in a red-brown solution. After one day at ambient temperature, the mixture was filtered and evacuated to dryness. The waxy residue was broken apart and suspended in hexanes (3 mL), decanted, and dried in vacuo to afford procatalyst 5 as a mustard yellow powder in 96% yield (0.298 g, 0.403 mmol). $^1$H NMR (400 MHz, benzene-$d_6$) δ 7.24 (s, 3H), 7.10 (t, J=7.6 Hz, 6H), 7.07-6.98 (m, 3H), 6.90 (dd, J=7.4, 2.1 Hz, 2H), 6.84 (ddd, J=7.2, 4.7, 2.6 Hz, 9H), 4.90 (dd, J=11.3, 4.0 Hz, 1H), 4.81 (s, 1H), 4.14 (p, J=6.7 Hz, 1H), 3.28-3.16 (m, 2H), 3.10 (s, 0H), 3.05 (s, 0H), 2.68 (s, 6H), 2.45 (dd, J=12.9, 11.4 Hz, 1H), 2.36 (s, 3H), 1.51 (d, J=6.8 Hz, 3H), 1.39 (d, J=6.8 Hz, 3H), 1.28 (d, J=6.7 Hz, 6H), 1.16 (s, 3H). $^{13}$C NMR (101 MHz, benzene-$d_6$) δ 157.98, 147.52, 146.61, 144.31, 142.85, 139.40, 129.96, 129.34, 128.89, 128.57, 128.53, 128.06, 126.86, 126.54, 125.82, 124.99, 121.61, 103.86, 68.12, 43.26, 35.66, 28.44, 28.11, 27.06, 26.57, 25.60, 25.56, 10.54.

Example 18—Synthesis of Procatalyst 1

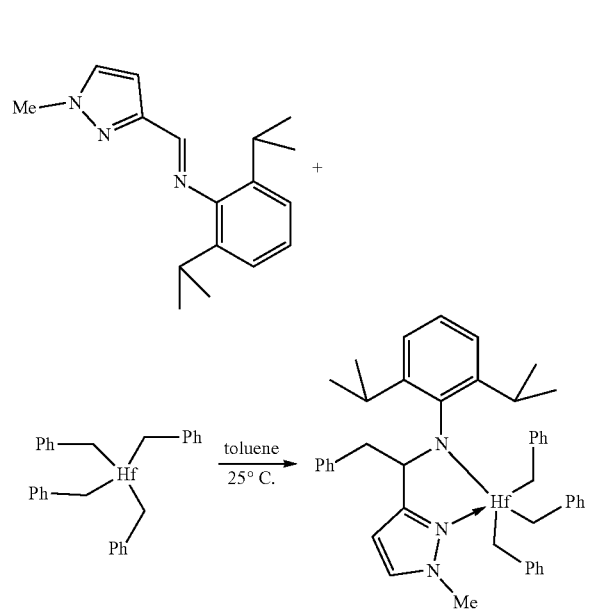

A 50 mL glass jar in the glovebox was charged with tetrabenzyl hafnium (0.1663 g, 0.3063 mmol), a magnetic stir bar, and toluene (10 mL), forming a 30 mM solution. A colorless 60 mM solution of proligand 1 in toluene (5.0 mL; 0.30 mmol) was added dropwise to the stirred tetrabenzyl hafnium solution at ambient temperature. A homogeneous cherry red solution was present after 90 minutes, and the mixture was allowed to stir overnight at ambient temperature before evacuating to dryness. The remaining colorless solids were broken into a powder and washed as a slurry in hexanes (5 mL) and dried in vacuo to afford the desired product in 87% yield (0.211 g, 0.260 mmol). $^1$H NMR (400 MHz, benzene-$d_6$) δ 7.22 (d, J=0.9 Hz, 3H), 7.14-7.07 (m, 9H), 7.03-6.99 (m, 2H), 6.88-6.78 (m, 14H), 6.00 (dd, J=2.5, 0.8 Hz, 1H), 4.91 (dd, J=2.6, 0.8 Hz, 1H), 4.90-4.83 (m, 1H), 3.95 (h, J=6.7 Hz, 1H), 3.25-3.12 (m, 2H), 2.51 (d, J=0.9 Hz, 3H), 2.33 (dd, J=12.8, 11.4 Hz, 8H), 1.50 (dd, J=6.8, 0.9 Hz, 3H), 1.35 (dd, J=6.8, 0.9 Hz, 3H), 1.24 (dt, J=6.7, 1.2 Hz, 6H). $^{13}$C NMR (101 MHz, benzene-$d_6$) δ 159.73, 147.61, 146.75, 144.18, 139.23, 134.25, 130.01, 129.34, 128.58, 128.06, 127.28, 126.80, 126.62, 125.71, 125.03, 121.83, 104.05, 68.18, 43.38, 38.25, 28.39, 28.06, 26.85, 26.44, 25.66, 25.60.

Example 19—Synthesis of Procatalyst 4

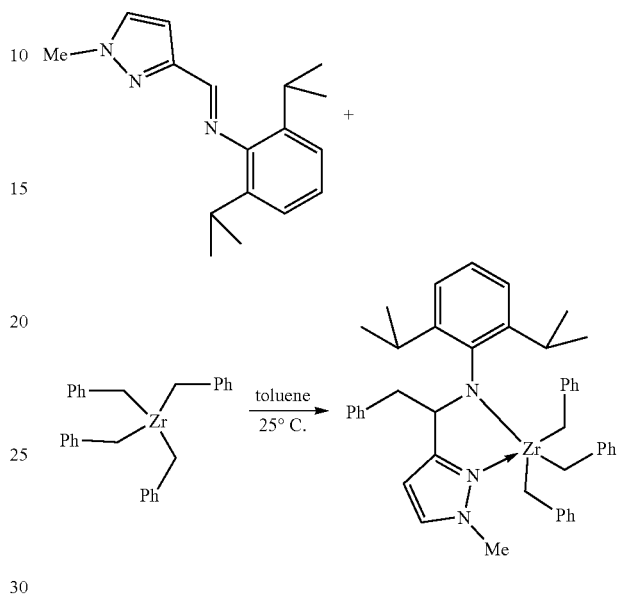

A 50 mL glass jar in the glovebox was charged with tetrabenzyl zirconium (0.1400 g, 0.3072 mmol), a magnetic stir bar, and toluene (10 mL), forming a 30 mM solution. A colorless 60 mM solution of in toluene (5.0 mL; 0.30 mmol) was added dropwise to the stirred tetrabenzyl zirconium solution at ambient temperature. A homogeneous orange solution was present after 90 minutes, and the mixture was allowed to stir overnight at ambient temperature before evacuating to dryness. The yellow solids remaining were broken into a powder and washed as a slurry in hexanes (5 mL) and dried in vacuo to afford the desired product in 85% yield (0.186 g, 0.256 mmol). $^1$H NMR (400 MHz, benzene-$d_6$) δ 7.23 (s, 2H), 7.10 (dd, J=8.1, 7.3 Hz, 5H), 7.04-7.00 (m, 2H), 6.90-6.76 (m, 12H), 6.05 (d, J=2.4 Hz, 1H), 4.95 (d, J=2.4 Hz, 1H), 4.88 (dd, J=11.4, 4.1 Hz, 1H), 4.04 (hept, J=6.8 Hz, 1H), 3.17 (dd, J=12.8, 4.1 Hz, 1H), 3.13-3.05 (m, 1H), 2.66 (s, 3H), 2.52 (s, 3H), 2.38 (dd, J=12.8, 11.4 Hz, 1H), 1.46 (d, J=6.8 Hz, 3H), 1.35 (d, J=6.7 Hz, 3H), 1.24 (dd, J=8.0, 6.7 Hz, 6H). $^{13}$C NMR (101 MHz, benzene-$d_6$) δ 159.35, 147.65, 146.98, 146.82, 143.82, 139.22, 134.04, 129.99, 128.96, 128.58, 128.06, 126.98, 126.88, 126.60, 125.85, 125.05, 121.72, 104.11, 76.79, 68.16, 43.14, 38.30, 28.42, 28.07, 27.05, 26.57, 25.64, 25.62, 23.71.

Example 20—Synthesis of Proligand 7

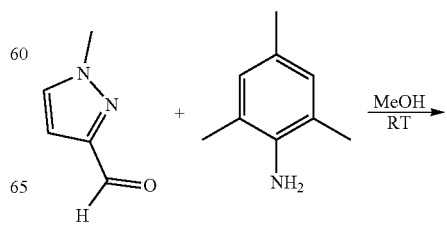

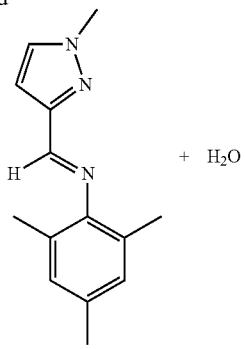

A 50 mL RB flask with a stir bar was charged with 1-methyl-1H-pyrazole-3-carbaldehyde (0.5050 g, 4.586 mmol) and methanol (25 mL), forming a colorless solution. Neat 2,4,6-trimethylaniline (0.63 g, 4.66 mmol) was added dropwise by syringe to the stirred solution at ambient temperature. The mixture was stirred overnight at 60° C. After 24 h of heating, volatiles were removed in vacuo leaving a beige paste. The paste was suspended in hexanes (5 mL) and dried under vacuum, leaving a lightly colored solid, which was washed and filtered successively with hexanes (5 mL) and ether (5 mL) before drying in vacuo to afford a beige powder in 73% yield (0.756 g, 3.33 mmol). $^1$H NMR (400 MHz, benzene-$d_6$) δ 8.50 (d, J=0.8 Hz, 1H), 7.10-7.03 (m, 1H), 6.80 (dt, J=1.5, 0.7 Hz, 2H), 6.57-6.51 (m, 1H), 3.10 (d, J=1.4 Hz, 4H), 2.93 (dd, J=3.5, 1.4 Hz, 1H), 2.20-2.19 (m, 7H), 2.18 (d, J=1.2 Hz, 4H). $^{13}$C NMR (101 MHz, benzene-$d_6$) δ 157.19, 151.54, 149.72, 132.73, 131.20, 129.26, 128.05, 127.16, 104.74, 38.42, 20.90, 18.51.

Example 21—Synthesis of Proligand 4

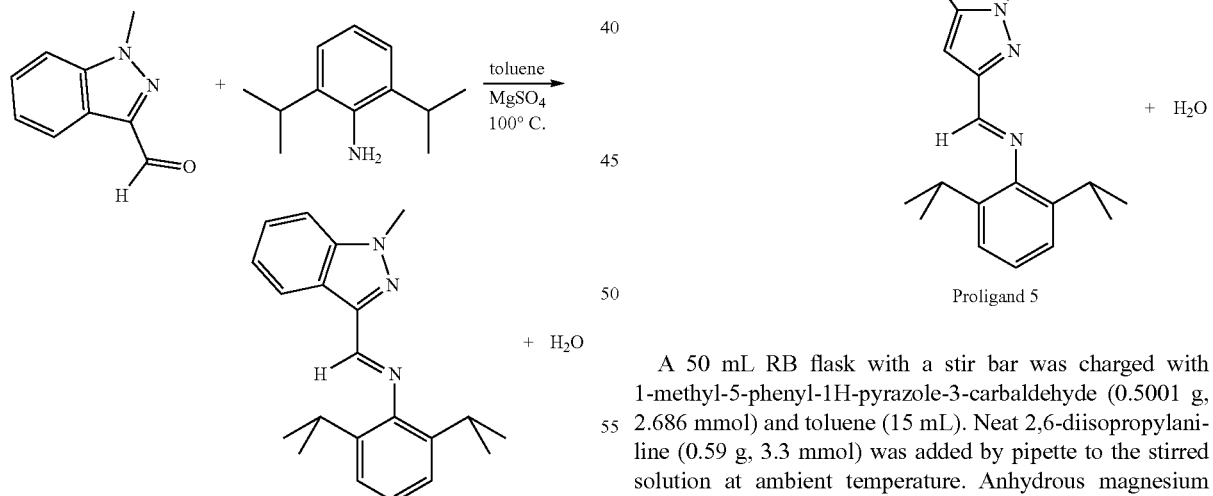

A 50 mL RB flask with a magnetic stir bar was charged with 1-methyl-1H-indazole-3-carbaldehyde (0.5006 g, 3.125 mmol) and toluene (15 mL). Neat 2,6-diisopropylaniline (0.68 g, 3.8 mmol) was added by pipette to the stirred solution at ambient temperature. Anhydrous magnesium sulfate (1.0 g) and and p-toluene sulfonic acid monohydrate (63 mg) were added to the mixture, and the flask was heated at 100° C. overnight under an $N_2$ pad. The desired product was isolated after standard aqueous workup to afford the fluffy colorless powder in 26% yield (0.2610 g, 0.8170 mmol) after methanol wash (3×10 mL) and drying under vacuum. A second crop was obtained via slow evaporation of the methanol washes. $^1$H NMR (400 MHz, chloroform-d) δ 8.56 (d, J=8.1 Hz, 6H), 8.52 (s, 6H), 8.32 (d, J=8.1 Hz, 1H), 7.56-7.44 (m, 14H), 7.37-7.29 (m, 6H), 7.19 (d, J=8.1 Hz, 11H), 7.13 (dd, J=8.8, 6.4 Hz, 6H), 7.05 (d, J=7.7 Hz, 2H), 4.17 (s, 17H), 3.10 (hept, J=6.9 Hz, 12H), 1.19 (d, J=6.9 Hz, 67H). $^{13}$C NMR (101 MHz, chloroform-d) δ 156.72, 149.69, 142.10, 141.56, 137.64, 127.61, 127.29, 124.20, 123.59, 123.13, 122.97, 122.77, 122.55, 122.39, 109.52, 109.16, 77.16, 36.15, 28.15, 28.10, 23.63, 22.66.

Example 22—Synthesis of Proligand 5

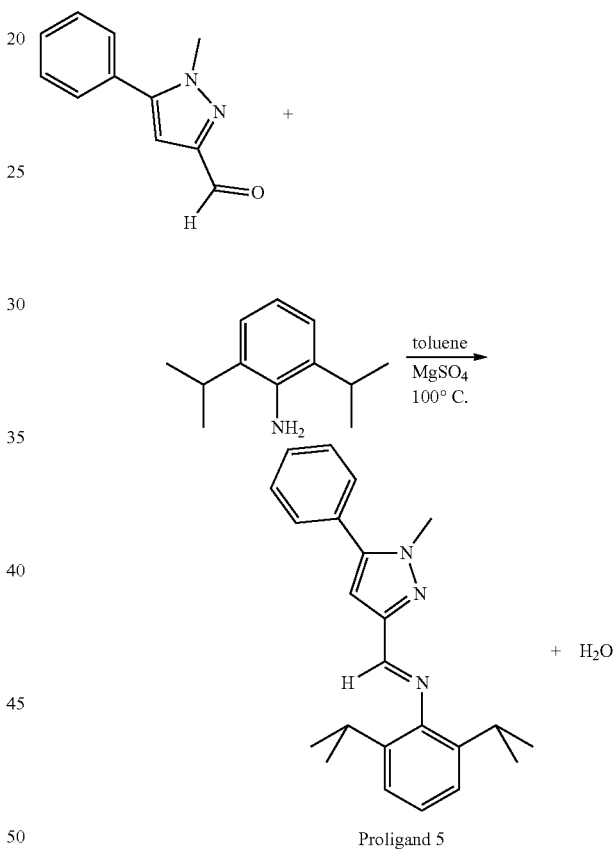

Proligand 5

A 50 mL RB flask with a stir bar was charged with 1-methyl-5-phenyl-1H-pyrazole-3-carbaldehyde (0.5001 g, 2.686 mmol) and toluene (15 mL). Neat 2,6-diisopropylaniline (0.59 g, 3.3 mmol) was added by pipette to the stirred solution at ambient temperature. Anhydrous magnesium sulfate (0.9 g) and p-toluene sulfonic acid monohydrate (62 mg) were added to the mixture. The flask was heated at 100° C. overnight with its contents under an $N_2$ pad. Volatiles were removed on the rotavap, leaving a paste that was extracted with methylene chloride and filtered. The solution was dried, and the remaining solids were washed with methanol (3×10 mL). The product was recovered as colorless flakes in 50% yield (0.4651 g, 1.35 mmol). $^1$H NMR (400 MHz, chloroform-d) δ 8.56 (d, J=8.1 Hz, 6H), 8.52 (s, 6H), 8.32 (d, J=8.1 Hz, 1H), 7.56-7.44 (m, 14H), 7.37-7.29 (m, 6H), 7.19 (d, J=8.1 Hz, 11H), 7.13 (dd, J=8.8, 6.4 Hz, 6H), 7.05 (d, J=7.7 Hz, 2H), 4.17 (s, 17H), 3.10 (hept, J=6.9 Hz, 12H), 1.19 (d, J=6.9 Hz, 67H). $^{13}$C NMR (101 MHz, chloroform-d) δ 156.72, 149.69, 142.10, 141.56, 137.64, 127.61, 127.29, 124.20, 123.59, 123.13, 122.97, 122.77, 122.55, 122.39, 109.52, 109.16, 77.16, 36.15, 28.15, 28.10, 23.63, 22.66.

Example 23—Synthesis of Proligand 6

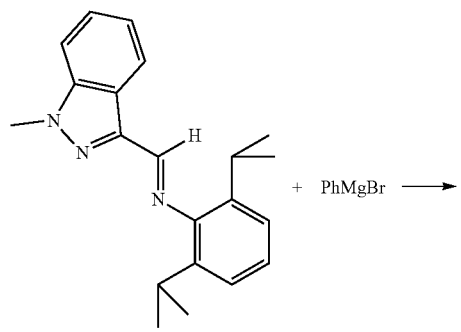

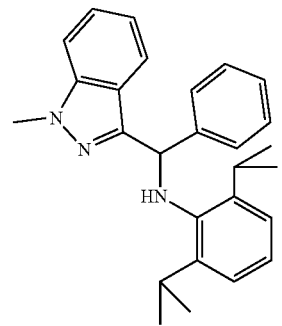

A 20 mL glass vial under inert atmosphere was charged with proligand 4 (0.1002 g, 0.3137 mmol) and toluene (5 mL). A 3 M solution of phenylmagnesium bromide in ether (0.5 mL, 1.5 mmol) was added dropwise to the aldimine solution at ambient temperature, changing from colorless to orange during addition. The mixture was allowed to react for 16 hours before the yellow solution was quenched with anhydrous isopropanol (1.0 mL, 0.8 g, 13 mmol). After aqueous workup, the product was dried and isolated as a pale yellow solid in 98% yield (0.122 g, 0.307 mmol). $^1$H NMR (400 MHz, chloroform-d) δ 7.36 (d, J=7.9 Hz, 4H), 7.25 (td, J=11.1, 9.7, 6.8 Hz, 4H), 7.09-6.90 (m, 4H), 5.55 (s, 1H), 4.37 (s, 1H), 4.10 (s, 3H), 3.05 (p, J=6.8 Hz, 2H), 1.27 (s, 1H), 1.02 (dd, J=23.3, 6.9 Hz, 12H). $^{13}$C NMR (101 MHz, chloroform-d) δ 146.09, 142.72, 142.35, 141.82, 141.11, 128.37, 127.71, 127.29, 126.32, 123.65, 123.53, 122.06, 120.60, 120.15, 108.99, 77.16, 62.74, 35.62, 29.85, 27.70, 24.43, 24.17.

Example 24—Synthesis of Proligand 10

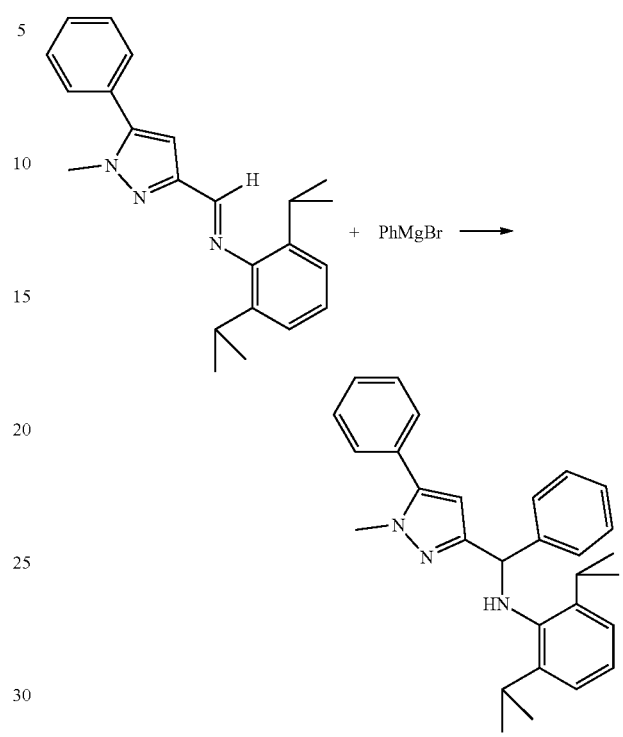

A 20 mL glass vial under inert atmosphere was charged with proligand 5 (0.1728 g, 0.5002 mmol) and toluene (5 mL). A 3 M phenylmagnesium bromide solution in ether (0.5 mL, 1.5 mmol) was added dropwise by syringe to the aldimine solution at ambient temperature, and the mixture was allowed to react without overnight. The yellow solution was quenched after 16 hours with anhydrous isopropanol (1.0 mL, 0.8 g, 13 mmol) and dried under vacuum. A pale yellow oil was recovered in 98% yield (0.216 g, 0.49 mmol) after aqueous wash and drying over anhydrous magnesium sulfate. $^1$H NMR (400 MHz, chloroform-d) δ 7.48-7.34 (m, 1H), 7.34-7.17 (m, 0H), 7.03 (d, J=1.9 Hz, 0H), 6.16 (s, 0H), 5.15 (s, 0H), 4.09 (s, 0H), 3.88 (s, 0H), 3.11 (p, J=6.9 Hz, 0H), 1.27 (s, 0H), 1.12 (d, J=6.8 Hz, 1H), 1.02 (d, J=6.8 Hz, 1H). $^{13}$C NMR (101 MHz, chloroform-d) δ 153.54, 144.22, 142.63, 130.92, 128.80, 128.76, 128.49, 128.30, 127.71, 127.30, 127.15, 123.52, 104.93, 77.16, 66.00, 63.58, 37.68, 27.71, 24.48, 24.19, 15.43.

Example 25—Synthesis of Proligand 5

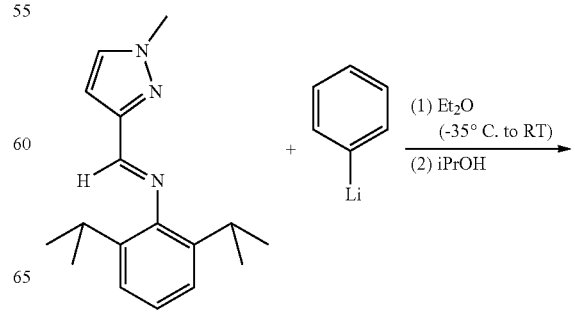

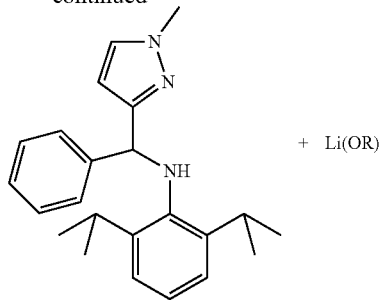

\+ Li(OR)

A 30 mL glass jar under inert atmosphere was charged with a 0.1 M solution of proligand 1 in toluene (6.0 mL, 0.60 mmol) at ambient temperature. The jar was cooled at −35° C. for 90 minutes before adding a cold, orange 1.8 M solution of phenyllithium in dibutyl ether (3.6 mL, 6.5 mmol) by syringe. The mixture was allowed to warm to ambient temperature overnight and then quenched with anhydrous isopropanol (3.0 mL). The mixture was concentrated to a viscous liquid under vacuum before extraction with methylene chloride (20 mL). After brine wash (2×30 mL), the organic layer was dried over anhydrous magnesium sulfate and filtered. The material was dried and isolated as a solid in 80% yield (0.166 g, 0.478 mmol). $^1$H NMR (400 MHz, benzene-d$_6$) δ 7.55-7.50 (m, 1H), 7.15-6.97 (m, 7H), 6.56 (dd, J=2.2, 0.8 Hz, 1H), 5.98 (dd, J=2.2, 0.9 Hz, 1H), 5.45 (s, 1H), 4.42 (s, 1H), 3.41 (pd, J=6.8, 0.8 Hz, 2H), 3.12 (d, J=0.9 Hz, 3H), 1.16 (dd, J=6.8, 0.9 Hz, 6H), 1.09 (dd, J=6.9, 0.9 Hz, 6H). $^{13}$C NMR (101 MHz, benzene-d$_6$) δ 154.90, 144.18, 143.10, 142.72, 130.07, 129.06, 128.43, 128.12, 128.06, 127.52, 127.47, 127.19, 124.22, 123.93, 104.34, 64.30, 38.19, 28.07, 24.53, 24.31.

Example 26—Synthesis of Proligand 18

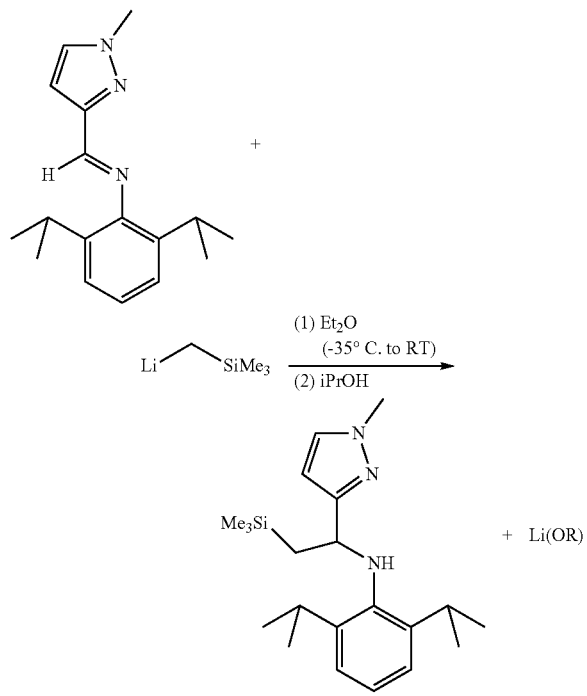

A 30 mL glass jar under inert atmosphere was charged with a 0.1 M solution of proligand 1 in toluene (6.0 mL, 0.60 mmol) and cooled at −35° C. for 90 minutes. A pale yellow solution of (trimethylsilyl)methyl lithium (0.604 g, 6.41 mmol) in hexanes was added to the cold solution, and the mixture was allowed to warm to ambient temperature overnight without agitation. The mixture was quenched with anhydrous isopropanol (3 mL), evacuated to dryness, and extracted with fresh toluene (10 mL). The filtered solution was evacuated to dryness to afford the colorless product in 95% yield (0.205 g, 0.573 mmol). $^1$H NMR (400 MHz, benzene-d$_6$) δ 7.13-7.03 (m, 3H), 6.49 (dd, J=2.3, 0.8 Hz, 1H), 5.78 (dd, J=2.2, 0.9 Hz, 1H), 4.48 (dd, J=11.8, 4.1 Hz, 1H), 3.73 (s, 1H), 3.60-3.48 (m, 2H), 3.15 (s, 2H), 1.68 (ddd, J=13.9, 11.3, 0.9 Hz, 1H), 1.55 (ddd, J=13.9, 4.3, 0.9 Hz, 1H), 1.29 (dd, J=6.9, 0.9 Hz, 6H), 1.17 (dd, J=6.7, 0.9 Hz, 6H), −0.03 (d, J=1.0 Hz, 9H). $^{13}$C NMR (101 MHz, benzene-d$_6$) δ 155.67, 142.55, 142.35, 129.42, 128.06, 123.79, 123.76, 104.06, 56.47, 38.10, 28.13, 25.09, 24.56, 24.40, −0.97.

Example 27—Synthesis of Proligand 19

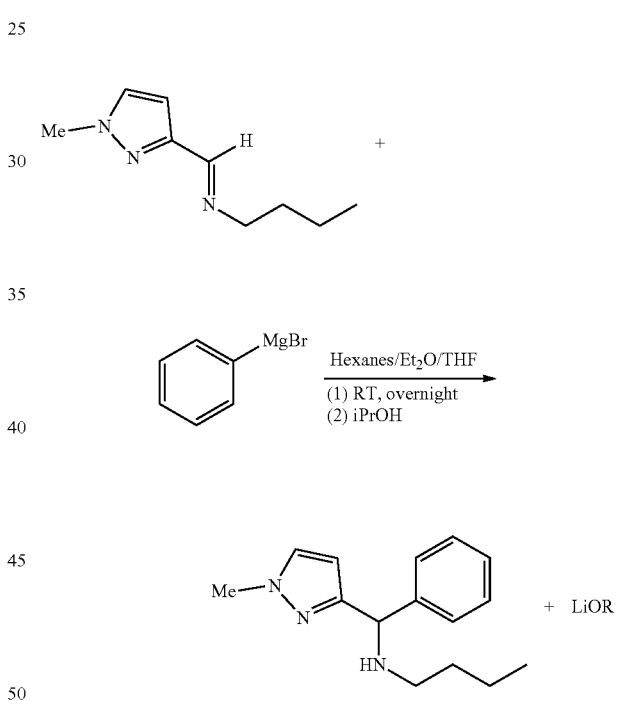

A 30 mL glass jar under inert atmosphere was charged with a 0.1 M solution of proligand 9 (0.211 g, 1.28 mmol) and hexanes (15 mL). A 3 M phenylmagnesium bromide solution in ether (1.0 mL, 3.0 mmol) was added dropwise by syringe to the turbid orange imine mixture at ambient temperature, causing a solid to precipitate on contact. A magnetic stir bar was added, and the mixture was agitated as tetrahydrofuran (5 mL) was added. The yellow mixture was allowed to stir overnight at ambient temperature, and the mixture was then quenched with anhydrous isopropanol (1.0 mL). The mixture was allowed to stir for an additional 30 minutes before volatiles were removed on the rotavap. The crude mixture was set to be taken up in dichloromethane, washed with water, dried over anhydrous magnesium sulfate.

Example 28—Synthesis of Procatalyst 1

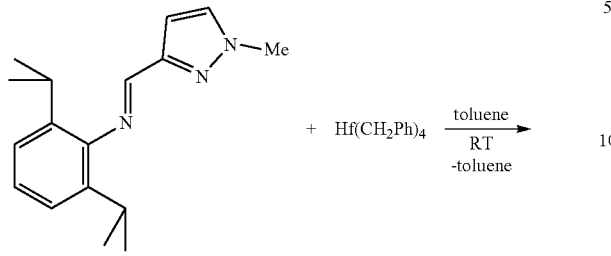

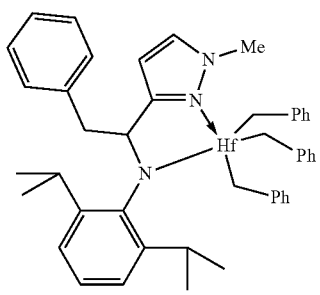

A 50 mL glass jar in the glovebox was charged with tetrabenzyl hafnium (0.1663 g, 0.3063 mmol), a magnetic stir bar, and toluene (10 mL), forming a 30 mM solution. A colorless 60 mM solution of proligand 1 in toluene (5.0 mL; 0.30 mmol) was added dropwise to the stirred Tetrabenzyl hafnium solution at ambient temperature. A homogeneous cherry red solution was present after 90 minutes, and the mixture was allowed to stir overnight at ambient temperature before evaporating to dryness. The remaining colorless solids were broken into a powder and washed as a slurry in hexanes (5 mL) and dried in vacuo to afford the desired product in 87% yield (0.211 g, 0.260 mmol). $^1$H NMR (400 MHz, benzene-$d_6$) δ 7.22 (d, J=0.9 Hz, 3H), 7.14-7.07 (m, 9H), 7.03-6.99 (m, 2H), 6.88-6.78 (m, 14H), 6.00 (dd, J=2.5, 0.8 Hz, 1H), 4.91 (dd, J=2.6, 0.8 Hz, 1H), 4.90-4.83 (m, 1H), 3.95 (h, J=6.7 Hz, 1H), 3.25-3.12 (m, 2H), 2.51 (d, J=0.9 Hz, 3H), 2.33 (dd, J=12.8, 11.4 Hz, 8H), 1.50 (dd, J=6.8, 0.9 Hz, 3H), 1.35 (dd, J=6.8, 0.9 Hz, 3H), 1.24 (dt, J=6.7, 1.2 Hz, 6H). $^{13}$C NMR (101 MHz, benzene-$d_6$) δ 159.73, 147.61, 146.75, 144.18, 139.23, 134.25, 130.01, 129.34, 128.58, 128.06, 127.28, 126.80, 126.62, 125.71, 125.03, 121.83, 104.05, 68.18, 43.38, 38.25, 28.39, 28.06, 26.85, 26.44, 25.66, 25.60.

Example 29—Synthesis of Procatalyst 12

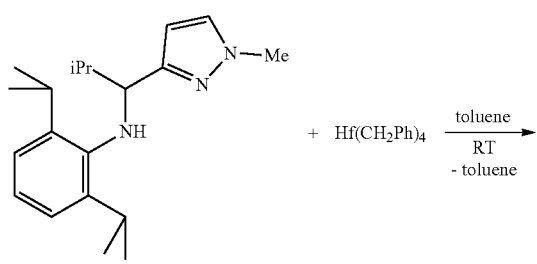

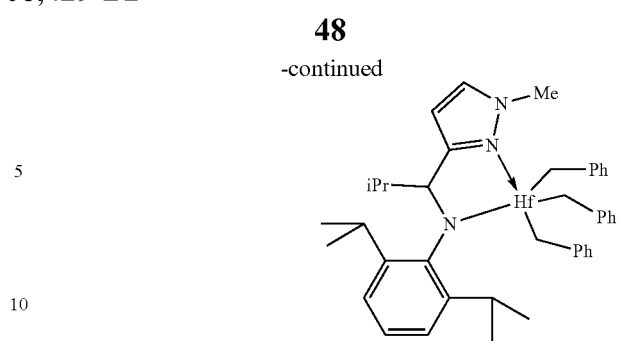

A 30 mL glass jar in the glovebox was charged with a 60 mM toluene solution of proligand 9 (5.0 mL, 0.30 mmol). At ambient temperature, a 30 mM toluene solution of tetrabenzyl hafnium (10.0 mL, 0.30 mmol) was added slowly. The solution was allowed to react overnight at ambient temperature. The solution was evacuated to dryness at ambient temperature, leaving a waxy solid. The solids were twice washed as a slurry in hexanes (3-5 mL), decanted, and dried. A cream-colored powder was recovered in 88% yield (0.201 g, 0.263 mmol). $^1$H NMR (400 MHz, benzene-$d_6$) δ 7.23-7.17 (m, 2H), 7.14-7.05 (m, 1H), 6.82 (t, J=7.5 Hz, 4H), 6.09 (d, J=2.4 Hz, 1H), 5.64 (d, J=2.4 Hz, 1H), 4.49 (d, J=2.0 Hz, 1H), 3.99 (h, J=6.7 Hz, 1H), 3.23 (p, J=6.8 Hz, 1H), 2.43 (d, J=0.7 Hz, 3H), 1.93-1.80 (m, 1H), 1.54 (d, J=6.7 Hz, 3H), 1.33 (d, J=6.8 Hz, 3H), 1.29 (d, J=6.6 Hz, 3H), 1.17 (d, J=6.7 Hz, 3H), 0.68 (dd, J=7.2, 0.8 Hz, 3H), 0.64 (d, J=6.6 Hz, 3H). $^{13}$C NMR (101 MHz, benzene-$d_6$) δ 157.87, 147.48, 146.36, 145.00, 134.73, 129.34, 128.58, 128.06, 126.55, 125.79, 125.70, 124.85, 123.80, 102.97, 72.84, 38.20, 30.29, 28.64, 27.91, 26.79, 26.29, 25.99, 25.48, 24.50, 24.35, 21.45, 21.23, 19.69, 16.33.

Example 30—Synthesis of Procatalyst 13

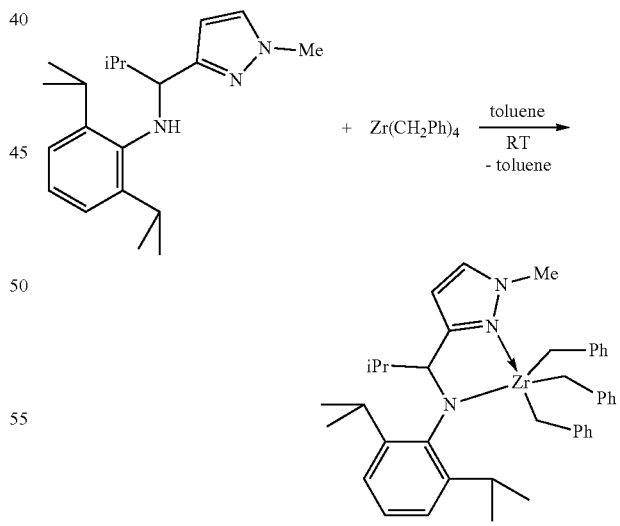

A 30 mL glass jar in the glovebox was charged with solid tetrabenzyl zirconium (0.134 g, 0.294 mmol) and toluene (5 mL), forming a golden solution at ambient temperature. An 8 mL glass vial in the glovebox was charged with proligand 9 (0.096 g, 0.31 mmol) and toluene (2 mL). The colorless proligand solution was poured into the golden solution at ambient temperature. The mixture was gently shaken and then allowed to react overnight at ambient temperature. The solution was evacuated to dryness, leaving a brown-orange residue. The solids were washed in a hexanes slurry (3-5 mL), decanted, and dried to afford an orange powder (0.205 g, 0.30 mmol). $^1$H NMR (400 MHz, benzene-d$_6$) δ 7.21-7.18 (m, 2H), 7.13-7.02 (m, 16H), 6.99-6.92 (m, 5H), 6.88-6.78 (m, 6H), 6.41-6.35 (m, 8H), 6.15 (d, J=2.4 Hz, 1H), 5.68 (d, J=2.4 Hz, 1H), 4.50 (d, J=2.0 Hz, 1H), 4.07 (hept, J=6.7 Hz, 1H), 3.56 (p, J=6.9 Hz, 0H), 3.20-3.11 (m, 2H), 2.43 (s, 3H), 1.96-1.84 (m, 1H), 1.50 (d, J=6.8 Hz, 3H), 1.33 (d, J=6.8 Hz, 4H), 1.30 (d, J=6.7 Hz, 3H), 1.27 (d, J=6.9 Hz, 1H), 1.18-1.10 (m, 6H), 0.70 (d, J=7.1 Hz, 3H), 0.66 (d, J=6.6 Hz, 3H). $^{13}$C NMR (101 MHz, benzene-d$_6$) δ 211.16, 168.19, 157.36, 147.51, 146.46, 144.51, 139.47, 134.50, 130.97, 129.34, 128.88, 128.74, 128.58, 128.06, 126.77, 126.74, 125.98, 125.70, 124.86, 124.53, 123.80, 121.64, 103.04, 73.12, 72.45, 38.25, 30.08, 28.72, 27.92, 26.91, 26.23, 26.12, 25.50, 21.16, 16.39.

Example 31—Synthesis of Procatalyst 14

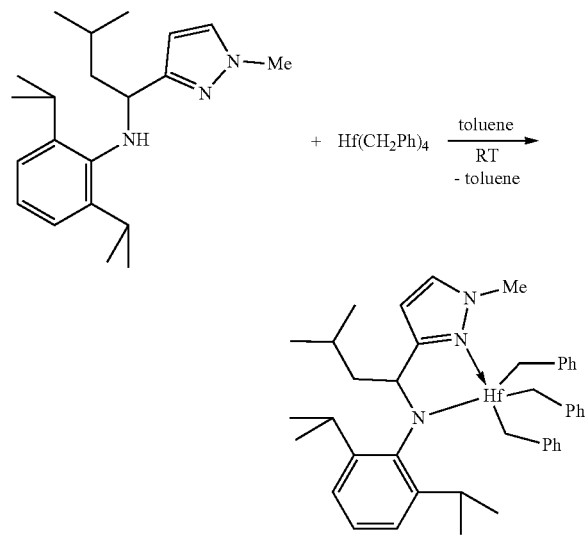

A 30 mL glass jar in the glovebox was charged with tetrabenzyl hafnium powder (0.1089 g, 0.201 mmol) and toluene (5 mL), forming a yellow solution at ambient temperature. An 8 mL glass vial in the glovebox was charged with proligand 8 (0.0688 g, 0.210 mmol) and toluene (2 mL), forming a colorless solution. The proligand solution was poured into the yellow solution at ambient temperature. The mixture was gently shaken, and the solution was allowed to react overnight at ambient temperature. The solution was evacuated to dryness, leaving a yellow residue. The solids were washed in a hexanes slurry (3-5 mL), decanted, and dried to afford a yellow powder (0.163 g, 0.21 mmol). $^1$H NMR (400 MHz, benzene-d$_6$) δ 7.21-7.17 (m, 2H), 7.14-7.09 (m, 3H), 6.83 (t, J=7.4 Hz, 4H), 6.18 (d, J=2.4 Hz, 1H), 5.74 (d, J=2.4 Hz, 1H), 4.58 (dd, J=11.0, 4.0 Hz, 1H), 3.96 (h, J=6.7 Hz, 1H), 3.17 (p, J=6.8 Hz, 1H), 2.54 (s, 3H), 2.33 (d, J=23.2 Hz, 5H), 1.49 (d, J=6.8 Hz, 3H), 1.43-1.33 (m, 1H), 1.30 (dd, J=8.0, 6.7 Hz, 6H), 1.23 (d, J=6.7 Hz, 3H), 0.66 (t, J=6.6 Hz, 6H). $^{13}$C NMR (101 MHz, benzene-d$_6$) δ 160.42, 147.68, 146.72, 143.97, 134.91, 128.54, 128.31, 128.06, 126.63, 125.56, 124.75, 121.77, 103.27, 64.04, 46.09, 38.33, 28.32, 28.05, 26.51, 26.46, 25.66, 25.11, 24.25, 20.84.

Example 32—Synthesis of Procatalyst 15

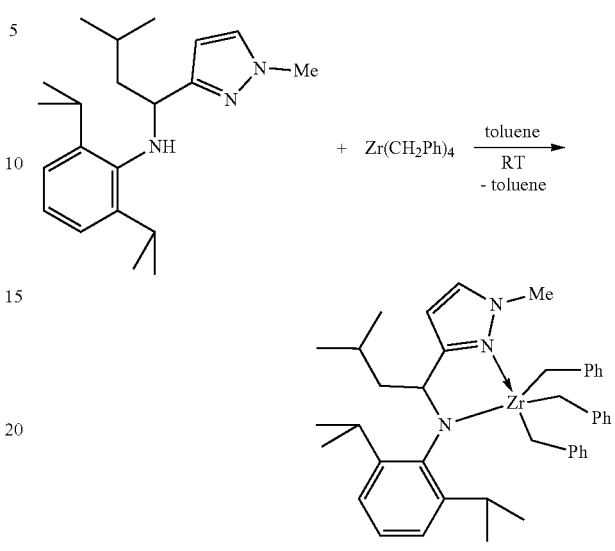

A 30 mL glass jar in the glovebox was charged with tetrabenzyl zirconium powder (0.0915 g, 0.201 mmol) and toluene (5 mL), forming a golden solution at ambient temperature. An 8 mL glass vial in the glovebox was charged with proligand 8 (0.0668 g, 0.204 mmol) and toluene (2 mL), forming a colorless solution. The proligand solution was poured into the golden solution at ambient temperature. The mixture was gently shaken, and the solution was allowed to react overnight at ambient temperature. The solution was evacuated to dryness, leaving a yellow residue. The solids were washed in a hexanes slurry (3-5 mL), decanted, and dried to afford an orange powder (0.144 g, 0.303 mmol). $^1$H NMR (400 MHz, benzene-d$_6$) δ 7.21-7.19 (m, 2H), 7.11 (t, J=7.7 Hz, 6H), 6.89-6.78 (m, 9H), 6.25 (d, J=2.4 Hz, 1H), 5.79 (d, J=2.4 Hz, 1H), 4.57 (dd, J=10.6, 4.4 Hz, 1H), 4.04 (hept, J=6.7 Hz, 1H), 3.07 (p, J=6.7 Hz, 1H), 2.69-2.57 (m, 6H), 2.54 (s, 3H), 1.45 (d, J=6.8 Hz, 3H), 1.31 (d, J=6.7 Hz, 3H), 1.28 (d, J=6.8 Hz, 3H), 1.20 (d, J=6.7 Hz, 3H), 0.67 (dd, J=6.5, 4.3 Hz, 6H). $^{13}$C NMR (101 MHz, benzene-d$_6$) δ 159.91, 147.73, 147.23, 146.81, 143.51, 134.69, 129.34, 128.91, 128.57, 128.06, 126.85, 125.71, 124.80, 121.63, 103.38, 76.43, 64.29, 45.89, 38.38, 28.37, 28.06, 26.68, 26.61, 25.66, 25.64, 25.09, 24.18, 20.90.

Example 33—Synthesis of Procatalyst 16

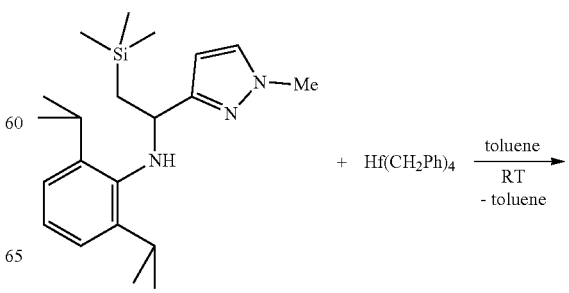

-continued

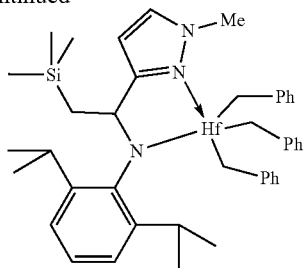

A 30 mL glass jar in the glovebox was charged with tetrabenzyl hafnium powder (0.10 g, 0.2 mmol) and toluene (5 mL), forming a yellow solution at ambient temperature. An 8 mL glass vial in the glovebox was charged with proligand 18 (0.07 g, 0.2 mmol) and toluene (2 mL), forming a colorless solution. The proligand solution was poured into the yellow solution at ambient temperature. The mixture was gently shaken, and the solution was allowed to react overnight at ambient temperature. The solution was evacuated to dryness, leaving a yellow residue. The solids were washed in a hexanes slurry (3-5 mL), decanted, and dried to afford a yellow powder (0.179 g, 0.22 mmol). $^1$H NMR (400 MHz, benzene-$d_6$) δ 7.23-7.17 (m, 2H), 7.14-7.08 (m, 5H), 6.82 (t, J=7.4 Hz, 4H), 6.20 (dd, J=2.5, 0.9 Hz, 1H), 5.89 (dd, J=2.5, 0.9 Hz, 1H), 4.70 (dd, J=11.5, 2.8 Hz, 1H), 3.94 (p, J=6.7 Hz, 1H), 3.18 (p, J=6.8 Hz, 1H), 2.54 (d, J=0.9 Hz, 3H), 2.32 (s, 5H), 1.48 (dd, J=6.8, 1.0 Hz, 3H), 1.28 (ddd, J=6.9, 4.8, 1.0 Hz, 6H), 1.24-1.20 (m, 3H), 0.75 (ddd, J=14.4, 11.6, 1.0 Hz, 1H), −0.13 (d, J=1.0 Hz, 9H). $^{13}$C NMR (101 MHz, benzene-$d_6$) δ 162.07, 147.98, 146.88, 143.92, 134.87, 129.34, 128.53, 128.06, 127.29, 126.69, 125.58, 124.85, 121.75, 103.16, 63.61, 38.34, 28.37, 28.09, 26.69, 26.43, 26.23, 25.85, 25.58, −0.20.

Example 34—Synthesis of Procatalyst 17

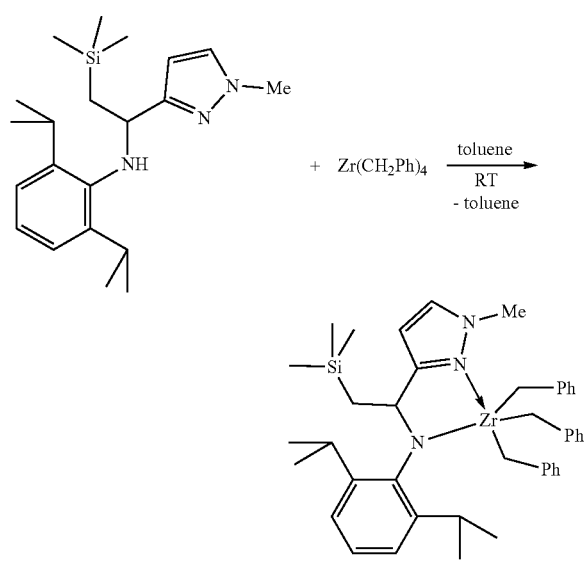

A 30 mL glass jar in the glovebox was charged with tetrabenzyl zirconium powder (0.09 g, 0.2 mmol) and toluene (5 mL), forming a golden solution at ambient temperature. An 8 mL glass vial in the glovebox was charged with proligand 18 (0.07 g, 0.2 mmol) and toluene (2 mL), forming a colorless solution. The proligand solution was poured into the yellow solution at ambient temperature. The mixture was gently shaken, and the solution was allowed to react overnight at ambient temperature. The solution was evacuated to dryness, leaving a brown-orange residue. The solids were washed in a hexanes slurry (3-5 mL), decanted, and dried to afford an orange powder (0.121 g, 0.17 mmol). $^1$H NMR (400 MHz, benzene-$d_6$) δ 7.23-7.18 (m, 2H), 7.13-7.08 (m, 6H), 6.89-6.77 (m, 9H), 6.26 (d, J=2.4 Hz, 1H), 5.93 (dd, J=2.4, 0.5 Hz, 1H), 4.68 (dd, J=11.6, 2.8 Hz, 1H), 4.00 (hept, J=6.7 Hz, 1H), 3.07 (p, J=6.7 Hz, 1H), 2.62 (s, 4H), 2.55 (s, 3H), 1.44 (d, J=6.7 Hz, 3H), 1.27 (dd, J=8.8, 6.7 Hz, 6H), 1.20 (d, J=6.7 Hz, 3H), 0.80 (dd, J=14.3, 11.7 Hz, 1H), −0.12 (d, J=0.4 Hz, 9H). $^{13}$C NMR (101 MHz, benzene-$d_6$) δ 161.59, 148.07, 147.18, 146.97, 143.38, 134.66, 129.34, 128.90, 128.57, 128.06, 126.92, 126.85, 125.70, 124.88, 121.61, 103.25, 63.71, 38.38, 28.42, 28.10, 26.88, 26.54, 26.10, 25.85, 25.51, 21.45, −0.15.

Example 35—Synthesis of Procatalyst 18

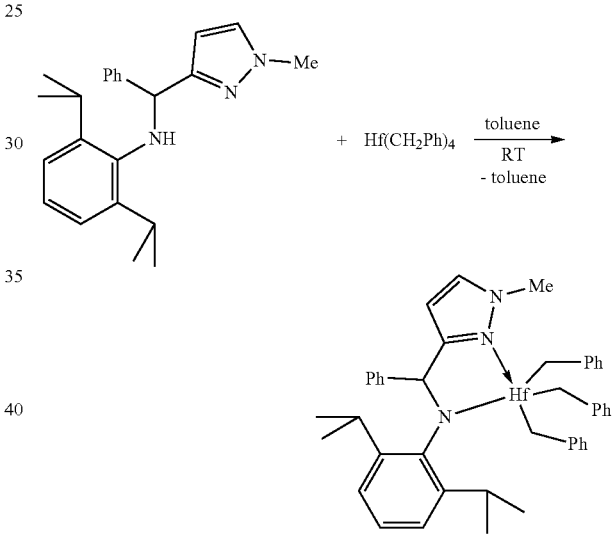

A 30 mL glass jar in the glovebox was charged with tetrabenzyl hafnium powder (0.10 g, 0.2 mmol) and toluene (5 mL), forming a yellow solution at ambient temperature. An 8 mL glass vial in the glovebox was charged with proligand 10 (0.07 g, 0.2 mmol) and toluene (2 mL), forming a colorless solution. The proligand solution was poured into the yellow solution at ambient temperature. The mixture was gently shaken, and the solution was allowed to react overnight at ambient temperature. The solution was evacuated to dryness, leaving a yellow residue. The solids were washed in a hexanes slurry (3-5 mL), decanted, and dried to afford a yellow powder (0.112 g, 0.14 mmol). $^1$H NMR (400 MHz, benzene-$d_6$) δ 7.03-6.78 (m, 8H), 6.70 (s, 2H), 6.02 (d, J=2.4 Hz, 1H), 5.66 (s, 1H), 5.34 (d, J=2.4 Hz, 1H), 3.41 (dp, J=10.9, 6.7 Hz, 2H), 2.56 (s, 3H), 1.44 (d, J=6.8 Hz, 3H), 1.39 (d, J=6.9 Hz, 3H), 1.27 (d, J=6.7 Hz, 3H), 0.12 (d, J=6.6 Hz, 3H). $^{13}$C NMR (101 MHz, benzene-$d_6$) δ 160.96, 147.63, 146.22, 143.88, 143.58, 135.24, 129.77, 129.34, 129.06, 128.58, 128.06, 127.22, 126.66, 125.15, 124.89, 121.84, 103.85, 71.34, 38.24, 28.58, 28.19, 28.08, 26.95, 26.30, 25.81, 24.74, 23.93, 21.44.

Example 36—Synthesis of Procatalyst 19

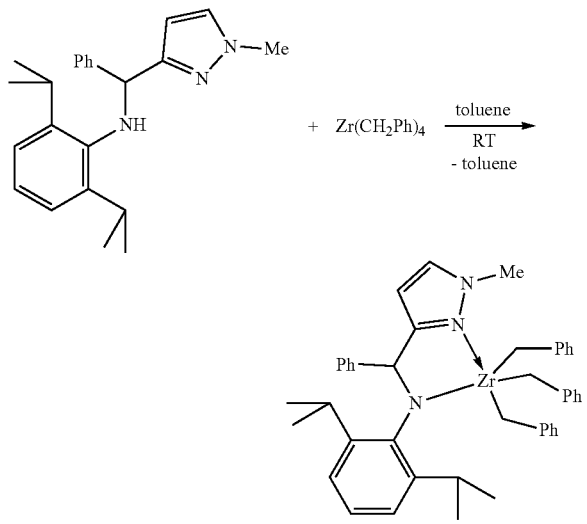

A 30 mL glass jar in the glovebox was charged with tetrabenzyl zirconium powder (0.09 g, 0.2 mmol) and toluene (5 mL), forming a golden solution at ambient temperature. An 8 mL glass vial in the glovebox was charged with proligand 10 (0.07 g, 0.2 mmol) and toluene (2 mL), forming a colorless solution. The proligand solution was poured into the golden solution at ambient temperature. The mixture was gently shaken, and the solution was allowed to react overnight at ambient temperature. The solution was evacuated to dryness, leaving a brown-orange residue. The solids were washed in a hexanes slurry (3-5 mL), decanted, and dried to afford an orange powder (0.092 g, 0.13 mmol). $^1$H NMR (400 MHz, benzene-$d_6$) δ 7.13 (dd, J=7.6, 6.3 Hz, 6H), 7.02-6.84 (m, 15H), 6.78-6.72 (m, 2H), 6.09 (d, J=2.4 Hz, 1H), 5.65 (s, 1H), 5.40 (d, J=2.4 Hz, 1H), 3.44 (hept, J=6.9 Hz, 1H), 3.34 (hept, J=6.8 Hz, 1H), 2.81-2.61 (m, 3H), 2.56 (s, 3H), 1.44 (d, J=6.7 Hz, 3H), 1.35 (d, J=6.8 Hz, 3H), 1.22 (d, J=6.7 Hz, 3H), 0.14 (d, J=6.7 Hz, 3H). $^{13}$C NMR (101 MHz, benzene-$d_6$) δ 158.93, 135.02, 129.34, 128.97, 128.57, 128.06, 126.79, 125.71, 124.67, 121.71, 38.30, 28.22, 27.07, 26.38, 24.53, 21.45.

Example 37—Synthesis of Proligand 13

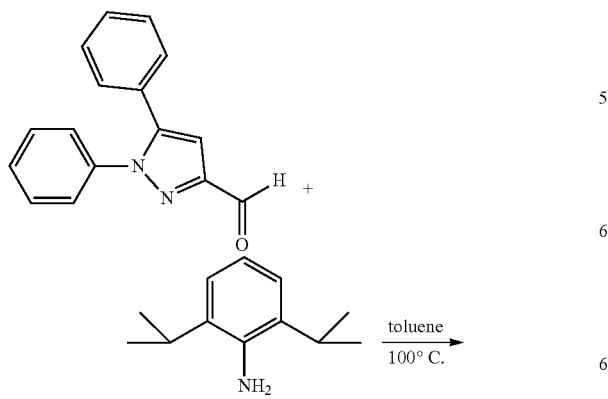

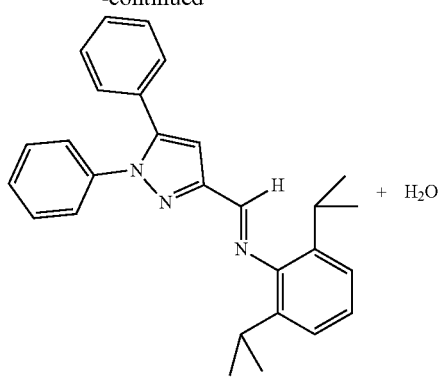

A 100 mL pear shape flask with a magnetic stir bar was charged with 1,5-diphenyl-1H-pyrazole-3-carbaldehyde (1.011 g, 4.072 mmol), toluene (20 mL), and 2,6-diisopropylaniline (0.87 g, 4.9 mmol; 1.2 equiv.). The flask was then charged with anhydrous magnesium sulfate (1.0 g) and solid p-toluene sulfonic acid monohydrate (0.3 g). The colorless reaction mixture was stirred under N2 atmosphere and warmed at 100° C. overnight. Volatiles were removed in vacuo, and the yellow paste was washed as a slurry in dichloromethane (2×20 mL) and filtered by suction. The yellow solution was washed with water (50 mL), and the organic layer was dried over anhydrous magnesium sulfate and filtered by gravity. This yellow solution was concentrated on the rotavap. The product was recovered as a viscous pale yellow oil in 80% yield (1.3343 g, 3.27 mmol). $^1$H NMR (400 MHz, chloroform-d) δ 8.33 (s, 1H), 7.44-7.29 (m, 13H), 7.28-7.10 (m, 6H), 3.07 (hept, J=6.9 Hz, 3H), 1.21 (d, J=6.9 Hz, 11H). $^{13}$C NMR (101 MHz, chloroform-d) δ 187.00, 156.38, 151.15, 144.97, 139.93, 137.76, 130.09, 129.32, 129.24, 129.10, 128.94, 128.91, 128.81, 128.76, 128.72, 128.18, 125.47, 124.41, 123.15, 122.90, 118.67, 106.80, 106.39, 77.16, 28.08, 28.05, 23.73, 22.59.

Example 38—Synthesis of Proligand 14

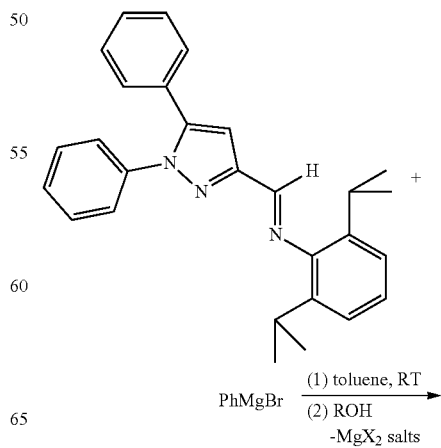

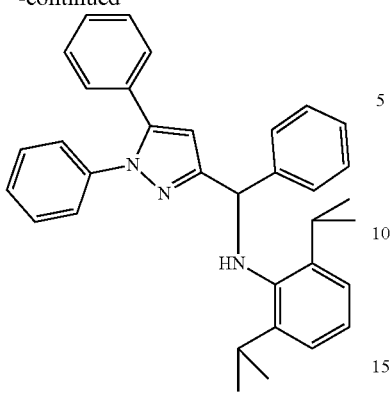

A 20 mL glass vial in the glovebox was charged with proligand 13 (0.2051 g, 0.503 mmol) and toluene (5 mL). A 3.0 M ether solution of PhMgBr (0.5 mL, 1.5 mmol; 3 equiv.) was added dropwise by syringe to the aldimine solution at ambient temperature. The solution color changed to yellow during addition, and the mixture was allowed to react overnight at ambient temperature in the glovebox. After 16 hours, the yellow solution was quenched with isopropanol (1.0 mL, 0.8 g, 13 mmol), and the product was isolated after aqueous wash and drying over anhydrous magnesium sulfate. The product was isolated as viscous yellow oi (0.250 g, 0.515 mmol). $^1$H NMR (400 MHz, chloroform-d) δ 7.48 (d, J=7.6 Hz, 1H), 7.36-7.23 (m, 5H), 7.21-7.17 (m, 1H), 7.04 (s, 1H), 6.34 (s, 0H), 5.22 (s, 0H), 1.21 (td, J=7.0, 0.9 Hz, 1H), 1.12 (d, J=6.8 Hz, 3H), 1.05 (d, J=6.8 Hz, 3H). $^{13}$C NMR (101 MHz, chloroform-d) δ 155.24, 143.59, 142.80, 140.29, 130.80, 129.20, 128.95, 128.85, 128.54, 128.38, 128.29, 127.77, 127.35, 127.25, 125.38, 123.57, 106.92, 77.18, 63.62, 27.79, 24.50, 24.23.

Example 39—Synthesis of Proligand 15

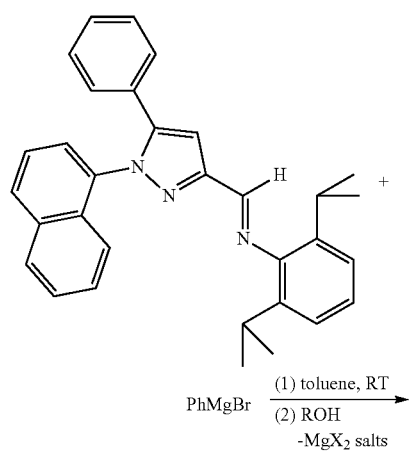

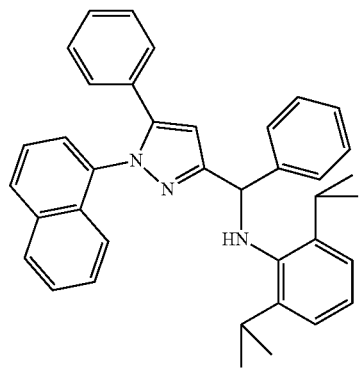

A 30 mL glass jar with a magnetic stir bar was charged with proligand 15 (0.2276 g, 0.497 mmol) and ether (15 mL) in the glovebox, forming a pale green solution upon stirring. An orange 3 M ether solution of PhMgBr (0.5 mL, 1.5 mmol; 3 equiv.) was added dropwise to the aldimine solution at ambient temperature. The solution color changed to yellow during addition, and the mixture was allowed to stir overnight at ambient temperature. After 14 hours, a small amount of colorless precipitate was observed before dry 1,4-dioxane (0.9 mL) was added by syringe. A colorless precipitate was observed on contact, and the mixture was stirred for another 1.5 hours at ambient temperature. The yellow solution was quenched with isopropanol (1 mL) by pipette, and the mixture was filtered through a Celite pad. The colorless solution was evacuated to dryness on the rotavap, then further dried for 1-2 hours under vacuum. The solid mixture was taken into the glovebox and suspended in hexanes (15 mL) and filtered by gravity. The solids were washed with hexanes (2×5 mL), and the filtrate was evacuated to dryness. The product was recovered as a colorless solid in 74% yield (0.197 g, 0.368 mmol). $^1$H NMR (400 MHz, benzene-d$_6$) δ 7.83 (d, J=8.5 Hz, 1H), 7.75-7.66 (m, 2H), 7.54-7.47 (m, 1H), 7.44 (dd, J=8.3, 1.1 Hz, 1H), 7.21 (ddd, J=8.2, 6.9, 1.4 Hz, 3H), 7.19-7.10 (m, 6H), 7.11-7.04 (m, 2H), 7.03-6.94 (m, 2H), 6.88 (ddd, J=8.4, 7.3, 1.3 Hz, 1H), 6.82-6.68 (m, 3H), 6.46 (d, J=1.2 Hz, 1H), 5.66 (s, 1H), 4.60 (s, 1H), 3.55 (pd, J=6.8, 1.2 Hz, 2H), 1.20 (dd, J=6.8, 1.2 Hz, 6H), 1.11 (dd, J=6.9, 1.2 Hz, 6H). $^{13}$C NMR (101 MHz, benzene-d$_6$) δ 155.90, 146.12, 143.89, 143.34, 142.70, 137.47, 134.73, 131.09, 130.77, 129.09, 128.68, 128.51, 128.26, 128.23, 128.09, 127.46, 126.75, 125.94, 125.16, 124.38, 124.33, 124.01, 105.57, 64.31, 28.24, 24.58, 24.42.

Example 41—Synthesis of Procatalyst 21

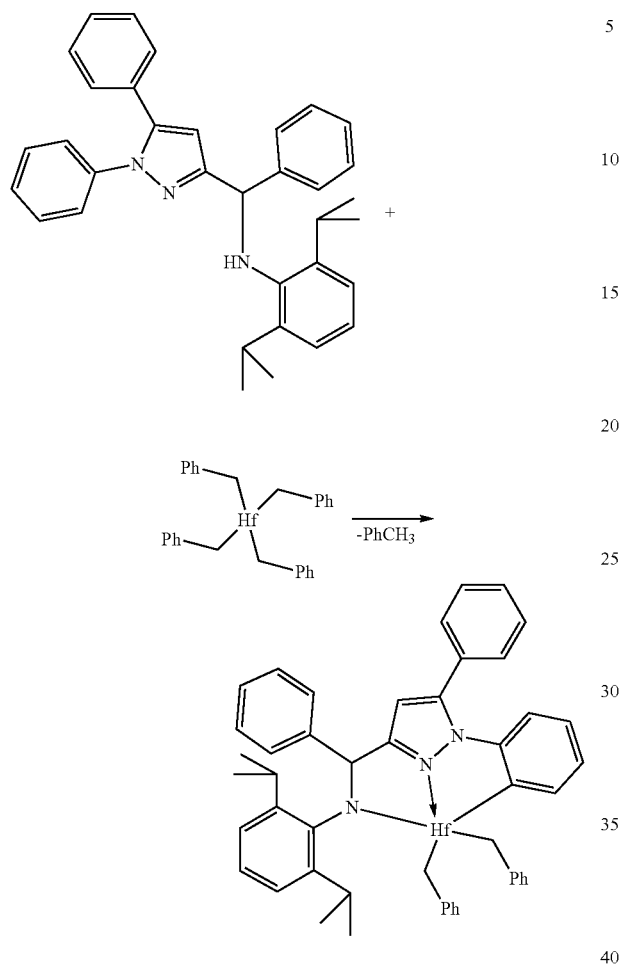

A 20 mL glass vial in the glovebox was charged with a magnetic stir bar, a 76 mM toluene solution of proligand 14 (2.7 mL, 0.21 mmol), and toluene (3 mL). While stirring at ambient temperature, a 50 mM toluene stock solution of tetrabenzyl hafnium (4.0 mL, 0.20 mmol) was added dropwise by syringe. The solution color changed from pale yellow to bright yellow upon addition. The mixture was stirred for 2 h at ambient temperature before heating at 80° C. overnight. Volatiles were removed in vacuo to afford a yellow solid in 80% yield (0.142 g, 0.168 mmol). $^1$H NMR (400 MHz, benzene-$d_6$) δ 8.30-8.20 (m, 2H), 7.64 (d, J=7.5 Hz, 2H), 6.53-6.45 (m, 4H), 6.29 (d, J=0.7 Hz, 1H), 6.06 (s, 2H), 5.56 (d, J=9.3 Hz, 1H), 5.41 (s, 2H), 4.54 (d, J=9.3 Hz, 1H), 3.59 (q, J=6.7 Hz, 1H), 3.51 (dt, J=14.0, 7.0 Hz, 2H), 3.43 (q, J=6.8 Hz, 2H), 2.57 (d, J=12.2 Hz, 2H), 2.50 (d, J=11.6 Hz, 2H), 2.32 (d, J=12.1 Hz, 2H), 1.51 (d, J=6.6 Hz, 6H), 1.33 (d, J=6.8 Hz, 6H), 1.26 (d, J=6.7 Hz, 5H), 1.19 (d, J=6.8 Hz, 5H), 1.11 (d, J=6.8 Hz, 6H), 0.18 (d, J=6.6 Hz, 5H). $^{13}$C NMR (101 MHz, benzene-$d_6$) δ 163.06, 146.84, 146.05, 143.31, 138.59, 130.06, 129.72, 129.07, 128.98, 128.92, 128.88, 128.64, 128.61, 128.57, 128.06, 127.43, 127.39, 127.09, 126.98, 126.42, 125.71, 125.42, 125.35, 125.01, 124.45, 124.02, 123.45, 121.89, 114.33, 107.39, 85.35, 81.34, 75.96, 64.41, 28.70, 28.58, 28.15, 27.56, 26.15, 25.19, 24.62, 24.51, 24.36, 21.45.

Example 42—Synthesis of Procatalyst 22

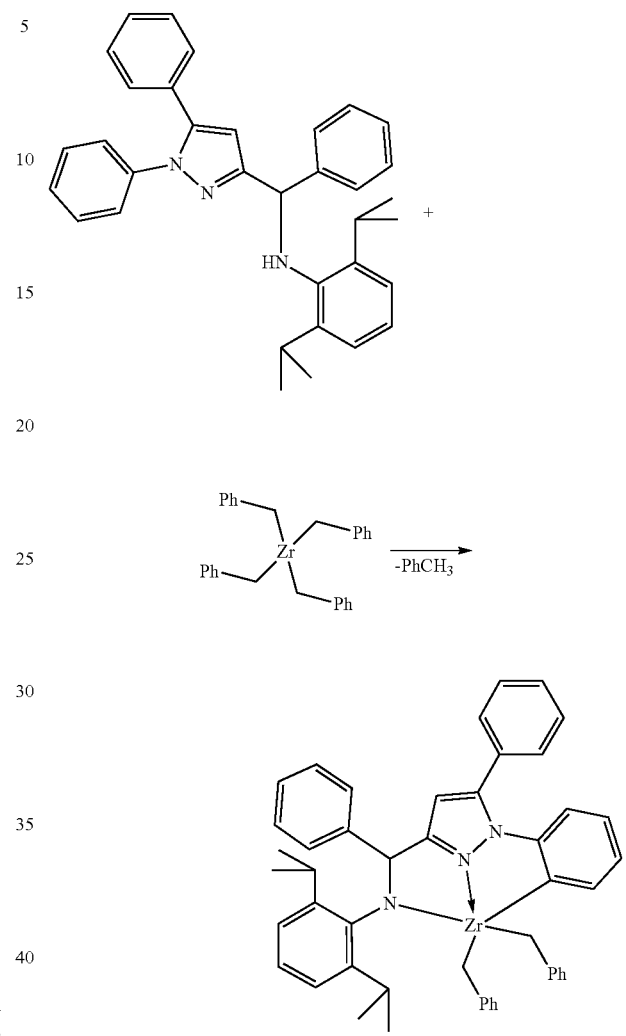

A 20 mL glass vial in the glovebox was charged with a magnetic stir bar, a 76 mM toluene solution of proligand 14 (2.7 mL, 0.21 mmol), and toluene (3 mL). While stirring at ambient temperature, a 50 mM toluene solution of tetrabenzyl zirconium (4.0 mL, 0.20 mmol) was added dropwise by syringe. The solution color changed from pale yellow to light brown upon addition. The mixture was stirred at ambient temperature for 2 h before heating overnight at 80° C. Volatiles were removed in vacuo leaving a brown solid in 74% yield (0.117 g, 0.155 mmol). $^1$H NMR (400 MHz, benzene-$d_6$) δ 8.15 (dd, J=7.1, 1.2 Hz, 2H), 6.89-6.69 (m, 16H), 6.61-6.54 (m, 4H), 6.00 (s, 2H), 5.49 (s, 2H), 3.50 (p, J=6.7 Hz, 2H), 3.42 (p, J=6.8 Hz, 2H), 2.76 (d, J=9.7 Hz, 2H), 2.42 (d, J=11.5 Hz, 2H), 2.33 (d, J=9.6 Hz, 2H), 2.24 (d, J=11.5 Hz, 2H), 1.50 (d, J=6.6 Hz, 6H), 1.34 (d, J=6.7 Hz, 6H), 1.25 (d, J=6.6 Hz, 6H), 0.11 (d, J=6.6 Hz, 6H). $^{13}$C NMR (101 MHz, benzene-$d_6$) δ 178.18, 162.44, 149.09, 148.44, 147.82, 146.86, 145.11, 143.76, 142.64, 138.55, 136.74, 131.34, 129.97, 129.66, 129.64, 129.61, 129.07, 128.93, 128.88, 128.06, 127.00, 126.73, 126.24, 125.26, 124.88, 124.32, 121.35, 114.05, 106.18, 75.42, 72.39, 69.24, 29.07, 28.57, 27.56, 25.66, 25.58, 24.20.

Example 43—Synthesis of Procatalyst 23

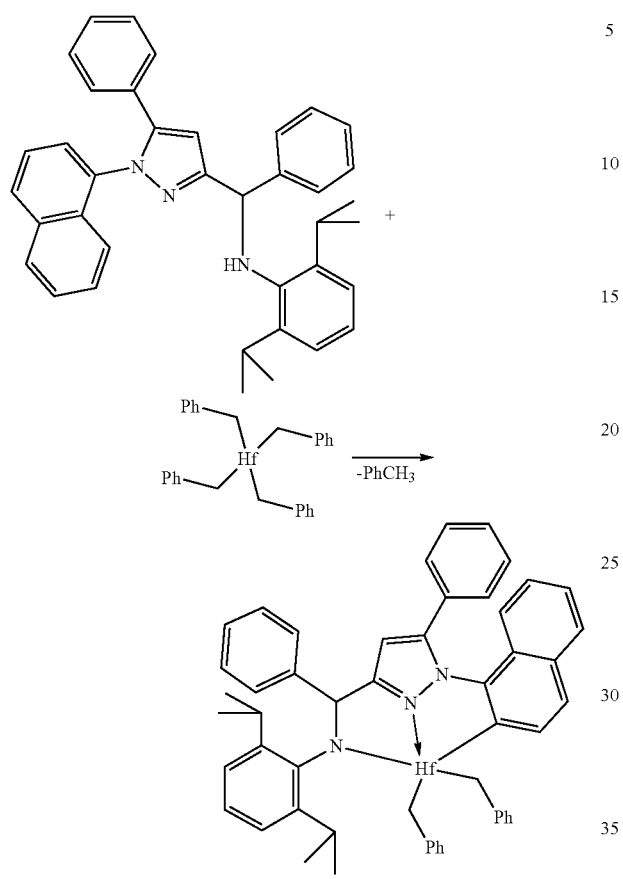

A 30 mL glass jar in the glovebox was charged with a 20 mM toluene solution of tetrabenzyl hafnium. A pale yellow 21 mM solution of proligand 15 in toluene (5.0 mL, 0.10 mmol) was slowly added dropwise at ambient temperature to this solution. The solution was mixed, and the homogeneous pale yellow solution was allowed to react overnight at ambient temperature in the glovebox. Volatiles were removed in vacuo at 40° C., leaving a waxy yellow solid. Addition of hexanes (1-2 mL) resulted in precipitation of a yellow microcrystalline solid recovered in 83% yield (0.073 g, 0.082 mmol). NMR data are consistent with a 2:1 mixture of isomers. $^1$H NMR (400 MHz, benzene-d$_6$) δ 8.91-8.84 (m, 1H), 8.44 (dd, J=7.7, 0.9 Hz, 2H), 7.73 (d, J=7.8 Hz, 2H), 7.61 (d, J=8.3 Hz, 2H), 7.51 (dd, J=8.0, 1.1 Hz, 2H), 7.06-6.80 (m, 41H), 6.76-6.57 (m, 11H), 6.47-6.37 (m, 6H), 6.32 (s, 2H), 6.16 (s, 1H), 5.90 (s, 1H), 5.67 (s, 2H), 3.84 (q, J=6.7 Hz, 1H), 3.68 (p, J=6.6 Hz, 2H), 3.55 (h, J=6.2, 5.7 Hz, 2H), 3.46 (p, J=6.9 Hz, 1H), 3.17 (d, J=12.3 Hz, 1H), 2.88 (d, J=12.3 Hz, 1H), 2.70 (d, J=12.2 Hz, 2H), 2.57 (d, J=12.2 Hz, 2H), 2.42 (d, J=11.9 Hz, 2H), 2.18-2.09 (m, 4H), 1.94 (d, J=12.3 Hz, 1H), 1.57 (d, J=6.7 Hz, 3H), 1.52 (dd, J=6.7, 0.9 Hz, 6H), 1.44 (d, J=6.6 Hz, 2H), 1.34 (d, J=6.7 Hz, 6H), 1.29 (dd, J=6.7, 1.0 Hz, 6H), 1.23-1.18 (m, 1H), 1.12 (d, J=6.7 Hz, 4H), 0.27 (d, J=6.6 Hz, 3H), 0.18 (dd, J=6.6, 0.9 Hz, 6H). $^{13}$C NMR (101 MHz, benzene-d$_6$) δ 164.44, 148.87, 148.04, 146.98, 146.42, 145.09, 143.67, 142.16, 140.81, 135.30, 134.71, 130.22, 129.83, 129.63, 129.47, 129.16, 129.08, 129.02, 128.92, 128.90, 128.83, 128.63, 128.54, 128.06, 127.26, 126.81, 126.52, 125.46, 125.37, 125.04, 124.92, 124.62, 123.43, 122.16, 106.67, 89.15, 86.59, 81.27, 74.64, 28.71, 28.43, 27.48, 26.22, 25.15, 24.75, 24.53.

Example 44—Synthesis of Procatalyst 24

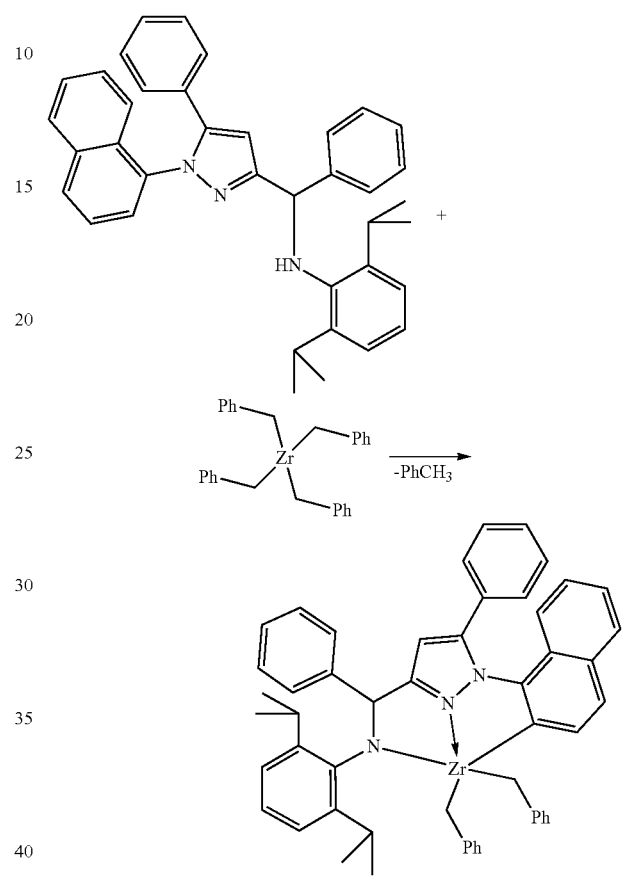

A 30 mL glass jar in the glovebox was charged with a golden 20 mM toluene solution of tetrabenzyl zirconium. A pale yellow 21 mM solution of proligand 15 in toluene (5.0 mL, 0.10 mmol) was slowly added dropwise by syringe at ambient temperature to the golden solution. The combined solution was mixed, and the homogeneous golden solution was allowed to react overnight at ambient temperature in the glovebox. Volatiles were removed in vacuo at 40° C., leaving a brown, oily residue. Addition of hexanes (1-2 mL) resulted in precipitation of a rust-colored solid recovered in 96% yield (0.082 g, 0.10 mmol). NMR data are consistent with a mixture of isomers.

Example 45—Polymerization Results from Parallel Pressure Reactor

Catalyst activity (in terms of quench time and polymer yield) and resulting polymer characteristics were assessed for Procatalysts 1-6 and Comparative C1 and C2. The polymerizations were carried out in a parallel pressure reactor (PPR). For the results summarized in Table 1, the catalyst systems contained 100 nmol procatalyst.

Each of Procatalysts 1-6 and the Comparative Procatalysts C1 and C2 (herein "Comparative C1" and "Comparative C2") were mixed with an activator to form a catalyst system. The Procatalysts 1-6 have a structure according to the metal-ligand complex of formula (I). Comparative C1 and Comparative C2 differed from Procatalysts 1-6. Specifically, the Comparative Procatalysts have the following structures:

parative C7 and C8. Specifically, the Inventive Procatalysts 2 and 5 and the Comparative Procatalysts have the following structures:

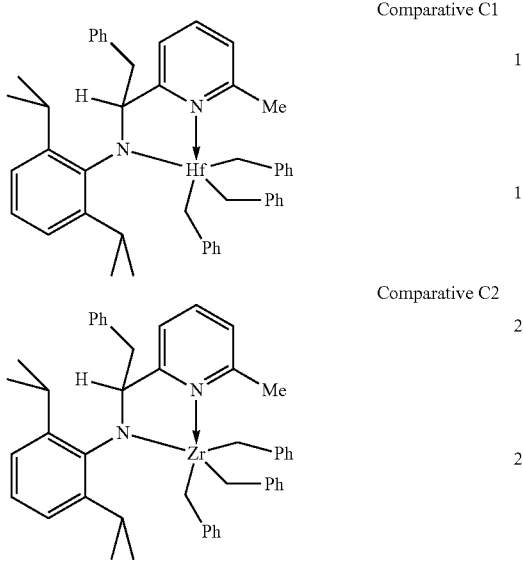

Comparative C1

Comparative C2

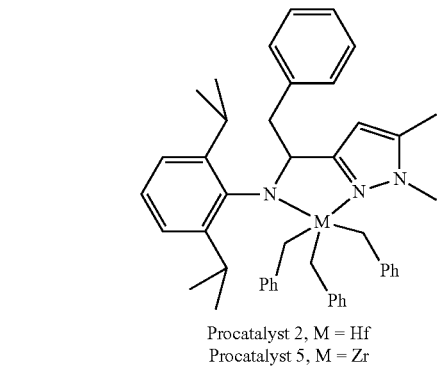

Procatalyst 2, M = Hf
Procatalyst 5, M = Zr

The efficiencies and octene incorporation in mole percent (mol %) of the inventive Procatalysts 1-6, and Comparatives C1 and C2 and the polymer characteristics of the polymers yielded from the inventive Procatalyst 1-6, and Comparatives C1 and C2 were determined. The results are summarized in Table 1.

TABLE 1

Parallel Pressure Reactor Data

| Procatalyst | Metal | $M_w$ (g/mol) | PDI | Mole % $C_8$ | Time (s) |
|---|---|---|---|---|---|
| Procatalyst 1 | Hf | 123,000 | 7.6 | 15.1 | 31 |
| Procatalyst 2 | Hf | 103,000 | 8.7 | 15.6 | 29 |
| Procatalyst 3 | Hf | 86,000 | 8.6 | 16.5 | 28 |
| Procatalyst 4 | Zr | 331,000 | 9.9 | 5.7 | 154 |
| Procatalyst 5 | Zr | 335,000 | 6.1 | 5.0 | 113 |
| Procatalyst 6 | Zr | 226,000 | 5.6 | 6.4 | 63 |
| Comparative C1 | Hf | 113,000 | 5.1 | 10.8 | 40 |
| Comparative C2 | Zr | 251,000 | 3.4 | 5.3 | 88 |

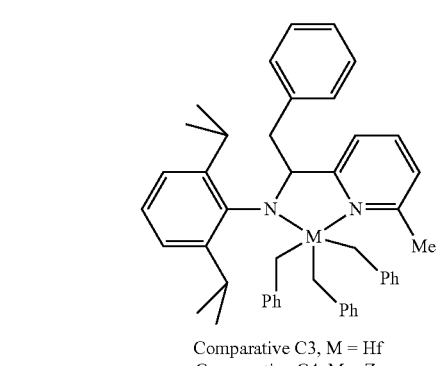

Comparative C3, M = Hf
Comparative C4, M = Zr

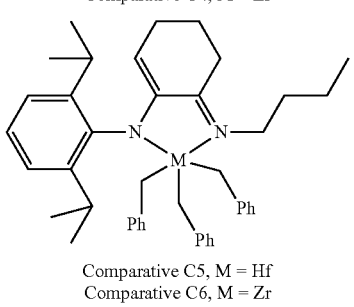

Comparative C5, M = Hf
Comparative C6, M = Zr

The data in Table 1 illustrate that polymerization systems including Procatalysts 1, 2, and 3, having hafnium as the metal of the metal-ligand complex, have higher octene selectivity than that of the polymerization system including Comparative C1, also having hafnium as a metal. The polymerization systems including Procatalysts 4, 5, and 6, having zirconium as the metal of the metal-ligand complex, have a higher than or equal to octene selectivity than that of the polymerization system including Comparative C2, also having zirconium as the metal.

The efficiencies of the Procatalysts and the polymers produced by the catalyst systems that include the procatalyst are summarized in Table 2. Table 2 includes data produced four different types catalysts with bidentate metal-ligand complexes, including Inventive Procatalysts 2 and 5, Comparative C3 and C4, Comparative C5 and C6, and Com-

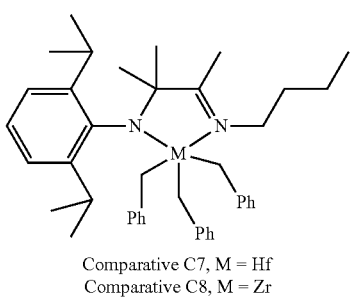

Comparative C7, M = Hf
Comparative C8, M = Zr

TABLE 2

PPR and Polymer Characterization Data

| Procatalyst | Catalyst umol | Mw | Mn | PDI | Mp | Mole Percent Octene | Polymer Yield (g) | Run Time (s) | $C_2^-$ Uptake (psig) | $H_2$ (psig) |
|---|---|---|---|---|---|---|---|---|---|---|
| Procatalyst 2 | 0.050 | 120,301 | 21,901 | 5.5 | 47,833 | 11.8 | 0.199 | 32 | 51 | 0 |
| | 0.050 | 91,203 | 18,804 | 4.9 | 40,566 | 12.0 | 0.212 | 24 | 52 | 10 |
| | 0.050 | 88,691 | 25,904 | 3.4 | 57,324 | 17.3 | 0.277 | 27 | 51 | 0 |
| | 0.050 | 53,648 | 18,236 | 2.9 | 42,401 | 22.4 | 0.431 | 28 | 50 | 10 |
| | 0.025 | 153,026 | 27,871 | 5.5 | 68,943 | 9.5 | 0.167 | 43 | 52 | 0 |
| | 0.025 | 29,155 | 7,309 | 4.0 | 15,966 | 13.2 | 0.170 | 32 | 51 | 30 |
| | 0.025 | 119,050 | 30,035 | 4.0 | 66,337 | 13.0 | 0.212 | 31 | 51 | 0 |
| | 0.025 | 24,719 | 6,033 | 4.1 | 13,565 | 17.3 | 0.235 | 29 | 51 | 30 |
| | 0.015 | 137,654 | 43,115 | 3.2 | 89,950 | 10.5 | 0.121 | 55 | 50 | 0 |
| | 0.015 | 39,087 | 14,026 | 2.8 | 30,800 | 10.6 | 0.136 | 37 | 51 | 20 |
| | 0.015 | 233,131 | 66,573 | 3.5 | 150,377 | 6.2 | 0.126 | 50 | 50 | 0 |
| | 0.015 | 65,016 | 21,338 | 3.1 | 47,829 | 7.9 | 0.128 | 52 | 51 | 20 |
| Procatalyst 5 | 0.050 | 107,302 | 37,879 | 2.8 | 69,074 | 18.5 | 0.196 | 132 | 50 | 0 |
| | 0.050 | 50,779 | 20,147 | 2.5 | 40,843 | 25.4 | 0.325 | 89 | 50 | 10 |
| | 0.050 | 262,014 | 67,583 | 3.9 | 213,049 | 4.7 | 0.060 | 1801 | 45 | 0 |
| | 0.050 | 141,678 | 47,183 | 3.0 | 117,885 | 4.7 | 0.066 | 155 | 50 | 10 |
| | 0.035 | 149,335 | 34,163 | 4.4 | 68,167 | 13.6 | 0.145 | 106 | 50 | 0 |
| | 0.035 | 17,825 | 6,574 | 2.7 | 13,658 | 18.7 | 0.195 | 62 | 50 | 30 |
| | 0.035 | 19,910 | 5,886 | 3.4 | 14,242 | 6.6 | 0.080 | 72 | 50 | 30 |
| | 0.020 | 220,196 | 45,732 | 4.8 | 80,444 | 9.7 | 0.088 | 666 | 50 | 0 |
| | 0.020 | 18,775 | 6,769 | 2.8 | 13,605 | 13.9 | 0.103 | 125 | 50 | 20 |
| | 0.020 | 365,746 | 52,403 | 7.0 | 251,932 | 4.4 | 0.052 | 1800 | 42 | 0 |
| | 0.020 | 34,748 | 10,600 | 3.3 | 24,540 | 5.2 | 0.063 | 400 | 50 | 20 |
| | 0.050 | 145,146 | 44,782 | 3.2 | 101,172 | 7.5 | 0.149 | 49 | 50 | 0 |
| | 0.050 | 134,311 | 37,154 | 3.6 | 97,244 | 8.3 | 0.156 | 48 | 50 | 10 |
| | 0.050 | 159,541 | 53,874 | 3.0 | 97,866 | 8.1 | 0.152 | 51 | 50 | 0 |
| | 0.050 | 145,284 | 46,712 | 3.1 | 105,486 | 7.7 | 0.142 | 51 | 51 | 10 |
| | 0.035 | 161,509 | 50,183 | 3.2 | 112,053 | 6.7 | 0.134 | 57 | 51 | 0 |
| Comparative C3 | 0.035 | 53,831 | 15,580 | 3.5 | 42,092 | 8.6 | 0.136 | 50 | 52 | 30 |
| | 0.035 | 43,163 | 14,709 | 2.9 | 36,582 | | 0.123 | 61 | 51 | 30 |
| | 0.035 | 195,085 | 54,741 | 3.6 | 125,545 | 7.4 | 0.138 | 58 | 50 | 0 |
| | 0.015 | 299,703 | 115,907 | 2.6 | 217,617 | 5.0 | 0.087 | 120 | 50 | 0 |
| | 0.015 | 96,951 | 35,095 | 2.8 | 78,132 | 5.5 | 0.075 | 173 | 50 | 20 |
| | 0.015 | 262,816 | 105,200 | 2.5 | 204,768 | 5.0 | 0.085 | 124 | 50 | 0 |
| | 0.015 | 77,522 | 31,706 | 2.5 | 65,076 | 5.8 | 0.075 | 173 | 50 | 20 |
| | 0.050 | 266,868 | 87,285 | 3.1 | 247,441 | 4.0 | 0.060 | 440 | 50 | 0 |
| | 0.050 | 171,173 | 61,425 | 2.8 | 138,046 | 4.2 | 0.061 | 511 | 50 | 10 |
| | 0.050 | 261,339 | 86,596 | 3.0 | 239,685 | 4.6 | 0.045 | 1704 | 50 | 0 |
| | 0.050 | 161,920 | 55,803 | 2.9 | 130,574 | 5.5 | 0.061 | 531 | 50 | 10 |
| | 0.035 | 292,062 | 58,749 | 5.0 | 215,774 | 4.4 | 0.066 | 490 | 50 | 0 |
| Comparative C4 | 0.035 | 36,812 | 10,930 | 3.4 | 28,610 | 5.5 | 0.067 | 224 | 50 | 30 |
| | 0.035 | 292,360 | 89,526 | 3.3 | 214,524 | 4.5 | 0.062 | 938 | 50 | 0 |
| | 0.035 | 29,256 | 9,034 | 3.2 | 21,979 | 5.5 | 0.070 | 170 | 50 | 30 |
| | 0.035 | 301,927 | 75,094 | 4.0 | 210,906 | 4.2 | 0.060 | 1483 | 50 | 0 |
| | 0.035 | 28,807 | 9,963 | 2.9 | 20,544 | 5.3 | 0.067 | 214 | 50 | 20 |
| | 0.035 | 340,959 | 58,061 | 5.9 | 270,595 | 5.5 | 0.059 | 1800 | 47 | 0 |
| | 0.035 | 48,278 | 12,571 | 3.8 | 37,499 | 5.1 | 0.062 | 809 | 50 | 20 |
| Comparative C5 | 0.050 | 114,158 | 21,729 | 5.3 | 44,977 | 19.7 | 0.280 | 38 | 52 | 0 |
| | 0.050 | 101,423 | 21,047 | 4.8 | 41,108 | 19.4 | 0.281 | 37 | 52 | 10 |
| | 0.050 | 133,548 | 26,744 | 5.0 | 58,455 | 18.2 | 0.254 | 39 | 51 | 0 |
| | 0.050 | 139,326 | 36,828 | 3.8 | 73,752 | 16.4 | 0.231 | 30 | 53 | 10 |
| | 0.025 | 155,526 | 34,272 | 4.5 | 88,132 | 15.5 | 0.233 | 34 | 51 | 0 |
| | 0.025 | 58,196 | 14,189 | 4.1 | 37,921 | 17.9 | 0.237 | 38 | 52 | 30 |
| | 0.025 | 177,185 | 39,908 | 4.4 | 97,718 | 16.2 | 0.219 | 45 | 51 | 0 |
| | 0.025 | 55,199 | 17,752 | 3.1 | 41,950 | 17.1 | 0.176 | 39 | 51 | 30 |
| | 0.015 | 224,256 | 68,466 | 3.3 | 170,781 | 12.8 | 0.177 | 43 | 51 | 0 |
| | 0.015 | 63,179 | 20,785 | 3.0 | 47,368 | 16.8 | 0.185 | 49 | 51 | 20 |
| | 0.015 | 240,137 | 90,162 | 2.7 | 177,335 | 12.5 | 0.152 | 56 | 51 | 0 |
| | 0.015 | 101,111 | 39,345 | 2.6 | 82,663 | 13.0 | 0.106 | 75 | 50 | 20 |
| Comparative C6 | 0.050 | 223,899 | 46,117 | 4.9 | 217,376 | 7.1 | 0.082 | 218 | 50 | 0 |
| | 0.050 | 110,671 | 26,917 | 4.1 | 99,818 | 11.3 | 0.128 | 48 | 50 | 10 |
| | 0.050 | 247,924 | 54,752 | 4.5 | 249,677 | 7.6 | 0.093 | 155 | 50 | 0 |
| | 0.050 | 118,591 | 30,800 | 3.9 | 103,101 | 11.3 | 0.144 | 45 | 51 | 10 |
| | 0.035 | 193,003 | 27,300 | 7.1 | 179,938 | 9.9 | 0.144 | 46 | 51 | 0 |
| | 0.035 | 18,795 | 4,932 | 3.8 | 13,296 | 15.3 | 0.149 | 31 | 51 | 30 |
| | 0.035 | 221,308 | 21,728 | 10.2 | 216,094 | 9.4 | 0.135 | 54 | 51 | 0 |
| | 0.035 | 13,594 | 3,982 | 3.4 | 10,418 | 16.8 | 0.153 | 37 | 50 | 30 |
| | 0.015 | 289,219 | 36,888 | 7.8 | 239,004 | 7.5 | 0.090 | 108 | 50 | 0 |
| | 0.015 | 21,890 | 8,507 | 2.6 | 18,593 | 11.4 | 0.105 | 56 | 50 | 20 |
| | 0.015 | 314,152 | 23,214 | 13.5 | 257,528 | 7.8 | 0.085 | 132 | 50 | 0 |
| | 0.015 | 18,726 | 6,314 | 3.0 | 15,603 | 11.4 | 0.100 | 72 | 50 | 20 |
| Comparative C7 | 0.050 | 30,608 | 7,418 | 4.1 | 13,102 | 13.9 | 0.221 | 19 | 53 | 0 |
| | 0.050 | 30,617 | 6,883 | 4.5 | 13,603 | 14.6 | 0.232 | 25 | 51 | 10 |
| | 0.050 | 30,982 | 8,325 | 3.7 | 14,284 | 13.3 | 0.219 | 25 | 54 | 0 |

TABLE 2-continued

PPR and Polymer Characterization Data

| Procatalyst | Catalyst umol | Mw | Mn | PDI | Mp | Mole Percent Octene | Polymer Yield (g) | Run Time (s) | $C_2^-$ Uptake (psig) | $H_2$ (psig) |
|---|---|---|---|---|---|---|---|---|---|---|
| | 0.050 | 38,289 | 8,956 | 4.3 | 15,567 | 14.5 | 0.217 | 28 | 52 | 10 |
| | 0.025 | 45,769 | 13,323 | 3.4 | 24,945 | 9.1 | 0.180 | 26 | 51 | 0 |
| | 0.025 | 21,096 | 5,846 | 3.6 | 12,190 | 13.0 | 0.183 | 31 | 51 | 30 |
| | 0.025 | 52,685 | 14,568 | 3.6 | 28,436 | 9.4 | 0.186 | 27 | 51 | 0 |
| | 0.025 | 19,060 | 6,168 | 3.1 | 12,614 | 13.3 | 0.164 | 35 | 50 | 30 |
| | 0.012 | 83,093 | 32,875 | 2.5 | 62,127 | 5.9 | 0.120 | 46 | 50 | 0 |
| | 0.012 | 40,295 | 15,738 | 2.6 | 31,826 | 8.4 | 0.130 | 48 | 50 | 20 |
| | 0.012 | 81,641 | 32,226 | 2.5 | 62,084 | 6.2 | 0.120 | 48 | 51 | 0 |
| | 0.012 | 39,779 | 18,340 | 2.2 | 33,127 | 7.4 | 0.113 | 56 | 51 | 20 |
| Comparative C8 | 0.050 | 96,750 | 30,197 | 3.2 | 61,772 | 5.5 | 0.125 | 29 | 51 | 0 |
| | 0.050 | 51,861 | 10,104 | 5.1 | 29,723 | 12.4 | 0.146 | 25 | 51 | 10 |
| | 0.050 | 109,404 | 36,485 | 3.0 | 71,834 | 5.5 | 0.114 | 35 | 51 | 0 |
| | 0.050 | 70,967 | 23,420 | 3.0 | 43,484 | 6.3 | 0.137 | 27 | 51 | 10 |
| | 0.025 | 102,553 | 27,461 | 3.7 | 54,728 | 5.6 | 0.130 | 28 | 51 | 0 |
| | 0.025 | 11,688 | 3,188 | 3.7 | 6,435 | 9.5 | 0.135 | 26 | 51 | 30 |
| | 0.025 | 112,494 | 34,463 | 3.3 | 67,624 | 5.4 | 0.127 | 26 | 51 | 0 |
| | 0.025 | 10,472 | 2,827 | 3.7 | 6,134 | 10.4 | 0.125 | 33 | 50 | 30 |
| | 0.012 | 139,229 | 43,084 | 3.2 | 96,459 | 4.7 | 0.106 | 37 | 51 | 0 |
| | 0.012 | 16,962 | 5,410 | 3.1 | 13,517 | 6.9 | 0.106 | 40 | 53 | 20 |
| | 0.012 | 158,441 | 58,547 | 2.7 | 110,634 | 4.6 | 0.099 | 45 | 50 | 0 |
| | 0.012 | 14,791 | 4,402 | 3.4 | 11,731 | 7.2 | 0.107 | 39 | 51 | 20 |

Example 46—Polymerization Results from Batch Reactor

The polymerizations were carried out in a batch reactor according to the procedure previously described. Specifically, for the results summarized in Tables 3 and 4, a 2 L batch reactor was heated to 120° C., 150° C., or 190° C. In the batch reactor, 300 grams of octene, and 200 to 400 psig of ethylene were reacted in the presences of 520 g of Isopar™ E. The activator-to-procatalyst ratio was approximately 1.2; and 10 μmol of $AlEt_3$ was added to the reaction as an impurity scavenger. The polymerization reaction ran for 10 minutes.

The efficiencies of the inventive Procatalysts 2-10, and Comparatives C1 and C2 of the polymer characteristics of the polymers yielded from the inventive Procatalyst 2, 5 and 7-10, and Comparative C1 and C2 were determined. The results are summarized in Tables 3 and 4.

TABLE 3

Batch Reactor Data

| PROCATALYST | TEMP (° C.) | ETHYLENE (psig) | $M_w$ (g/mol) | EFF (kg pol/g metal) |
|---|---|---|---|---|
| Comparative C2 | 120 | 275 | 427,000 | 46 |
| Comparative C2 | 150 | 315 | 126,000 | 8 |
| Comparative C1 | 120 | 275 | 399,000 | 178 |
| Comparative C1 | 150 | 315 | 142,000 | 42 |
| Procatalyst 5 | 120 | 275 | 480,000 | 118 |
| Procatalyst 5 | 150 | 315 | 141,000 | 27 |
| Procatalyst 2 | 120 | 275 | 443,000 | 620 |
| Procatalyst 2 | 150 | 315 | 192,000 | 177 |

TABLE 4

Ethylene-Octene Copolymerization Data - Batch Reactor Data

| PROCATALYST | TEMP (° C.) | EFF (kg pol/g of metal) | $M_w$ | $M_n$ | PDI |
|---|---|---|---|---|---|
| PROCATALYST 7 | 120 | 507 | 310,675 | 21,406 | 14.5 |
| PROCATALYST 7 | 150 | 146 | 232,289 | 13,905 | 16.7 |
| PROCATALYST 7 | 190 | 21 | 54,702 | 10,016 | 5.5 |
| PROCATALYST 8 | 120 | 135 | 528,121 | 20,651 | 25.6 |
| PROCATALYST 8 | 150 | 33 | 137,160 | 5,029 | 27.3 |
| PROCATALYST 9 | 120 | 533 | 765,279 | 42,190 | 18.1 |
| PROCATALYST 9 | 150 | 247 | 299,625 | 22,413 | 13.4 |
| PROCATALYST 9 | 190 | 39 | 50,322 | 4,794 | 10.5 |
| PROCATALYST 10 | 120 | 194 | 603,556 | 33,032 | 18.3 |
| PROCATALYST 10 | 150 | 41 | 132,469 | 2,032 | 65.2 |
| PROCATALYST 10 | 190 | 7.3 | 34,707 | 1,954 | 17.8 |

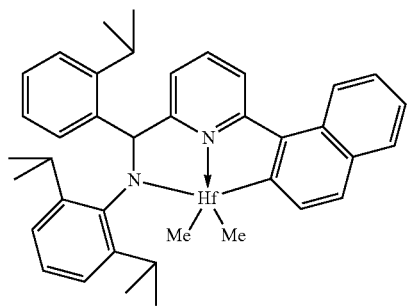

Comparative C9

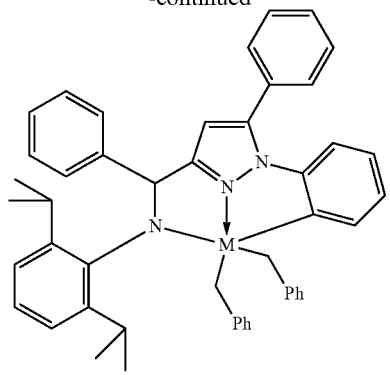

Procatalyst 22, M = Zr
Procatalyst 21, M = Hf

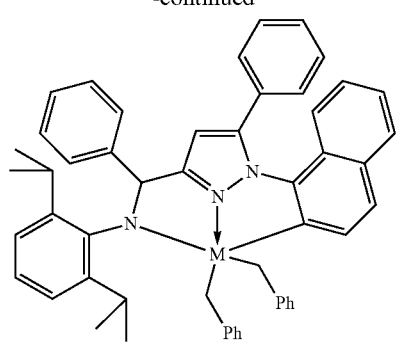

Procatalyst 24, M = Zr
Procatalyst 23, M = Hf

TABLE 5

Ethylene-Octene Copolymerization Data - Batch Reactor Data at 120° C.

| Catalyst | Catalyst (umol) | Yield (g) | Quench Time (s) | C2** | $M_w$ | $M_n$ | PDI | $M_p$ | Mol % Octene (in-line) | Mole % Octene (film) |
|---|---|---|---|---|---|---|---|---|---|---|
| Comparative C9 | 0.020 | 0.249 | 106 | 51 | 555,715 | 108,220 | 5.1 | 533,099 | 23.6 | 23.7 |
| | 0.020 | 0.251 | 78 | 51 | 538,974 | 85,537 | 6.3 | 513,051 | 25.8 | 23.6 |
| | 0.020 | 0.246 | 60 | 50 | 502,168 | 87,699 | 5.7 | 510,187 | 23.4 | 20.9 |
| | 0.020 | 0.223 | 72 | 51 | 559,259 | 97,471 | 5.7 | 515,879 | 25.4 | 23.9 |
| Procatalyst 21 | 0.020 | 0.173 | 61 | 51 | 292,808 | 47,793 | 6.1 | 331,432 | 12.2 | 13.5 |
| | 0.050 | 0.231 | 60 | 50 | 222,491 | 24,148 | 9.2 | 181,671 | 17.1 | 18.4 |
| | 0.050 | 0.265 | 57 | 50 | 205,642 | 24,263 | 8.5 | 81,786 | 16.8 | 19.0 |
| | 0.020 | 0.173 | 84 | 50 | 315,466 | 53,343 | 5.9 | 346,957 | 10.7 | 12.7 |
| Procatalyst 22 | 0.020 | 0.086 | 1800 | 47 | 314,605 | 13,126 | 24.0 | 371,434 | 6.5 | 5.7 |
| | 0.050 | 0.148 | 201 | 50 | 187,025 | 14,560 | 12.8 | 69,364 | 11.3 | 11.5 |
| | 0.020 | 0.089 | 1801 | 49 | 254,929 | 6,813 | 37.4 | 362,625 | 8.4 | 9.6 |
| | 0.050 | 0.121 | 146 | 50 | 237,344 | 10,171 | 23.3 | 115,336 | 11.1 | 11.9 |
| Procatalyst 23 | 0.020 | 0.201 | 60 | 51 | 362,429 | 33,619 | 10.8 | 356,061 | 11.7 | 13.7 |
| | 0.050 | 0.264 | 45 | 51 | 356,301 | 26,070 | 13.7 | 409,229 | 15.1 | 17.7 |
| | 0.050 | 0.258 | 51 | 51 | 358,195 | 22,860 | 15.7 | 431,784 | 15.4 | 17.7 |
| | 0.020 | 0.203 | 64 | 51 | 399,918 | 38,284 | 10.4 | 405,574 | 12.3 | 13.8 |
| Procatalyst 24 | 0.020 | 0.136 | 1800 | 47 | 416,029 | 27,236 | 15.3 | 60,116 | 11.5 | 12.7 |
| | 0.050 | 0.109 | 341 | 50 | 497,731 | 23,832 | 20.9 | 433,036 | 10.8 | 12.2 |
| | 0.020 | 0.075 | 1802 | 36 | 571,711 | 30,369 | 18.8 | 462,597 | 12.0 | 12.9 |
| | 0.050 | 0.109 | 498 | 50 | 522,573 | 33,287 | 15.7 | 470,306 | 10.7 | 12.5 |

*$H_2$ pressure 150 psig
**Ethylene Up-take

TABLE 6

Ethylene-Octene Copolymerization Data - Batch Reactor Data at 150° C.

| Catalyst | Catalyst (umol) | Yield (g) | Quench Time (s) | C2= Uptake (psig) | Mw | Mn | PDI | Mp | Mol % Octene (in-line) | Mole % Octene (film) |
|---|---|---|---|---|---|---|---|---|---|---|
| Comparative C9 | 0.030 | 0.210 | 770 | 75 | 187,009 | 22,062 | 8.5 | 174,647 | 18.3 | 17.1 |
| | 0.030 | 0.207 | 469 | 75 | 181,446 | 22,231 | 8.2 | 174,674 | 17.1 | 11.4 |
| | 0.030 | 0.003 | 1800 | 5 | | | | | | |
| | 0.030 | 0.181 | 1801 | 69 | 178,016 | 12,965 | 13.7 | 171,307 | 16.6 | 18.0 |
| Procatalyst 21 | 0.030 | 0.150 | 901 | 75 | 161,984 | 29,873 | 5.4 | 131,423 | 9.9 | 9.5 |
| | 0.060 | 0.183 | 193 | 75 | 137,853 | 23,640 | 5.8 | 104,742 | 11.7 | 11.1 |
| | 0.060 | 0.183 | 193 | 75 | 137,853 | 23,640 | 5.8 | 104,742 | 11.7 | 11.1 |
| | 0.060 | 0.193 | 226 | 75 | 140,755 | 19,684 | 7.2 | 97,736 | 12.6 | 13.5 |
| | 0.030 | 0.143 | 1802 | 69 | 154,227 | 26,596 | 5.8 | 120,745 | 9.7 | 9.7 |
| Procatalyst 22 | 0.030 | 0.052 | 1801 | 20 | 122,773 | 2,636 | 46.6 | 86,652 | 8.7 | 12.2 |
| | 0.060 | 0.089 | 1800 | 42 | 96,038 | 3,542 | 27.1 | 68,442 | 8.5 | 8.7 |
| | 0.030 | 0.048 | 1802 | 23 | 130,318 | 4,942 | 26.4 | 89,827 | 9.2 | 8.0 |
| | 0.060 | 0.085 | 1800 | 43 | 116,281 | 3,744 | 31.1 | 81,197 | 9.5 | 8.6 |

TABLE 6-continued

Ethylene-Octene Copolymerization Data - Batch Reactor Data at 150° C.

| Catalyst | Catalyst (umol) | Yield (g) | Quench Time (s) | C2= Uptake (psig) | Mw | Mn | PDI | Mp | Mol % Octene (in-line) | Mole % Octene (film) |
|---|---|---|---|---|---|---|---|---|---|---|
| Procatalyst 23 | 0.030 | 0.173 | 107 | 75 | 208,305 | 23,574 | 8.8 | 98,371 | 9.6 | 9.4 |
| | 0.060 | 0.204 | 83 | 75 | 190,970 | 18,351 | 10.4 | 60,706 | 13.4 | 12.3 |
| | 0.060 | 0.190 | 116 | 75 | 163,690 | 7,545 | 21.7 | 59,486 | 9.7 | 10.3 |
| | 0.030 | 0.166 | 119 | 75 | 207,535 | 26,491 | 7.8 | 89,388 | 9.9 | 9.6 |
| Procatalyst 24 | 0.030 | 0.068 | 1801 | 29 | 322,845 | 14,467 | 22.3 | 69,646 | 11.8 | 11.9 |
| | 0.060 | 0.088 | 1801 | 42 | 315,259 | 16,782 | 18.8 | 387,957 | 10.4 | 9.9 |
| | 0.030 | 0.052 | 1802 | 25 | 343,254 | 14,348 | 23.9 | 378,298 | 10.6 | 10.9 |
| | 0.060 | 0.072 | 1802 | 33 | 316,900 | 13,201 | 24.0 | 385,860 | 10.9 | 10.2 |

* $H_2$ pressure 213 psig

The invention claimed is:

1. A catalyst system comprising a metal-ligand complex according to formula (I):

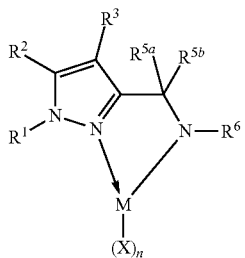

where
M is a metal chosen from titanium, zirconium, or hafnium, the metal having a formal oxidation state of +2, +3, or +4;
$R^1$ is chosen from $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —OR$^C$, —SR$^C$, —NO$_2$, —CN, —CF$_3$, R$^C$S(O)—, R$^C$S(O)$_2$—, $(R^C)_2$C=N—, R$^C$C(O)O—, R$^C$OC(O)—, R$^C$C(O)N(R)—, $(R^C)_2$NC(O)—, halogen, hydrogen, $(C_5-C_{40})$arylene covalently connected to M, or $(C_4-C_{40})$heteroarylene covalently connected to M;
$R^2$ and $R^3$ are independently chosen from $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —OR$^C$, —SR$^C$, —NO$_2$, —CN, —CF$_3$, R$^C$S(O)—, R$^C$S(O)$_2$—, $(R^C)_2$C=N—, R$^C$C(O)O—, R$^C$OC(O)—, R$^C$C(O)N(R)—, $(R^C)_2$NC(O)—, halogen, or hydrogen;
$R^2$ and $R^3$ are optionally covalently linked to form an aromatic ring;
$R^{5a}$, $R^{5b}$, and $R^6$ are independently chosen from $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —OR$^C$, —SR$^C$, —NO$_2$, —CN, —CF$_3$, R$^C$S(O)—, R$^C$S(O)$_2$—, $(R^C)_2$C=N—, R$^C$C(O)O—, R$^C$OC(O)—, R$^C$C(O)N(R)—, $(R^C)_2$NC(O)—, halogen, or hydrogen;
each X is a monodentate ligand, bidentate ligand, or tridentate ligand chosen from $(C_1-C_{40})$hydrocarbyl, $(C_1-C_{40})$heterohydrocarbyl, $(C_6-C_{20})$aryl, $(C_6-C_{20})$heteroaryl, —N$(R^N)_2$, —OR$^C$, —SR$^C$, —NO$_2$, —CN, —CF$_3$, R$^C$S(O)—, R$^C$S(O)$_2$—, $(R^C)_2$C=N—, R$^C$C(O) O—, or R$^C$OC(O)—, wherein each R$^C$, R$^N$, and R$^P$ in formula (I) is independently a $(C_1-C_{30})$hydrocarbyl;

n is 1, 2, or 3, provided that when X is a tridentate ligand, n is 1, and when $R^1$ is $(C_5-C_{40})$arylene or $(C_4-C_{40})$heteroarylene, n is 1 or 2; and each R$^C$, R$^N$, and R$^P$ in formula (I) is independently a $(C_1-C_{30})$hydrocarbyl.

2. The catalyst system according to claim 1, wherein $R^2$ and $R^3$ are covalently linked to form an aromatic ring and $R^6$ is substituted phenyl or unsubstituted phenyl, the metal-ligand complex having a structure according to formula (II):

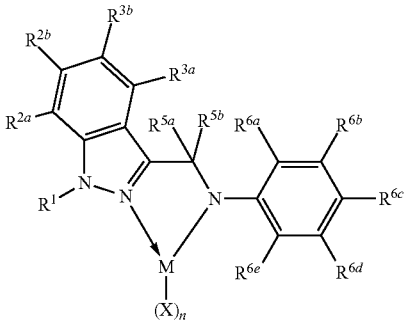

in which $R^1$, $R^{5a}$, $R^{5b}$, X, and n are as defined in formula (I); and $R^{2a}$, $R^{2b}$, $R^{3a}$, $R^{3b}$, $R^{6a}$, $R^{6b}$, $R^{6c}$, $R^{6d}$, and $R^{6e}$ are independently chosen from $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —OR$^C$, —SR$^C$, —NO$_2$, —CN, —CF$_3$, R$^C$S(O)—, R$^C$S(O)$_2$—, $(R^C)_2$C=N—, R$^C$C(O) O—, R$^C$OC(O)—, R$^C$C(O)N(R)—, $(R^C)_2$NC(O)—, halogen, or hydrogen.

3. The catalyst system according to claim 1, wherein each X is independently benzyl, phenyl, methyl, or halogen.

4. The catalyst system according to claim 1, wherein $R^{5a}$ or $R^{5b}$ is —H, benzyl, substituted phenyl, unsubstituted phenyl, or $(C_1-C_{10})$alkyl.

5. The catalyst system according to claim 1, wherein $R^1$ is a $(C_1-C_8)$alkyl.

6. The catalyst system according to claim 5, wherein $R^1$ is methyl or n-octyl.

7. The catalyst system according to claim 2, wherein $R^{6a}$ and $R^{6e}$ are $(C_1-C_{30})$alkyl.

8. The catalyst system according to claim 1, wherein $R^2$ is methyl or phenyl.

9. The catalyst system according to claim 1, wherein $R^1$ is $(C_5-C_{40})$arylene covalently connected to M, the metal-ligand complex having a structure according to formula (III):

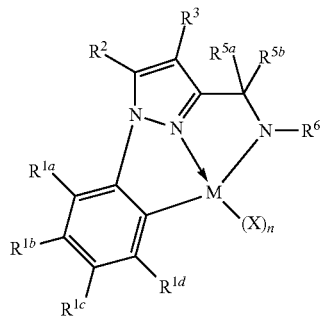

in which $R^2$, $R^3$, $R^{5a}$, $R^{5b}$, $R^6$, M, X, and n are as defined in formula (I); and $R^{1a}$, $R^{1b}$, $R^{1c}$, and $R^{1d}$ are independently chosen from $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —OR$^C$, —SR$^C$, —NO$_2$, —CN, —CF$_3$, R$^C$S(O)—, R$^C$S(O)$_2$—, $(R^C)_2$C=N—, R$^C$C(O)O—, R$^C$OC(O)—, R$^C$C(O)N(R)—, $(R^C)_2$NC(O)—, halogen, or hydrogen; and optionally any of $R^{1a}$ and $R^{1b}$, or $R^{1b}$ and $R^{1c}$, or $R^{1c}$ and $R^{1d}$ are covalently linked to form an aromatic ring or a non-aromatic ring.

10. The catalyst system according to claim 9, wherein $R^2$ and $R^3$ are covalently linked to form an aromatic ring, the metal-ligand complex having a structure according to formula (IV):

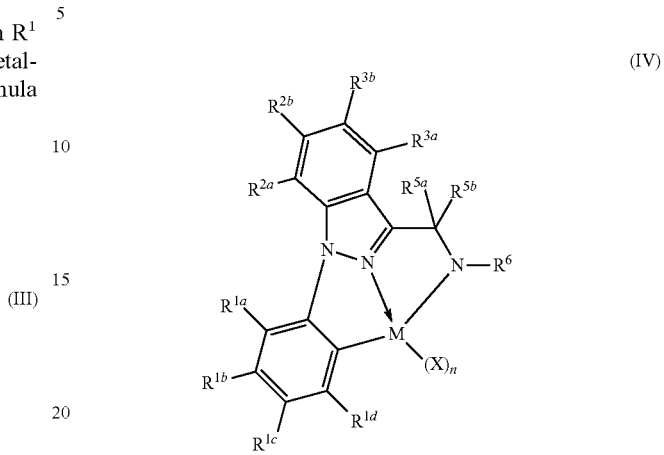

in which $R^{1a}$, $R^{1b}$, $R^{1c}$, $R^{1d}$, $R^{5a}$, $R^{5b}$, $R^6$, M, X, and n are as defined in formula (III); and $R^{2a}$, $R^{2b}$, $R^{3a}$, and $R^{3b}$ are independently chosen from $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —OR$^C$, —SR$^C$, —NO$_2$, —CN, —CF$_3$, R$^C$S(O)—, R$^C$S(O)$_2$—, $(R^C)_2$C=N—, R$^C$C(O)O—, R$^C$OC(O)—, R$^C$C(O)N(R)—, $(R^C)_2$NC(O)—, halogen, or hydrogen.

11. A polymerization process comprising:
polymerizing ethylene and one or more olefins in the presence of a catalyst system according to claim 1, under olefin polymerizing conditions to form an ethylene-based polymer.

12. The polymerization process according to claim 11, wherein the catalyst system further comprises a cocatalyst.

13. The polymerization process according to claim 11, wherein the one or more olefins are chosen from propylene, 1-hexene, or 1-octene.

* * * * *